(12) United States Patent
Steinmetz et al.

(10) Patent No.: US 6,425,034 B1
(45) Date of Patent: Jul. 23, 2002

(54) FIBRE CHANNEL CONTROLLER HAVING BOTH INBOUND AND OUTBOUND CONTROL UNITS FOR SIMULTANEOUSLY PROCESSING BOTH MULTIPLE INBOUND AND OUTBOUND SEQUENCES

(75) Inventors: Joseph H. Steinmetz, Rocklin; Matthew P. Wakeley; Bryan J. Cowger, both of Roseville, all of CA (US); Michael I. Thompson, Bothell, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/183,164

(22) Filed: Oct. 30, 1998

(51) Int. Cl.[7] .............................................. G06F 13/14
(52) U.S. Cl. ........................ 710/129; 709/238; 370/402
(58) Field of Search ........................ 710/129; 709/238; 370/453, 405, 402

(56) References Cited

U.S. PATENT DOCUMENTS

| | | | | |
|---|---|---|---|---|
| 5,274,779 A | * | 12/1993 | Stewart et al. ............... | 395/425 |
| 5,583,867 A | * | 12/1996 | Poole .......................... | 370/257 |
| 5,598,541 A | | 1/1997 | Malladi ....................... | 395/286 |
| 5,638,518 A | | 6/1997 | Malladi ................... | 395/200.21 |
| 5,768,530 A | | 6/1998 | Sandorfi ................ | 395/200.63 |
| 5,867,675 A | * | 2/1999 | Lomelino et al. ........... | 395/309 |
| 5,941,972 A | * | 8/1999 | Hoese et al. ................ | 710/129 |
| 6,014,383 A | * | 1/2000 | McCarty ..................... | 370/453 |
| 6,041,381 A | * | 3/2000 | Hoese ........................ | 710/129 |
| 6,065,087 A | * | 5/2000 | Keaveny et al. ............ | 710/129 |
| 6,098,125 A | * | 8/2000 | Fiacco et al. ................. | 710/52 |

OTHER PUBLICATIONS

"Emulex Fibre Channel LightPulse LP3000 PCI Host Bus Adapter," (visited Aug. 21, 1998) www.emulex.com>pp. 1–10.

QLogic Corporation "ISP2100A Intelligent Fibre Channel Processors—Data Sheet," www.qlc.com> pp. 1–4 (Mar. 11, 1998).

QLogic Corporation "ISP2100 Intelligent Fibre Channel Processor—Data Sheet," www.qlc.com> pp. 1–4 (Jul. 29, 1997).

Adaptec "AHA–F940 32–bit PCI–to–Fibre Channel Host Adapter—Full–speed Fibre Channel for high–end workstations and servers," www.adaptec.com> pp. 1–7 (Nov. 7, 1997).

Hewlett–Packard "Tachyon User's Manual—HPFC–5000," pp. 1–390. (May 1996).

* cited by examiner

*Primary Examiner*—Thomas Lee
*Assistant Examiner*—Thuan Du

(57) ABSTRACT

A FC controller that interfaces between a host system and a 10-bit FC interface is herein described. The FC controller acts as both a FCP initiator and FCP target device and has the capability to receive and process SCSI I/O requests received from a FC and a host system. The FC controller can process both multiple inbound and outbound sequences simultaneously since it does not employ a processor-based architecture. Rather, the FC controller relies on specialized circuitry that can operate in a relatively independent manner so that multiple tasks are performed concurrently thereby achieving a faster throughput and data transfer rate.

19 Claims, 80 Drawing Sheets

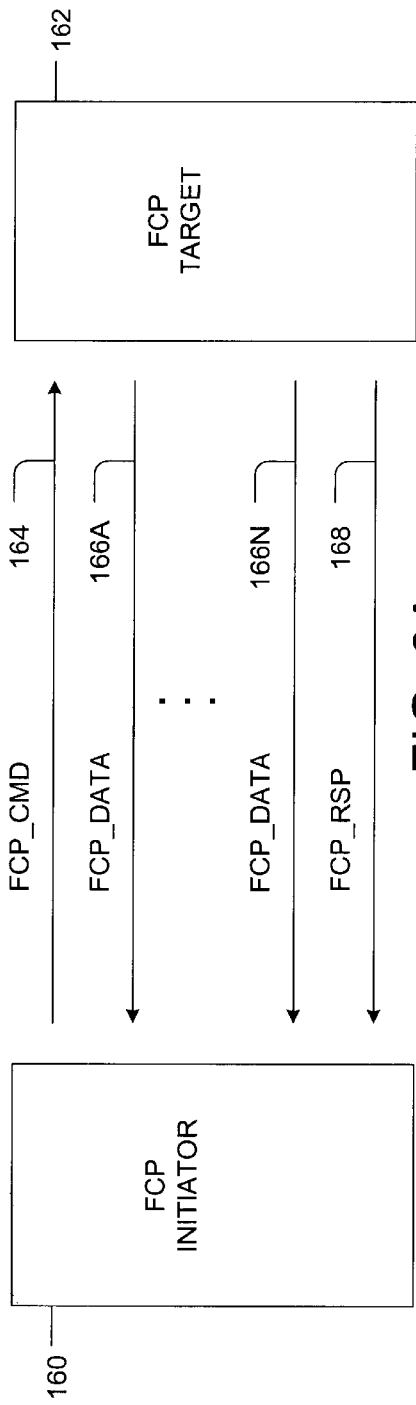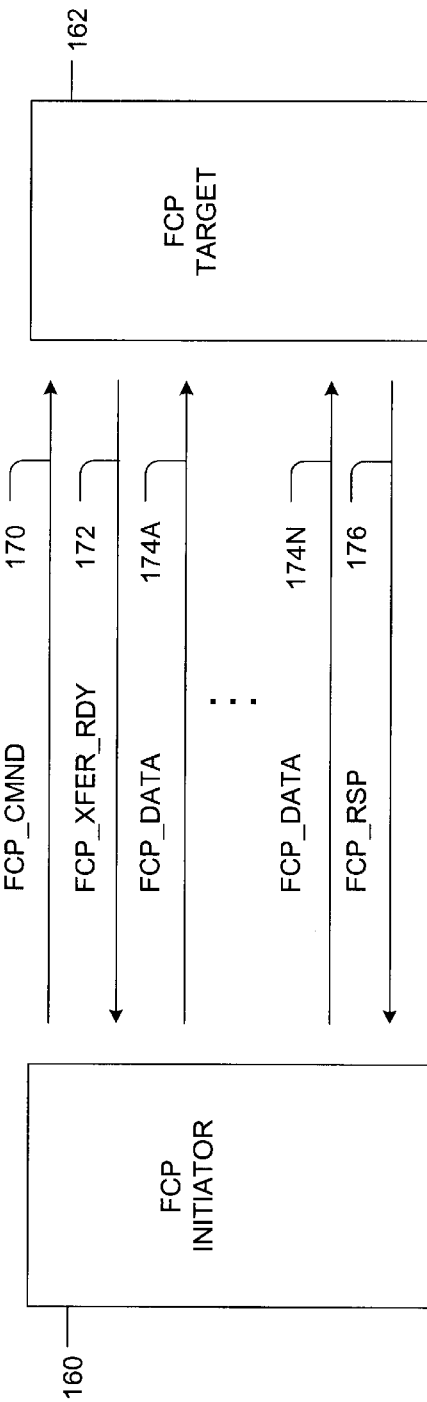

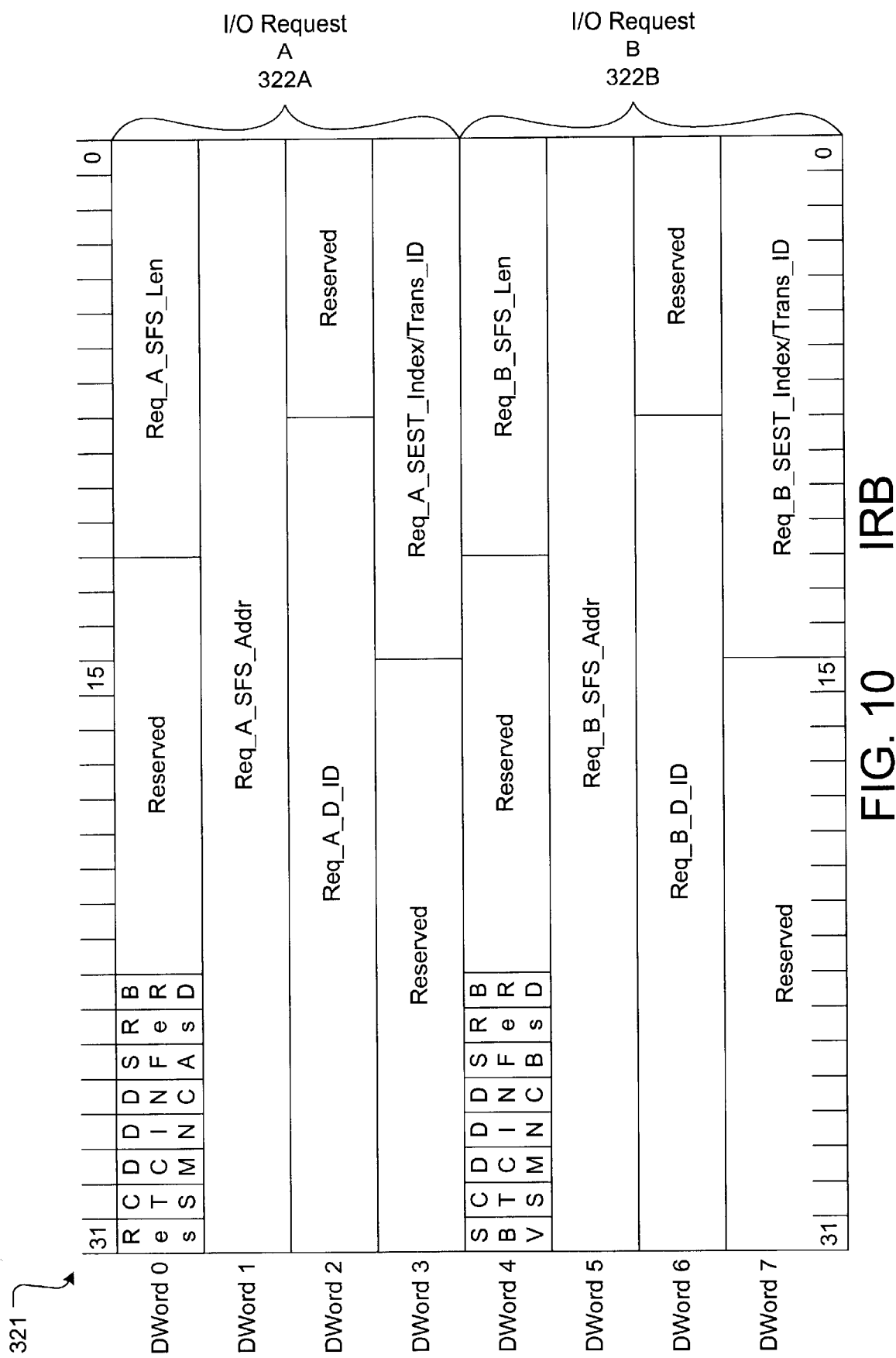

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 31 | | | | | | | | | | | | | | | 15 | | | | | | | | | | | | | | | | | 0 |
| V A L | D I R | D C N T | D I A T | R U P | C S R | Res | L N K | Res | | FL | | Reserved | | | | | | | | | | | Hdr_Len | | | | | | | | | |

DWord 0

DWord 1: Hdr_Addr

DWord 2: Remote_Node_ID | RSP_LEN

DWord 3: RSP_Addr

DWord 4: 0xF | Reserved | Buff_Off

DWord 5: L O C | Buff_Index | Link

DWord 6: Reserved | RX_ID

DWord 7: Data_Len

FIG. 11A   IWE

| | | |
|---|---|---|
| DWord 8 | Exp_RO | |
| DWord 9 | Exp_Byte_Cnt | |
| DWord A | Extended Gather List Address - Upper (EGLAU) / Local Buffer Address - Upper (LBAU) | Local Buffer Length |
| DWord B | Extended Gather List Address - Lower (EGLAL) / Local Buffer Address - Lower (LBAL) | |
| DWord C | Current GL Page Address - Upper (Cur_Page_U) / Local Buffer Address - Upper (LBAU) | Local Buffer Length |
| DWord D | Current GL Page Address - Lower (Cur_Page_L) / Local Buffer Address - Lower (LBAL) | |
| DWord E | Local Buffer Address - Upper (LBAU) | Local Buffer Length |
| DWord F | Local Buffer Address - Lower (LBAL) | |

FIG. 11B   IWE

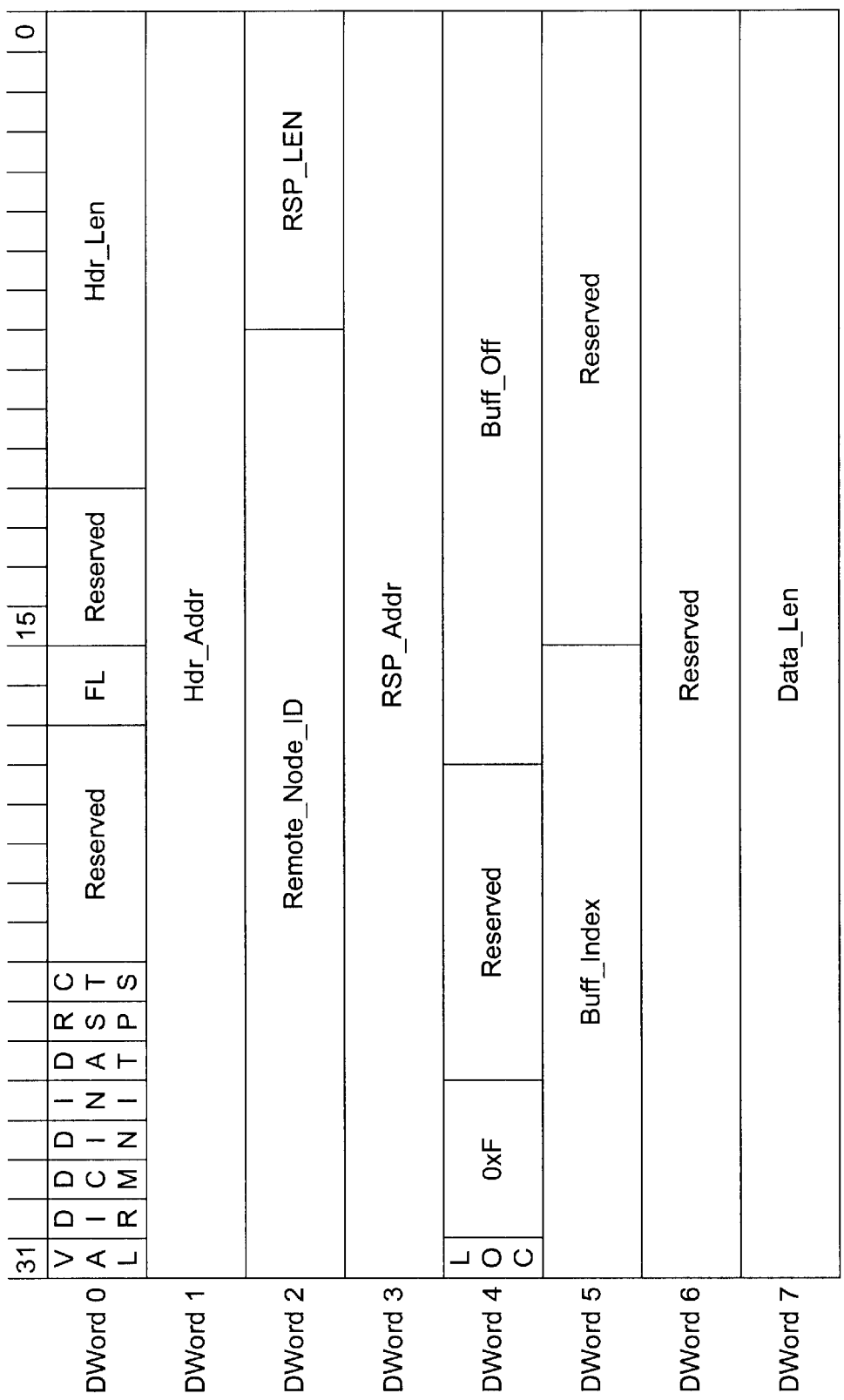
FIG. 12A  TRE

| | | |
|---|---|---|
| DWord 8 | Reserved | |
| DWord 9 | Reserved | |
| DWord A | Extended Gather List Address - Upper (EGLAU) / Local Buffer Address - Upper (LBAU) | Extended Gather List Address - Lower (EGLAL) / Local Buffer Address - Lower (LBAL) |
| DWord B | | Local Buffer Length |
| DWord C | Current GL Page Address - Upper (Cur_Page_U) / Local Buffer Address - Upper (LBAU) | Current GL Page Address - Lower (Cur_Page_L) / Local Buffer Address - Lower (LBAL) |
| DWord D | | Local Buffer Length |
| DWord E | Local Buffer Address - Upper (LBAU) | Local Buffer Address - Lower (LBAL) |
| DWord F | | Local Buffer Length |
| | 31 ... 15 | ... 0 |

FIG. 12B    TRE

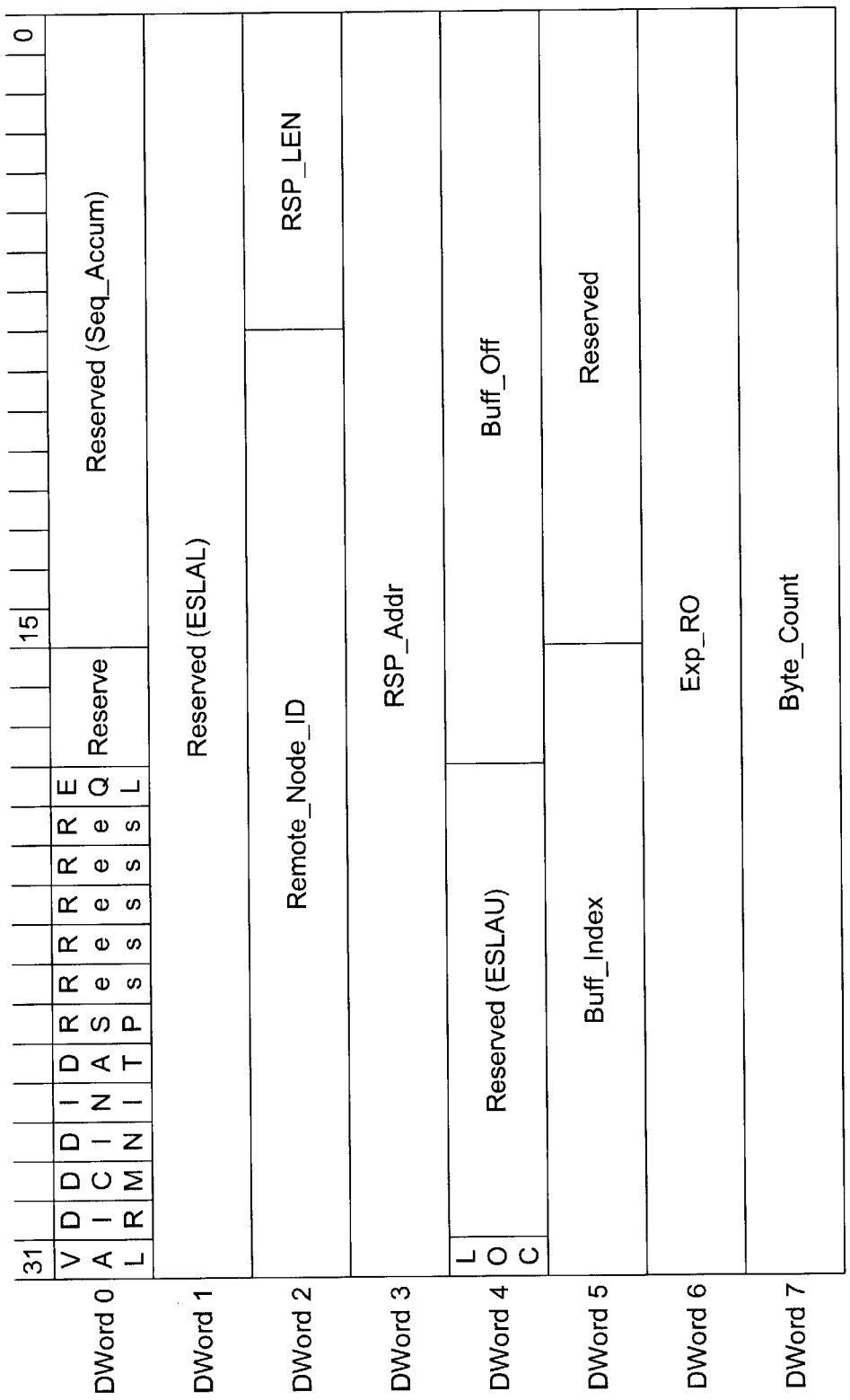
FIG. 13A   IRE

| | 31 | | 15 | | 0 |
|---|---|---|---|---|---|
| DWord 8 | Reserved | | | | |
| DWord 9 | Exp_Byte_Cnt | | Local Buffer Length | | |
| DWord A | Extended Scatter List Address - Upper (ESLAU) / Local Buffer Address - Upper (LBAU) | | | | |
| DWord B | Extended Scatter List Address - Lower (ESLAL) / Local Buffer Address - Lower (LBAL) | | | | |
| DWord C | Local Buffer Address - Upper (LBAU) | | Local Buffer Length | | |
| DWord D | Local Buffer Address - Lower (LBAL) | | | | |
| DWord E | Local Buffer Address - Upper (LBAU) | | Local Buffer Length | | |
| DWord F | Local Buffer Address - Lower (LBAL) | | | | |

FIG. 13B  IRE

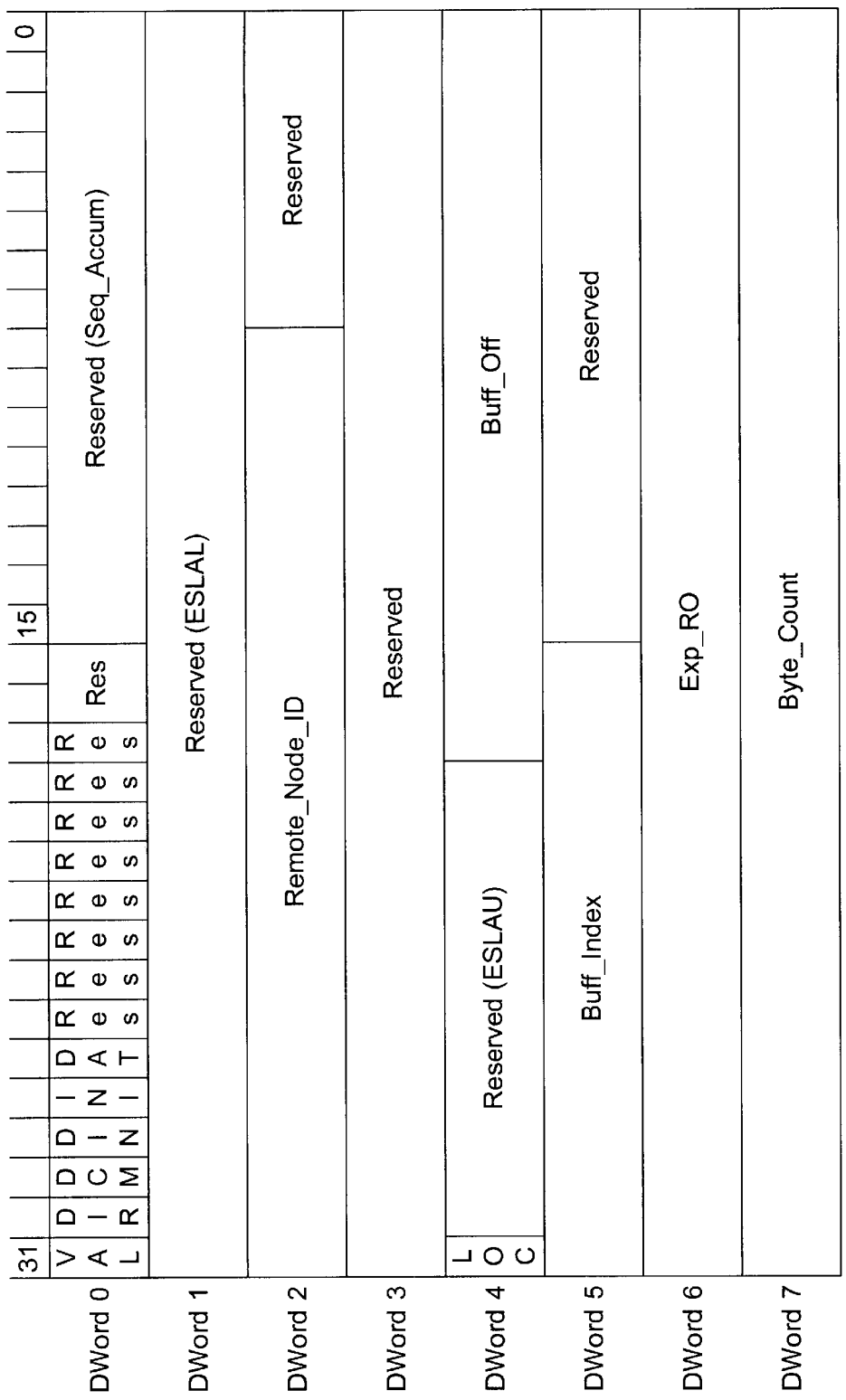
FIG. 14A  TWE

| | 31 | 15 | 0 |
|---|---|---|---|
| DWord 8 | Reserved | | |
| DWord 9 | Exp_Byte_Cnt | | |
| DWord A | Extended Scatter List Address - Upper (ESLAU) / Local Buffer Address - Upper (LBAU) | Local Buffer Length | |
| DWord B | Extended Scatter List Address - Lower (ESLAL) / Local Buffer Address - Lower (LBAL) | | |
| DWord C | Local Buffer Address - Upper (LBAU) | Local Buffer Length | |
| DWord D | Local Buffer Address - Lower (LBAL) | | |
| DWord E | Local Buffer Address - Upper (LBAU) | Local Buffer Length | |
| DWord F | Local Buffer Address - Lower (LBAL) | | |

FIG. 14B    TWE

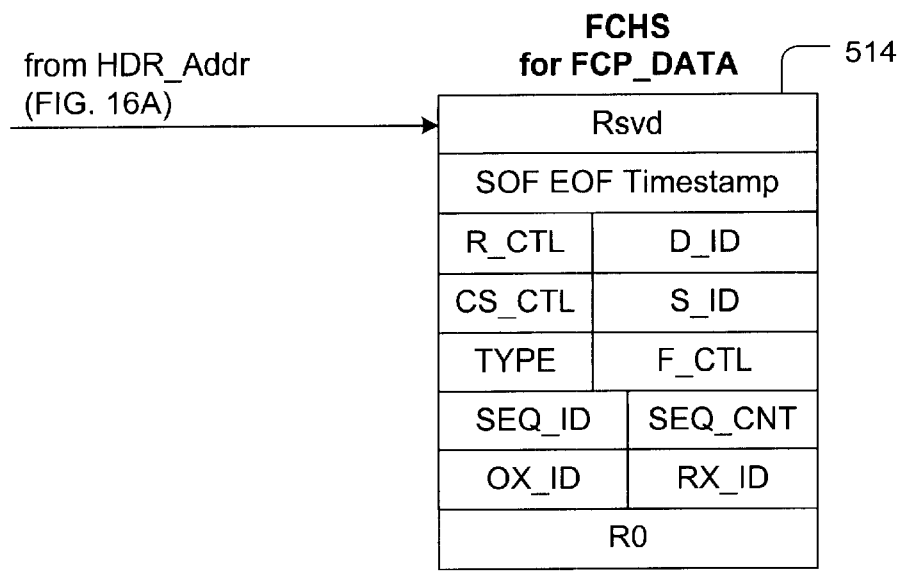
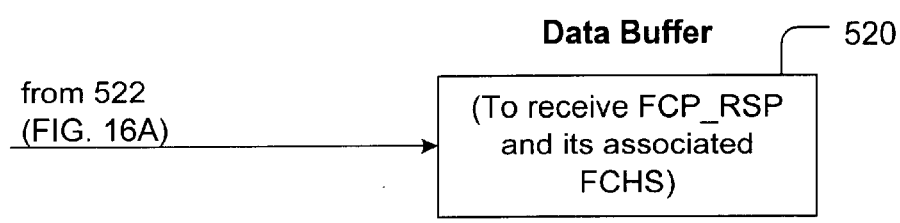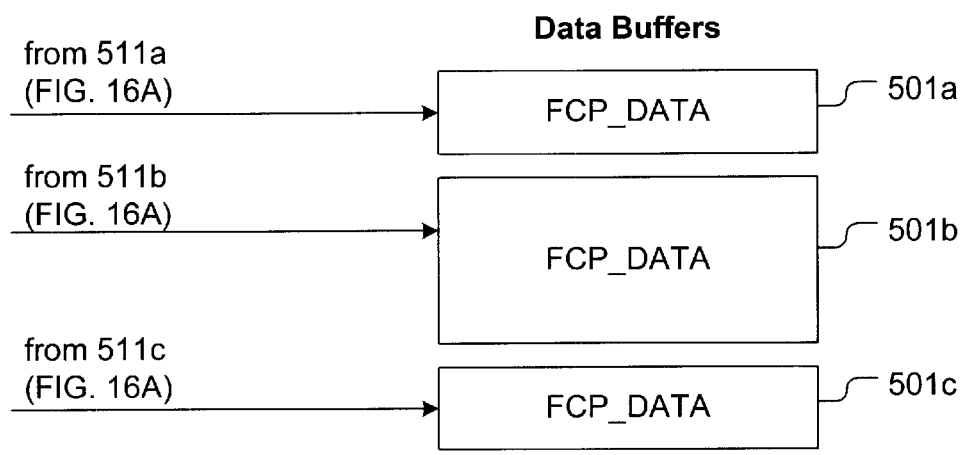
FIG. 16B

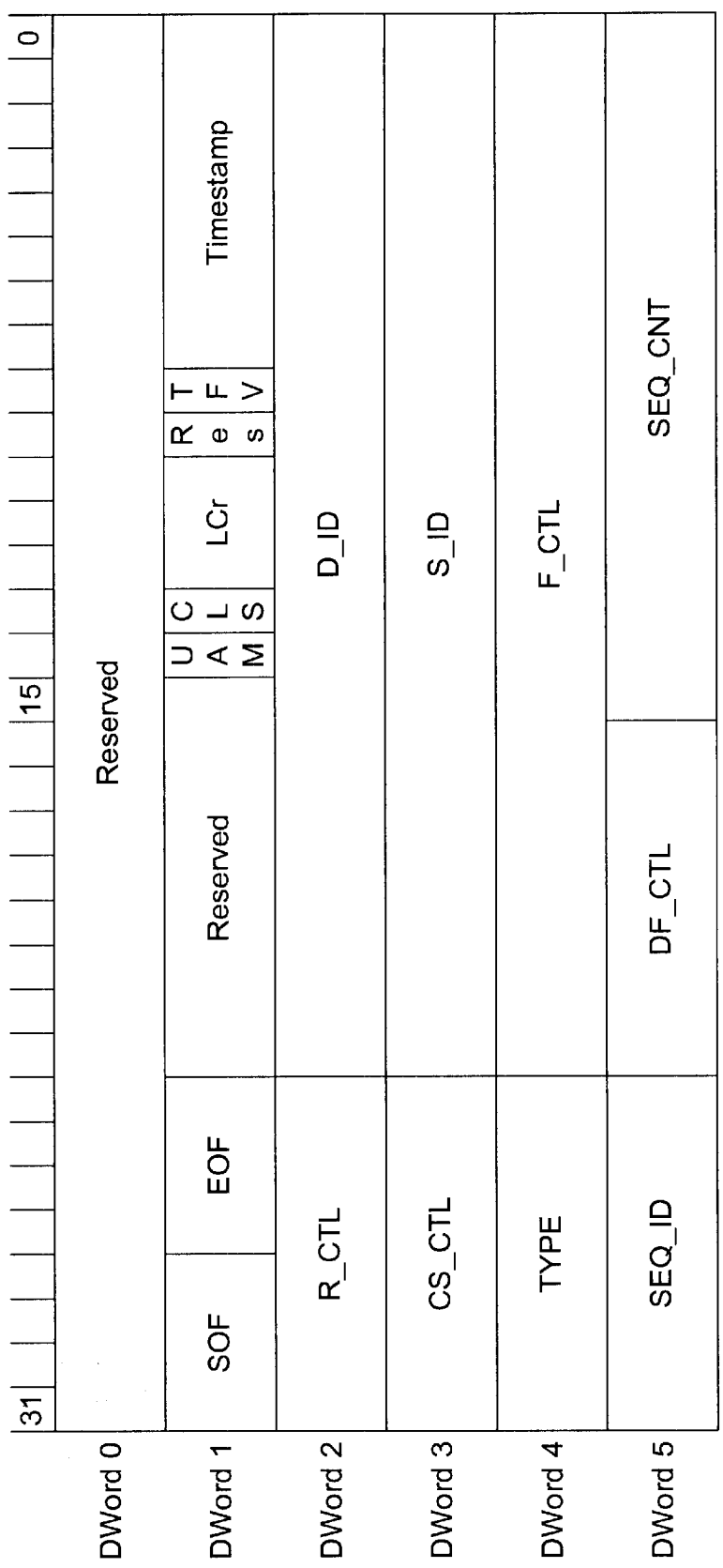
FIG. 17A  FCHS

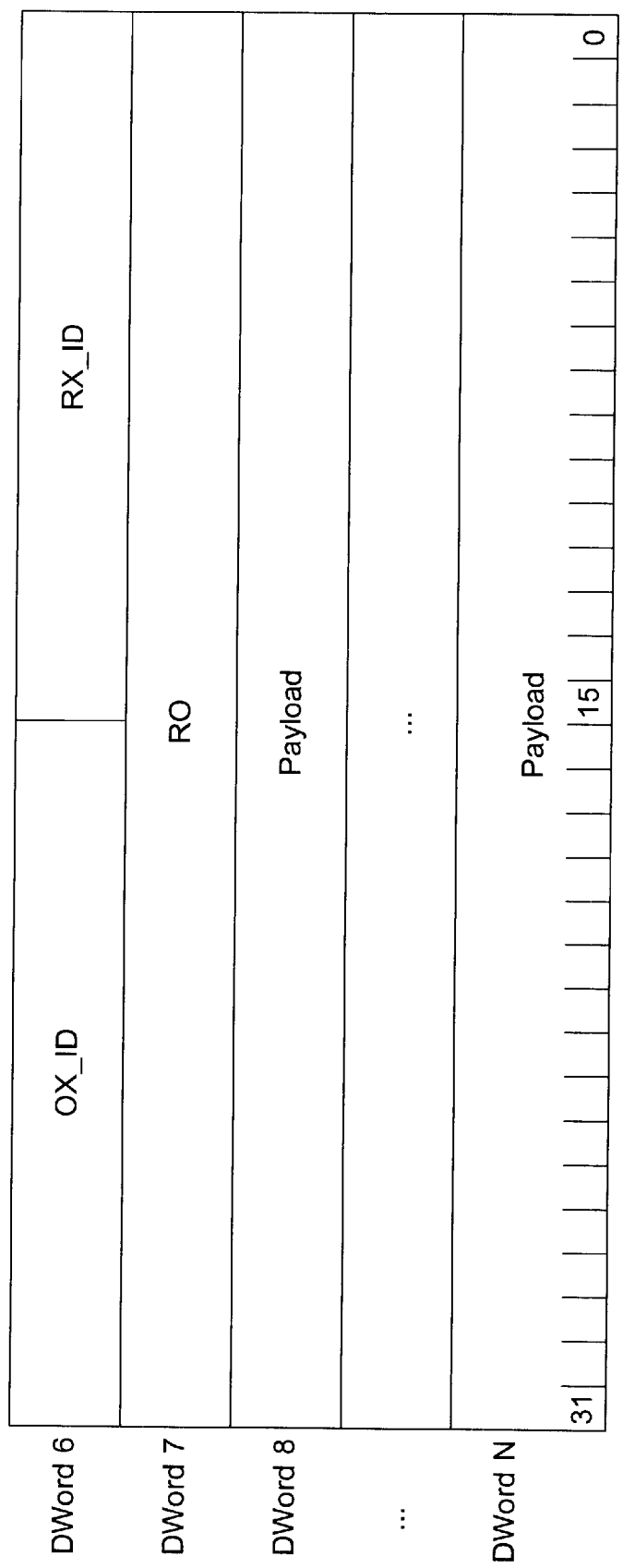
FIG. 17B  FCHS

FIG. 31A  ODB

| | 31 | | | | | | | | | | | | | | | 15 | | | | | | | | | | | | | | | 0 |
|---|---|---|---|---|---|---|---|---|---|---|---|---|---|---|---|---|---|---|---|---|---|---|---|---|---|---|---|---|---|---|---|---|
| DWord 8 | RO | | | | | | | | | | | | | | | | | | | | | | | | | | | | | | | |
| DWord 9 | S P | D P P | R P C | S P C | r e s | E | FTD | | reserved | | | | | | | | | | | | SEST Index | | | | | | | | | | | |
| DWord A | I N T | | | Extended Gather List Address – Upper (EGLAU) / Local Buffer Address – Upper (LBAU) | | | | | | | | | | | | | | Local Buffer Length | | | | | | | | | | | | | | |
| DWord B | | | | Extended Gather List Address – Lower (EGLAL) / Local Buffer Address – Lower (LBAL) | | | | | | | | | | | | | | | | | | | | | | | | | | | | |
| DWord C | I N T | | | Current GL Page Address – Upper (Cur_Page_U) / Local Buffer Address – Upper (LBAU) | | | | | | | | | | | | | | Local Buffer Length | | | | | | | | | | | | | | |
| DWord D | | | | Current GL Page Address – Lower (Cur_Page_L) / Local Buffer Address – Lower (LBAL) | | | | | | | | | | | | | | | | | | | | | | | | | | | | |
| DWord E | I N T | | | Local Buffer Address – Upper (LBAU) | | | | | | | | | | | | | | Local Buffer Length | | | | | | | | | | | | | | |
| DWord F | | | | Local Buffer Address – Lower (LBAL) | | | | | | | | | | | | | | | | | | | | | | | | | | | | |

FIG. 31B    ODB

FIBRE CHANNEL CONTROLLER HAVING BOTH INBOUND AND OUTBOUND CONTROL UNITS FOR SIMULTANEOUSLY PROCESSING BOTH MULTIPLE INBOUND AND OUTBOUND SEQUENCES

COMPUTER PROGRAM LISTING

A co-ROM containing a computer program listing appendix has been submitted and is herein incorporated by reference,. The CD-ROM contains a single ASC II text file, created on Mar. 26, 2002, 67 Kb in size.

FIELD OF THE INVENTION

The present invention relates generally to mass storage systems. More particularly, the invention relates to a fibre channel controller.

BACKGROUND OF THE INVENTION

The processing power of CPUs, and the computer systems that contain them, has continued to double on the average of every two years over the past twenty years. However, the performance of mass storage devices and computer bus interconnections between mass storage devices and CPUs has not increased at the same rate. As a result, many modem computer systems may be limited in processing speed by the speed at which data can be accessed and transported between memory and peripheral devices, such as hard disk drives. In addition, computer systems may be limited by the amount of data that they can efficiently access.

The Fibre Channel ("FC") architecture and protocol was developed in order to overcome the performance bottleneck of peripheral devices. The FC protocol is significantly faster than most existing networks, operating at transfer rates that exceed one gigabit per second in both directions simultaneously. In addition, the protocol is robust and can transport a variety of protocols, such as IP, SCSI, HIPPI and IPI.

A FC controller is an interface that enables the transfer of data between a host computer system and a fibre channel. Typically, such FC controllers include a dedicated microprocessor that coordinates the various tasks that enable the data transfer. The use of a microprocessor constrains the number of tasks that can be executed in parallel and thereby decreases the data transfer rate that can be achieved. Accordingly, a need exists for an improved FC controller that overcomes the obstacles of a serial execution stream and which achieves a faster data transfer rate.

SUMMARY OF THE INVENTION

The present invention pertains to a FC controller that interfaces between a host system and a 10-bit FC interface. The FC controller has the capacity to act as both a fibre channel protocol (FCP) initiator and a FCP target device. As a FCP initiator, the FC controller initiates SCSI I/O requests to a number of devices at the request of a host system. As a FCP target, the FC controller receives SCSI I/O requests from devices linked through the FC.

The FC controller can process both an inbound and outbound sequence simultaneously since it does not employ a processor-based architecture. Rather the FC controller relies on specialized circuitry that operates in a relatively independent manner so that multiple tasks are performed simultaneously thereby achieving a faster throughput and a higher data transfer rate.

A SCSI I/O request can be viewed as a FCP exchange having one or more sequences. A FCP exchange can consist of any number of inbound and/or outbound sequences. An outbound sequence transmits a command, data, and/or response phase to an initiator or target device and an inbound sequence receives a command, data, and/or response phase from an initiator or target device. A sequence can be composed of one or more frames which is the basic data unit in the FC protocol.

The host system and the FC controller communicate through an interface that includes a number of data structures and a protocol specifying how the data structures are interpreted. The data structures can include an exchange request queue (ERQ) that is used by the host system to initiate SCSI I/O requests, and a SCSI exchange state table (SEST). A SEST entry includes the information needed to process a SCSI I/O request and which indicates where to retrieve or store the incoming data and/or response. In addition, status information, in the form of a completion message, is posted in an inbound message queue (IMQ).

An initiator can send the target host system a SCSI I/O request which is received by the FC controller and stored in a single frame queue (SFQ). The host system then responds to the request by initiating the appropriate SCSI I/O request which is placed in the ERQ and by placing the necessary information to process the request in the SEST.

The FC controller includes an outbound control unit that performs those tasks needed to map a SCSI I/O request into one or more outbound sequences. In addition, the FC controller includes an inbound control unit that performs those tasks needed to process an inbound sequence or to map it to a SCSI I/O request. In addition, the inbound control unit may generate any additional outbound sequences that are needed to complete an exchange.

The outbound control unit can include an outbound sequence and exchange management unit, an outbound frame buffer unit, and an outbound frame engine. The outbound sequence and exchange management unit receives SCSI I/O requests, maps them into one or more outbound sequences, and assembles the corresponding frames in the outbound frame buffer unit. The outbound frames are encoded with cyclic redundancy check (CRC) data and converted into 10-bit characters by the outbound frame engine for transmission over the fibre channel. The outbound frame buffer unit is dual-ported so that frames can be assembled into the buffer unit simultaneously as they are read out of it.

The outbound sequence and exchange management unit can include an ERQ manager unit, a SCSI exchange manager outbound unit (SEM-OUT) and an outbound sequence manager unit (OSM). The ERQ manager unit retrieves host-initiated I/O requests that are stored in the ERQ and places them into the SEM-OUT unit. The SEM-OUT unit receives notice of pending outbound sequences from both the ERQ manager unit and a SEST link fetch manager unit (LFM). The SEM-OUT unit obtains the associated SEST entry for the pending outbound sequence and constructs an intermediate data structure referred to as an outbound descriptor block (ODB) to represent the requisite information needed to execute the outbound sequence. The ODB is then transmitted to the OSM. The OSM uses the ODB to assemble the data needed for the frames that correspond to the outbound sequence in the outbound frame buffer unit.

The inbound control unit includes an inbound fibre engine, an inbound frame buffer unit, and an inbound sequence and exchange management unit. The inbound fibre engine receives the inbound data which is encoded and converted into 8-bit bytes and stored in the inbound frame buffer unit.

The inbound sequence and exchange management unit processes the inbound frames. The unit stores the inbound data in a predetermined location indicated by the SEST and stores the inbound frames representing SCSI I/O requests initiated by another initiator device (otherwise known as unassisted frames) in the SFQ. Some inbound frames may indicate that an additional outbound sequence is warranted and as such the unit initiates the outbound sequence through the LFM. In addition, completion messages are generated for those frames that represent the end of a sequence and the end of an exchange.

The inbound sequence and exchange management unit includes an inbound data manager (IDM), a completion message channel (CMC), a fibre channel services unit (FCS), and a SCSI exchange manager inbound unit (SEM-IN). The IDM receives the inbound frames from the inbound frame buffer unit and enlists the assistance of the CMC, FCS, and SEM-IN units to process the frame data. The FCS unit processes the unassisted, bad, or unknown frames by indicating to the IDM the SFQ entry to store such frames. The SEM-IN unit assists the IDM in processing all other frames. The SEM-IN unit uses the LFM to obtain the associated SEST entry. The SEM-IN unit, in turn, interprets the SEST entry in order to instruct the IDM where to store the frame and/or its associated data. In addition, the SEM-IN unit notifies the LFM of any additional outbound sequences that need to be initiated in order to complete an outstanding exchange. The CMC unit is used to inform the IDM of an available IMQ entry that the IDM uses to store completion messages when a sequence and/or exchange is completed.

The outbound and the inbound control units are constructed such that they can operate relatively independent of each other. In addition, the components in each of the inbound and outbound control units are structured such that as many tasks as possible are performed concurrently in each component. In this manner, multiple I/O requests can be serviced concurrently thereby increasing the throughput and data transfer rate of the FC controller.

BRIEF DESCRIPTION OF THE DRAWINGS

For a better understanding of the nature and objects of the invention, reference should be made to the following detailed description taken in conjunction with the accompanying drawings, in which:

FIGS. 3A–3B illustrate the command, data, and response phases of a fibre channel protocol (FCP) read and write operation.

FIG. 10 illustrates the data format of an IRB.

FIG. 11 illustrates the data format of an IWE.

FIG. 12 illustrates the data format of a TRE.

FIG. 13 illustrates the data format of an IRE.

FIG. 14 illustrates the data format of a TWE.

FIG. 17 illustrates the data format of a Fibre Channel Header Structure (FCHS).

Like reference numerals refer to corresponding parts throughout the several views of the drawings.

DETAILED DESCRIPTION OF THE INVENTION

Overview of Fibre Channel

Fibre channel is a standard consisting of an architecture and protocol that defines a high-speed communications interface that can be used to link various devices, such as workstations, mainframes, supercomputers, mass storage systems, peripheral devices, and the like. The physical media utilized in the fibre channel interconnect can consist of coaxial cables, optical fibres, or shielded twisted pair connections. Data is transferred one bit at a time at extremely high data transfer rates from 133 MB/sec. up to 1062 MB/sec.

Devices in the fibre channel architecture are called nodes and each node has at least one port that provides for the transfer of data in and out of the node. The components that connect two or more ports are considered a topology. One such topology is an arbitrated loop and another is the switched topology, both of which are described in more detail below.

Figure 1A:
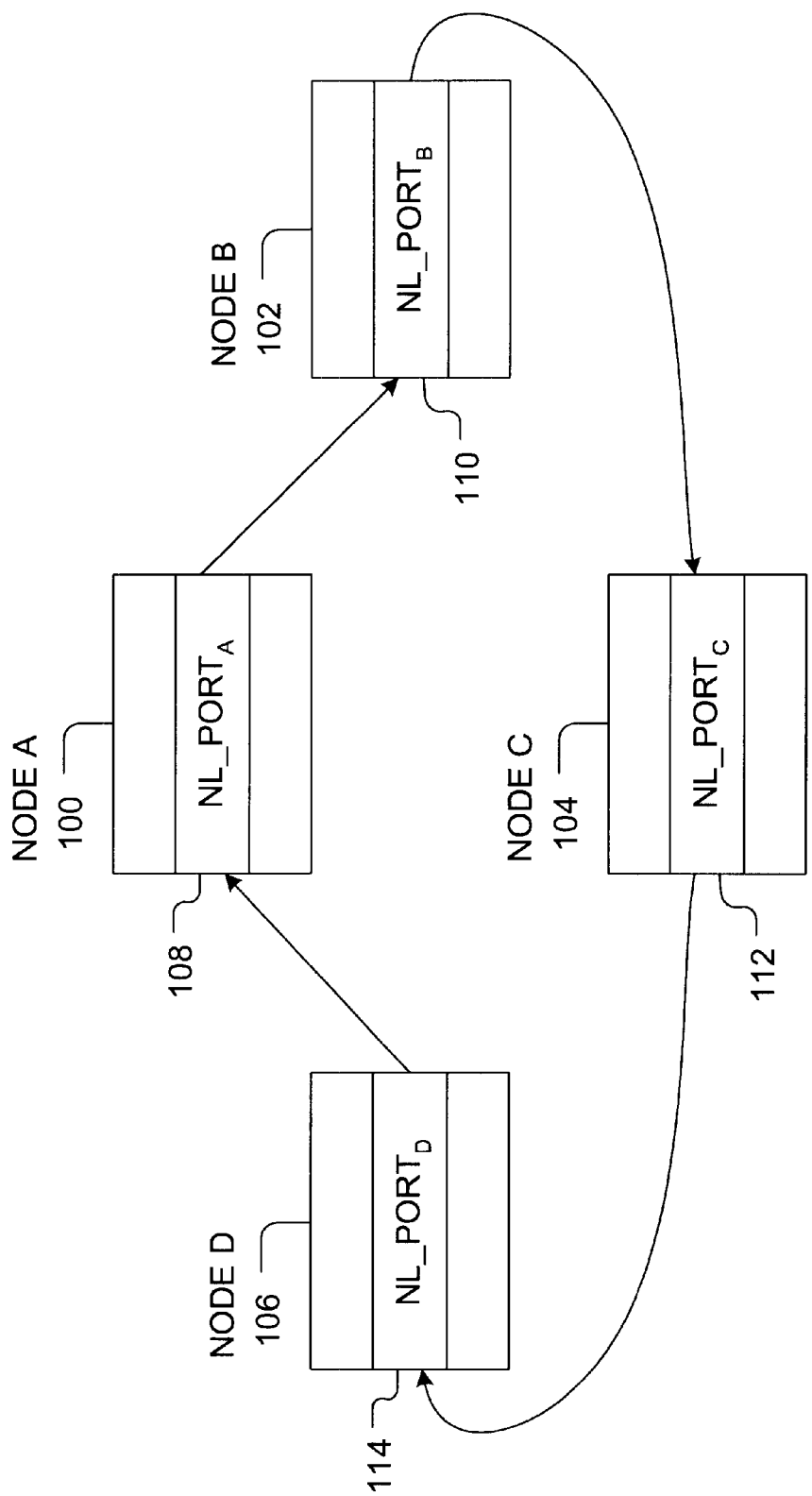
FIG. 1A illustrates a number of peripheral devices configured in an arbitrated loop topology.

FIG. 1A illustrates an exemplary arbitrated loop topology. There is shown four devices called node A 100, node B 102, node C 104, and node D 106. Each node 100–106 has a respective port 108, 110, 112, 114, denoted as NL_PORT. Each port 108–114 can act as an initiator that transmits commands, act as a target responding to commands from the initiator, or both, since each port has a transmitter and a receiver. Each of the ports 100–106 is connected in a serial or loop manner and sees all messages that are transmitted within the loop. Each port 100–106 accepts those messages that are addressed to the port and transfers and ignores those messages not addressed to it.

Figure 1B:
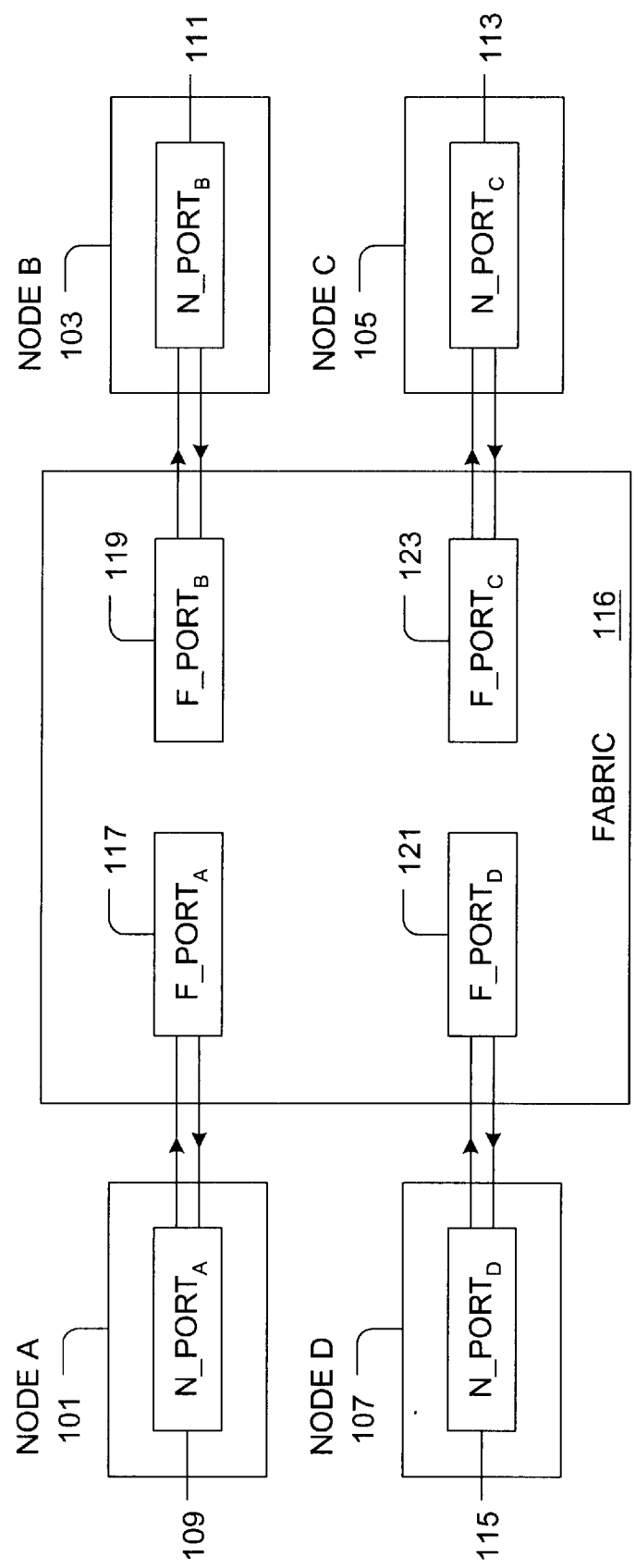
FIG. 1B illustrates a number of peripheral devices configured in a fabric topology.

FIG. 1B illustrates an exemplary fabric topology. There is shown four devices referred to as node A 101, node B 103, node C 105, node D 107 and a fabric 116. Each node 101–107 has a respective port 109–115 denoted as N_PORT. Each port in the fabric 116 is referred to as a F_PORT. Each port 109–115 is attached to the fabric 116 through a dedicated link. The fabric contains various paths (not shown) that transmit data between the various fabric ports. One such type of fabric is a switched topology or cross-point switch topology that contains switched-based data paths within the fabric to connect the various fabric ports. The frames are routed through the various switches based on a destination address identifier.

The fibre channel protocol transmits data in units called frames. A sequence is a collection of frames that are associated with a single operation and which flow in the same direction on the link. Each frame associated with a particular sequence includes a common sequence identifier (Sequence_ID). Since a sequence can be a variable length, a node may not be able to send the entire sequence at once, and hence, the sequence is partitioned into several frames.

An exchange defines an I/O transaction that is exchanged between two nodes. An exchange can consist of several phases where each phase is a separate sequence. For example, an exchange may consist of a command phase, a data phase, and a status phase. Each phase is a separate sequence and all of the sequences collectively form an exchange.

Figure 2:
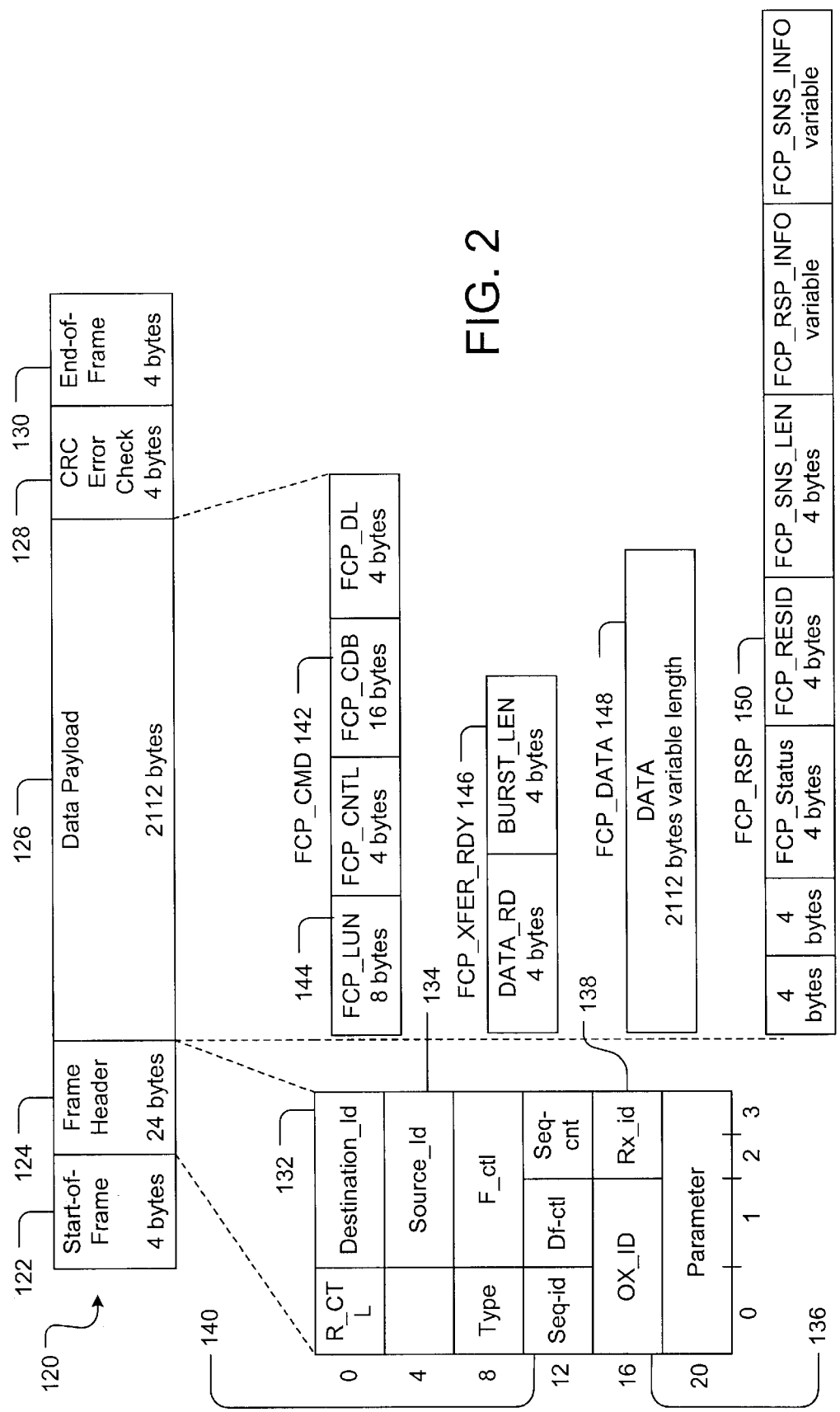
FIG. 2 depicts a data format for a FC frame.

FIG. 2 illustrates the structure of a frame 120. Each frame 120 includes a 4-byte start-of-frame delimiter 122, a 24-byte frame header 124, a 2112-byte variable-length payload 126, a 4-byte Cyclic Redundancy Check (CRC) 128, and a 4-byte end-of-frame delimiter 130. The start-of-frame delimiter 122 marks the beginning of the frame 120. The frame header 124 contains addressing information, sequence information, exchange information, and various control flags. A more detailed view of the frame header 124 is shown expanded from the FC frame 120 in FIG. 2.

The destination identifier, or Destination_Id 132, is a 24-bit FC address indicating the destination FC port for the frame. The Source_Id 134 is a 24-bit address that indicates the FC port that transmitted the frame. The originator identifier, or OX_ID 136, and the responder identifier, or RX_ID 138, together compose a 32-bit exchange identifier that identifies the exchange to which the frame belongs with respect to the initiator and target FC ports. The sequence identifier, or Seq_Id 140, identifies the sequence to which the frame belongs.

The data payload 126 contains the actual data packaged within the FC frame 120. This data can be formatted according to four basic types of data payload layouts. The first of these formats, called the FCP_CMND 142 is used to send a SCSI command from an initiator to a target. The FCP_LUN field 144 comprises a 8-byte address that may, in certain implementations, specify a particular SCSI-bus adapter, a target device associated with that SCSI-bus adapter, and a LUN corresponding to a logical device associated with the specified target SCSI device that together represent the target for the FCP_CMD. In other implementations, the FCP_LUN field 144 contains an index or reference number that can be used by the target FC host adapter to determine the SCSI-bus adapter, a target device associated with that SCSI-bus adapter, and a LUN corresponding to a logical device associated with the specified target SCSI device.

The second type of data payload format shown in FIG. 2 is called the FCP_XFER_RDY layout 146. This data payload format is used to transfer a proceed command from the target to the initiator when the target is prepared to begin receiving or sending data. The third type of payload format shown in FIG. 2 is the FCP_DATA format 148, used for transferring the actual data that is being read or written as a result of execution of an I/O transaction. The final data payload format that is shown in FIG. 2 is called the FCP_RSP layout 150, which is used to transfer the SCSI status byte, as well as other FCP status information, from the target back to the initiator upon completion of the I/O transaction.

The fibre channel standard provides a transport mechanism that can be utilized by various channel and network protocols. Once such protocol is the Small Computer System Interface (SCSI). The fibre channel protocol ("FCP") for SCSI defines the manner in which a SCSI I/O transaction maps into a FC exchange. Within this protocol, the device that initiates a SCSI I/O transaction is considered the FCP initiator device or initiator and the recipient of the transaction is considered the FCP target device or target.

Each SCSI I/O operation is converted into a separate FC exchange that consists of a command phase, a data phase, and a status phase. Each phase can consist of one or more sequences. The FCP initiator uses the command phase to inform the FCP target of an I/O operation by transmitting a single frame SCSI command sequence (FCP_CMND) that includes information on the I/O operation. Once the target device processes the FCP_CMND, the data phase begins, if warranted. Otherwise, the status phase is initiated.

In the data phase, the FCP target sends a Transfer Ready (FCP_XFER_RDY) sequence when the target is ready. In the case of a FCP initiator read exchange, the Transfer Ready is optional. The FCP target then either transmits or receives data via a data sequence (FCP_DATA). The data sequence can consist of one or more frames.

Once the data phase completes, the status phase commences. The target sends a single frame SCSI Status Sequence (FCP_RSP) indicating the status of the transaction. The transaction is considered complete and the exchange is considered terminated when the initiator processes this sequence.

FIG. 3A illustrates an exemplary FCP read operation whereby the FCP initiator 160 receives read data from the FCP target 162. This FCP exchange consists of a command phase, several data phases, and a status phase. In the command phase, the target receives the FCP_CMND sequence 164 and allocates resources for the read operation. Next, the target 162 transmits the data. If the data is larger than a frame, the sequence is partitioned and transmitted as multiple frames (FCP_DATA) 166A–166N. Upon completion of the data transfer, the target 162 sends an FCP_RSP sequence 168 to the initiator 160 thereby completing the exchange and the FCP read operation.

FIG. 3B illustrates an exemplary FCP write operation. The FCP initiator 160 transmits an FCP_CMND sequence 170 to the FCP target 162 for the write operation. The FCP target 162, in turn, allocates resources and transmits an FCP_XFER_RDY sequence 172 to the FCP initiator 160. In response to the FCP_XFER_RDY sequence 172, the FCP initiator 160 transmits the data as an FCP_DATA sequence 174. If the data is larger than a frame, the sequence is partitioned into several frames and sent as multiple FCP_DATA frames 174A–174N. Once the data phase is completed, the FCP target 162 sends an FCP_RSP sequence 176 to the FCP initiator 160 indicating the status of the write operation and completing the exchange.

The foregoing description presented an overview of the fibre channel architecture and protocol. A further discussion on the fibre channel standard can be found in Ancot Corporation, *WHAT IS FIBRE CHANNEL?*, 4$^{th}$ edition (1997), The Fibre Channel Association, *FIBRE CHANNEL CONNECTION TO THE FUTURE*, (1994), American National Standard for Information Technology, *FIBRE CHANNEL ARBITRATED Loop* (FC-AL-2), Rev 6.4 (http:I/www.t11.org), American National Standard for Information Technology, *FIBRE CHANNEL PHYSICAL INTERFACE STANDARD*, #X3.230-1994, Rev. 4.3, each of which are hereby incorporated by reference as background information. Attention now turns to a description of the fibre channel controller and in particular some of the system applications that can utilize the FC controller.

System Architecture

Figure 4:
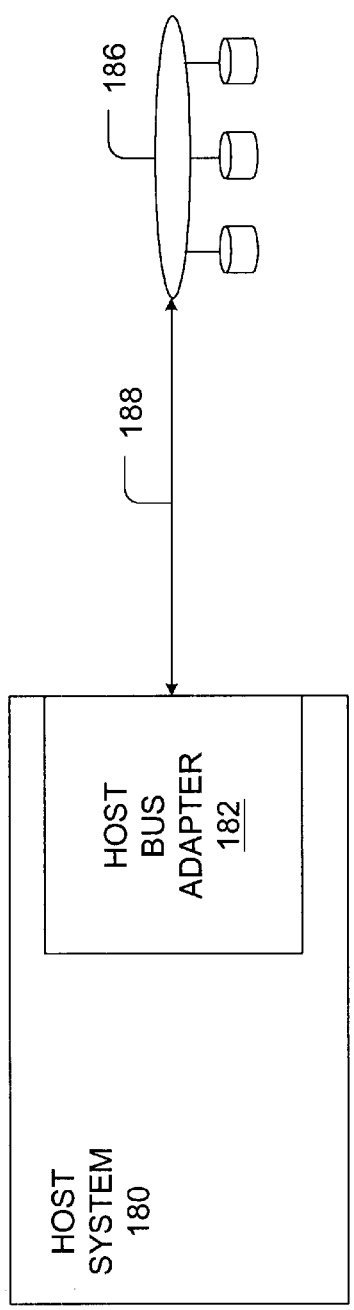
FIGS. 4–5 depict a host bus adapter unit utilizing the FC controller in one embodiment of the present invention.
Figure 5:
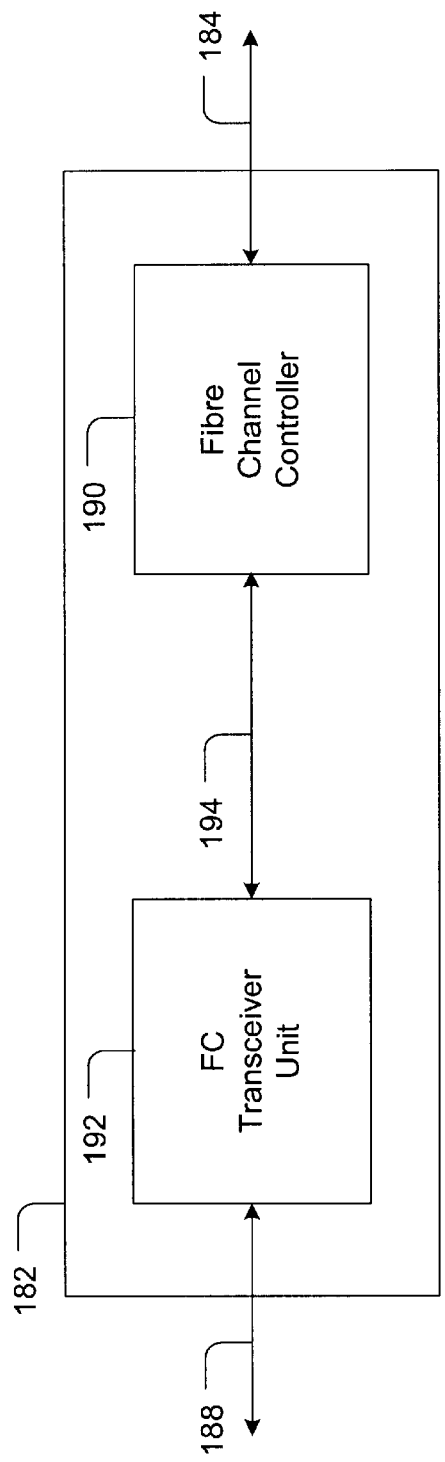
Figure 6:
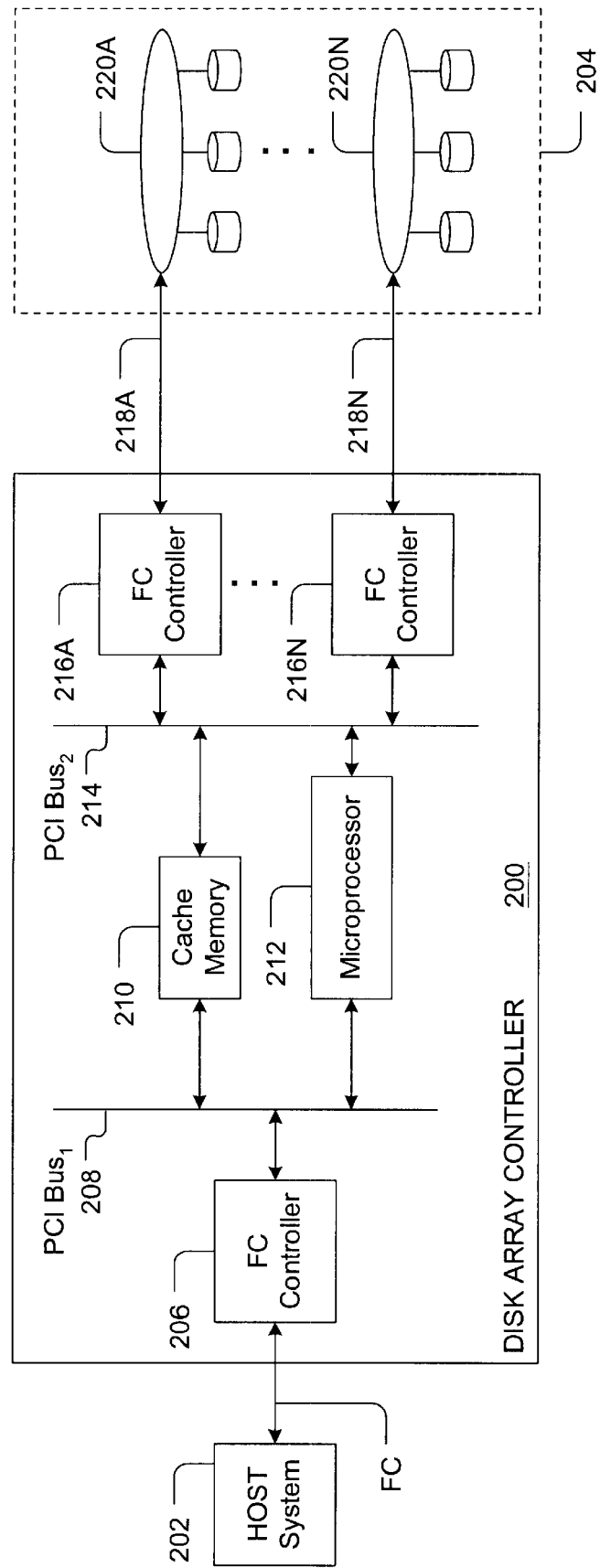
FIG. 6 depicts a disk array controller utilizing the FC controller in a second embodiment of the present invention.

The fibre channel controller of the present invention interfaces between a host system and a high-speed data link. In a first embodiment of the fibre channel controller, the controller is an interface between a host system bus, such as a PCI bus, and the fibre channel 10-bit interface. In this embodiment, the controller can be used in a host bus adapter board, as shown in FIGS. 4–5, and in a disk array controller, as shown in FIG. 6. It should be noted that the present invention is not limited to these two particular applications and can be used in any application that interfaces between a host system and a high-speed data link.

Referring to FIGS. 4–5, there is shown a host system 180 including a host bus adapter 182. The host system 180 can be any type of computer system including, but not limited to, mainframes, servers, workstations, portable computers, and the like. The host bus adapter 182 interfaces between a peripheral bus 184 and a number of peripheral devices 186 through a FC 188. The peripheral devices can include, but are not limited to, disk drives, tape drives, CD ROM drives, scanners, and the like.

FIG. 5 illustrates the components of the host bus adapter 182. There is shown a fibre channel controller 190 coupled to the PCI bus 184 and a FC transceiver unit 192 through a FC 10-bit interface 194. The FC transceiver unit 192 accepts the 10-bit wide data and multiplexes this data into a high-speed serial FC data stream 188. The FC transceiver unit 192 can be any commercially available FC transceiver, such as the HPDMP-1536A or HPDMP-1546A transceiver chips which are manufactured by the Hewlett-Packard Company.

FIG. 6 illustrates the use of the fibre channel controller in a disk array controller 200. The disk array controller 200 interfaces between a host system 202 and a mass storage system 204 and services I/O requests from the host system 202 and the mass storage system 204. The disk array controller 200 includes a first FC controller 206 connected through a first PCI bus 208 to a cache memory 210 and a microprocessor 212. The cache memory 210 and the microprocessor 212 are connected through the second PCI bus 214 to one or more FC controllers 216A–216N that interface to the mass storage system 204 through a respective fibre channel 218A–218N. The mass storage system 204 can include one or more sets of peripheral devices 220A–220N configured in a FC arbitrated loop or switched topology.

FC controllers 216A–216N act as initiators accepting commands from the microprocessor 212 and transmitting them to the respective target peripheral device. FC controller 206 acts as a target receiving commands from the host system 202 which are processed by the microprocessor 212. In response to the commands received from FC controller 206, the microprocessor 212 can initiate commands to the mass storage system 204 through FC controllers 216A–216N.

The foregoing description has described two exemplary applications of the FC controller. However, the FC controller is not constrained to these applications and can be used in any environment that interfaces between a system peripheral bus, such as the PCI bus and a high-speed data link, such as a fibre channel. Attention now turns to a description of the interface between a host system and the FC controller.

Host/Controller Interface Data Structures

Figure 7:
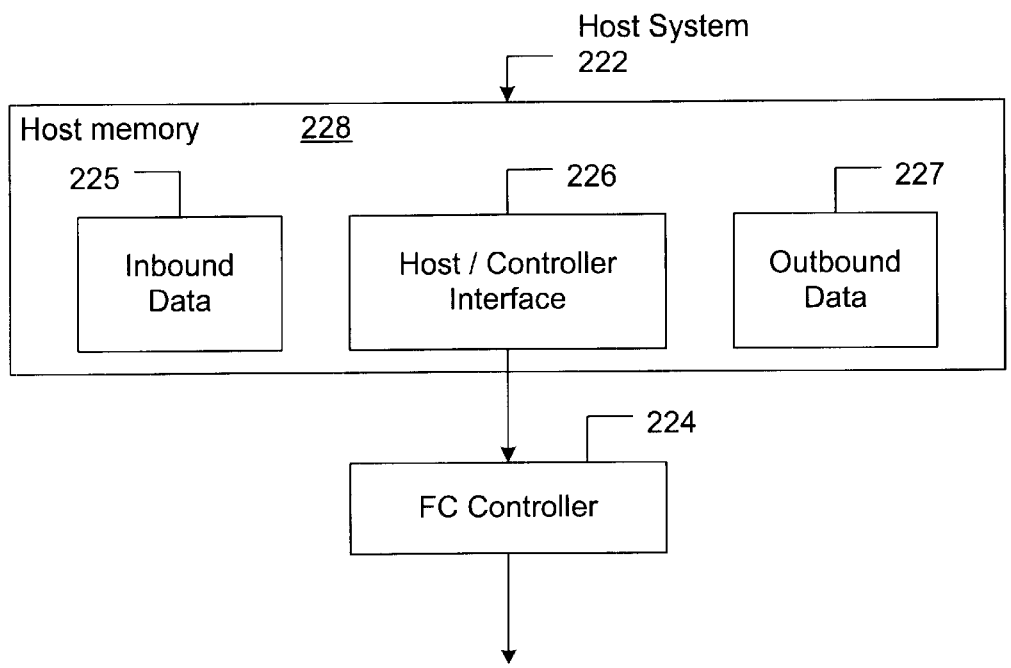
FIG. 7 illustrates the interface between a host system and the FC controller.
Figure 8:
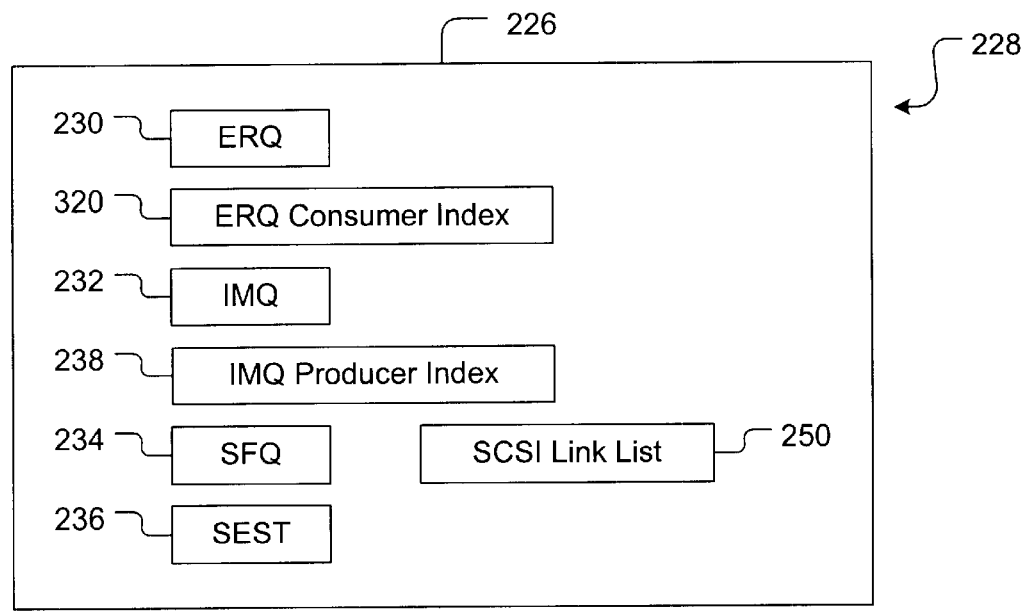
FIG. 8 illustrates the host system data structures residing in the host memory.

The host system 222 and the FC controller 224 communicate through the host/controller interface 226 as shown in FIGS. 7–8. The host/controller interface 226 includes a number of data structures that can be stored in the host memory 228 and which can be accessed by both the host system 222 and the FC controller 224. In addition, the host memory 228 stores the outbound data 227 that is transmitted through the fibre channel and the inbound data 225 that is received from the fibre channel.

Referring to FIG. 8, the host/controller interface 226 can include an exchange request queue (ERQ) 230, an inbound message queue (IMQ) 232, a single frame queue (SFQ) 234, and a SCSI exchange state table (SEST) 236. The ERQ 230 is used by the host system 222 to initiate all I/O requests, the IMQ 232 is used by the FC controller 224 to send messages to the host system 222, and the SFQ 234 is used by the FC controller 224 to send inbound or unassisted frames to the host system 222. The SEST 236 is an array that is used to provide information to the FC controller 224 pertaining to one or more I/O requests.

The ERQ 230, the IMQ 232, and the SFQ 234 are implemented as circular queues. A circular queue is a first-in-first-out queue that is logically represented in a circular fashion, such as the depiction of the circular queue 270 at the top of FIG. 9A. Circular queues consist of four parts: the queue, which is described by a base memory location; the length of the queue; a producer index; and a consumer index.

Figure 9A:
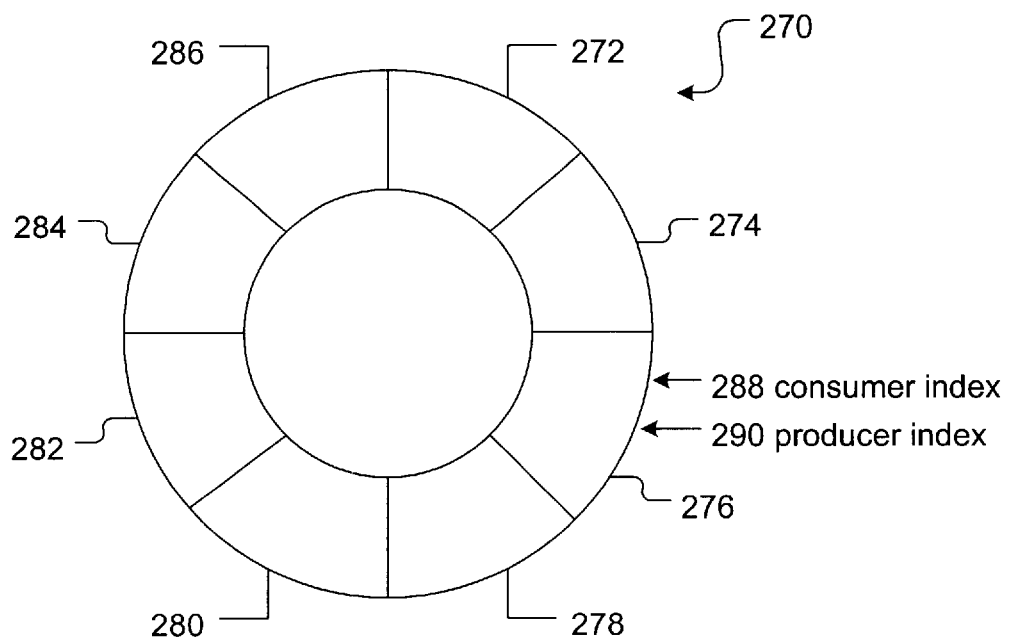
FIGS. 9A–9D are exemplary circular queues.

The queue consists of radial sections 272–286, or slots, that contain space for a queue entry, essentially a record-like data structure containing one or more data fields. The circular queue 270 in FIG. 9A is shown with 8 queue entry slots 272–286 although, in practice, a circular queue may have may tens of hundreds of queue entries.

A circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 270, in which all the queue entry slots are available for placement of data by a producer and in which none of the queue entry slots contain valid queue entries to be consumed, both the consumer index 288 and the producer index 290 point to the same empty queue entry slot 276.

Figure 9B:
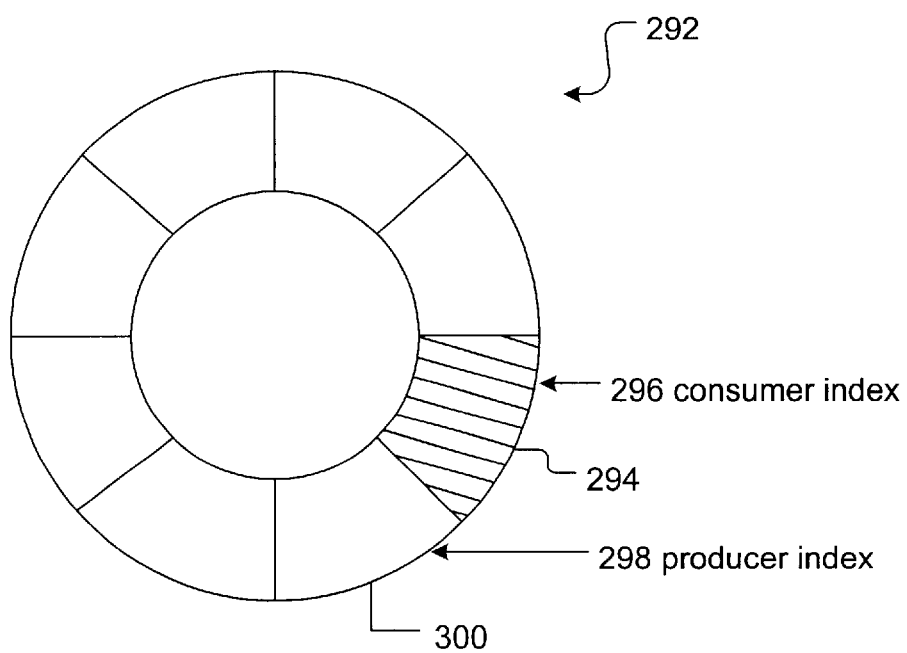
Figure 9C:
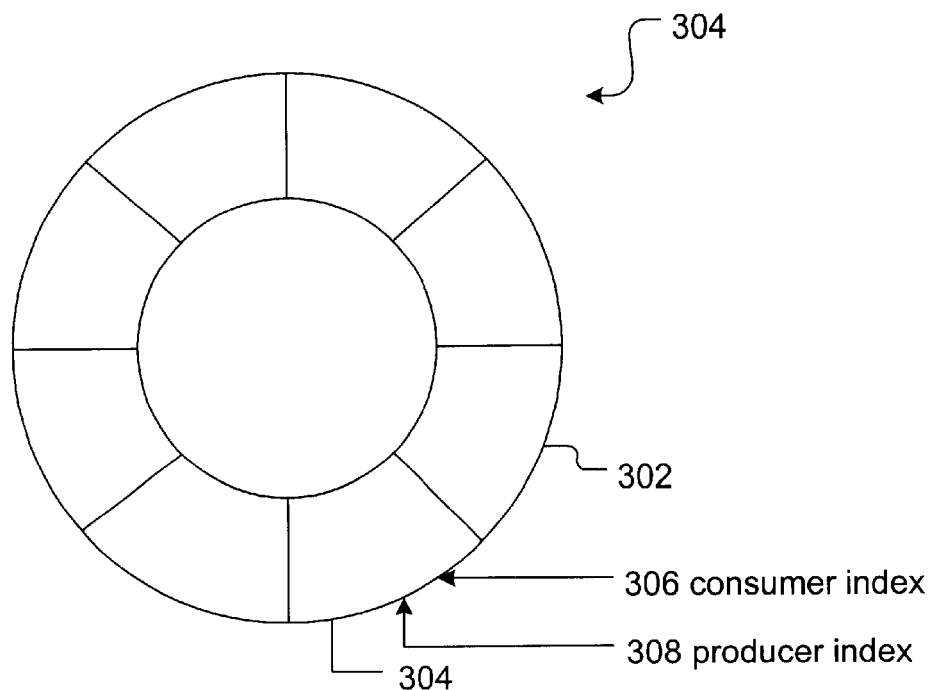
Figure 9D:
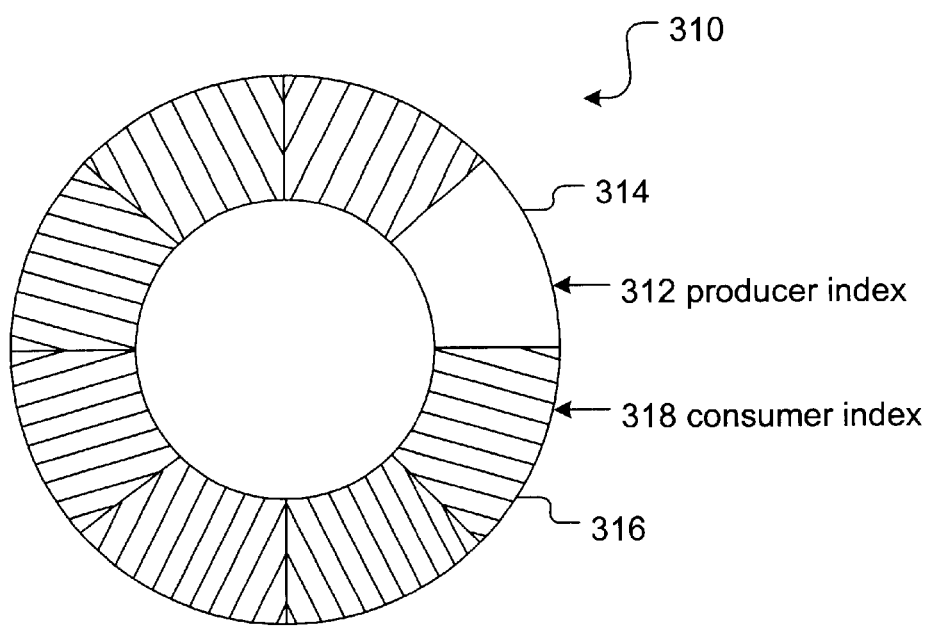

When a producer adds a queue entry to an empty circular queue 270, a circular queue 292 with one valid queue entry 294 is produced as is shown in FIG. 9B. The consumer index 296 is not changed, as a result of which the consumer index 296 points to the single valid queue entry 294 in the circular queue 292. After the producer inserts the queue entry 294, the producer increments the producer index 298 to point to the next available slot 300 within the circular queue 292 into which the producer can add a second queue entry.

If the consumer now removes the single queue entry 302, an empty circular queue 304 is produced. When the consumer has removed the available queue entry 302, the consumer increments the consumer index 306. As in the previous depiction of an empty circular queue 270, the empty circular queue 304 produced by removing the single queue entry 302 has both the consumer index 306 and the producer index 308 pointing to the same empty, available queue entry slot 304. If a producer successively adds queue entries at a faster rate than a consumer can consume them, a full circular queue 310 will eventually be produced. In a full circular queue 310, the producer index 312 points to a single empty queue entry slot 314 within the circular queue 310 that immediately precedes the first available valid queue entry 316 pointed to by the consumer index 318.

It should be noted that the present invention is not constrained to the use of circular queues to implement the ERQ 230, IMQ 232, and SFQ 234 and other types of data structures can be used that allow concurrent access.

The Exchange Request Queue (ERQ)

Referring back to FIG. 8, the ERQ 230 is used to store I/O Request Blocks (IRBs). The host system 222 is the producer and the FC controller 224 is the consumer. The ERQ 230 and the ERQ consumer index 320 are stored in the host memory 228 and the ERQ producer index is stored in the FC controller 224. The host system 222 creates IRBs and places them in the ERQ 230. Once the host system 222 places the IRB in the ERQ 230, the host system 222 increments the ERQ producer index register. As the consumer, the FC controller 224 processes the IRBs and performs the requested operation. Once the IRB is processed, the FC controller 224 increments the ERQ consumer index 320 in the host memory 228.

FIG. 10 illustrates the format of an IRB 321. The IRB 321 can include one or two I/O requests. The first I/O request is considered I/O Request A 322A and the second is considered I/O Request B 322B. The fields in the IRB 321 are described in more detail in Appendix A below.

Single Frame Queue (SFQ)

Referring back to FIG. 8, the SFQ 234 is used by the FC controller 224 to send inbound unknown or unassisted frames to the host system 222. The SFQ 234 contains at least 32 entries and each entry is 64 bytes. The SFQ 234 is stored in the host memory 228, the SFQ producer index resides in an inbound completion message that is stored in the IMQ 232, and the SFQ consumer index is stored in the FC controller 224. The FC controller 224 places the frames into the SFQ 234, increments the SFQ producer index, and writes the SFQ producer index in an inbound completion message which will be described in more detail below. The host system 222 consumes the frames from the head of the queue and updates the SFQ consumer index accordingly.

Inbound Message Queue (IMQ)

The IMQ 232 is used by the FC controller 224 to send completion messages to the host system 222. The IMQ 232 and the IMQ producer index 238 are stored in the host memory 228 and the IMQ consumer index is stored in the FC controller 224. The FC controller 224 places completion messages in the IMQ 232, updates the IMQ producer index 238, and an interrupt to the host system 222 may be generated for certain types of completion messages. When the IMQ 232 is full, the FC controller 224 generates an interrupt to the host system 222. The host system 222 processes the completion messages and updates the IMQ consumer index accordingly.

The following are examples of some of the completion messages:

Outbound Completion Message—This message is sent when an error occurs in the transmission of a sequence and when the last phase of an FCP I/O request is the transmission of a sequence;

Inbound Completion Message—This message is sent when a frame is received that is not automatically processed by the FCP SCSI assists;

Frame Manager Completion Message—This message is sent to the host system when any of the interrupting status bits are set in the frame manager status register; and Inbound FCP Exchange Completion Message—This message is sent to update the host system on the status of an FCP exchange.

SCSI Exchange and Sequence Table (SEST)

The SEST 236 is an array that is used to provide information to the FC controller 224 regarding an I/O request. Each entry in the table 236 is 64-bytes wide and contains information on a specific SCSI I/O operation. The host system 222 generates the entries and the FC controller 224 updates the entries with the state of the I/O request as it progresses. There are two types of entries: outbound and inbound. The outbound entries include an Initiator Write Entry (IWE) and a Target Read Entry (TRE). The inbound entries include an Initiator Read Entry (IRE) and a Target Write Entry (TWE).

FIG. 11 illustrates the format of an IWE and Appendix B describes in further detail each of the fields in the IWE. FIG. 12 illustrates the format of a TRE and Appendix C describes in further detail each of the fields in the TRE. FIG. 13 illustrates the format of an IRE and Appendix D describes in further detail each of the fields in the IRE. FIG. 14 illustrates the format of a TWE and Appendix E describes in further detail each of the fields in the TWE.

Scatter/Gather Lists

A Scatter/Gather List (SGL) is a list of data buffers that store the inbound 225 and outbound data 227 in the host memory 228. The scatter list describes the inbound data 225 and the gather list describes the outbound data 227. A data buffer is defined by a Length/Address (L/A) pair. A L/A pair defines a contiguous area in the host memory 228.

Figure 16A:
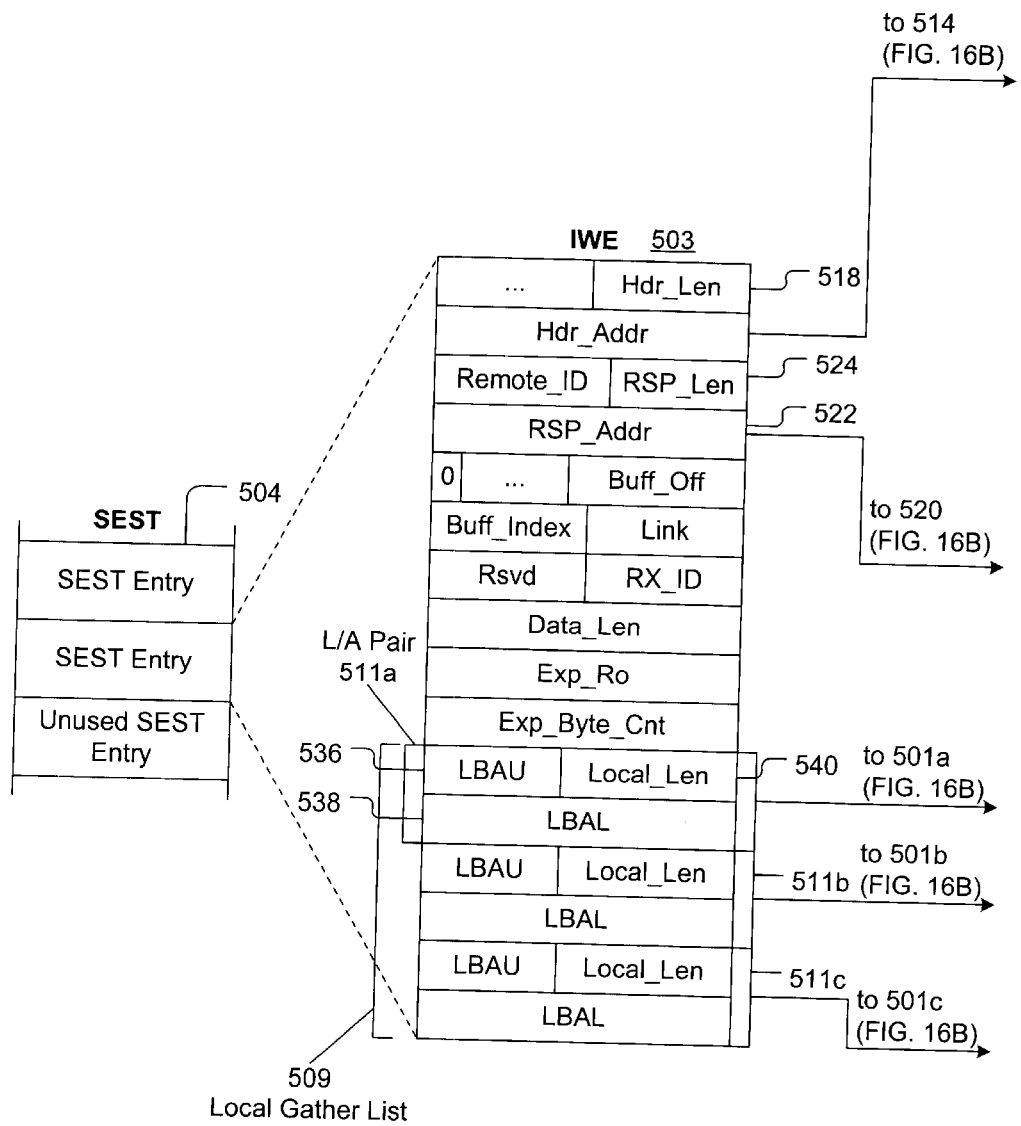
FIG. 16 depicts the data structures used in a second exemplary FCP initiator write operation.
Figure 16C:
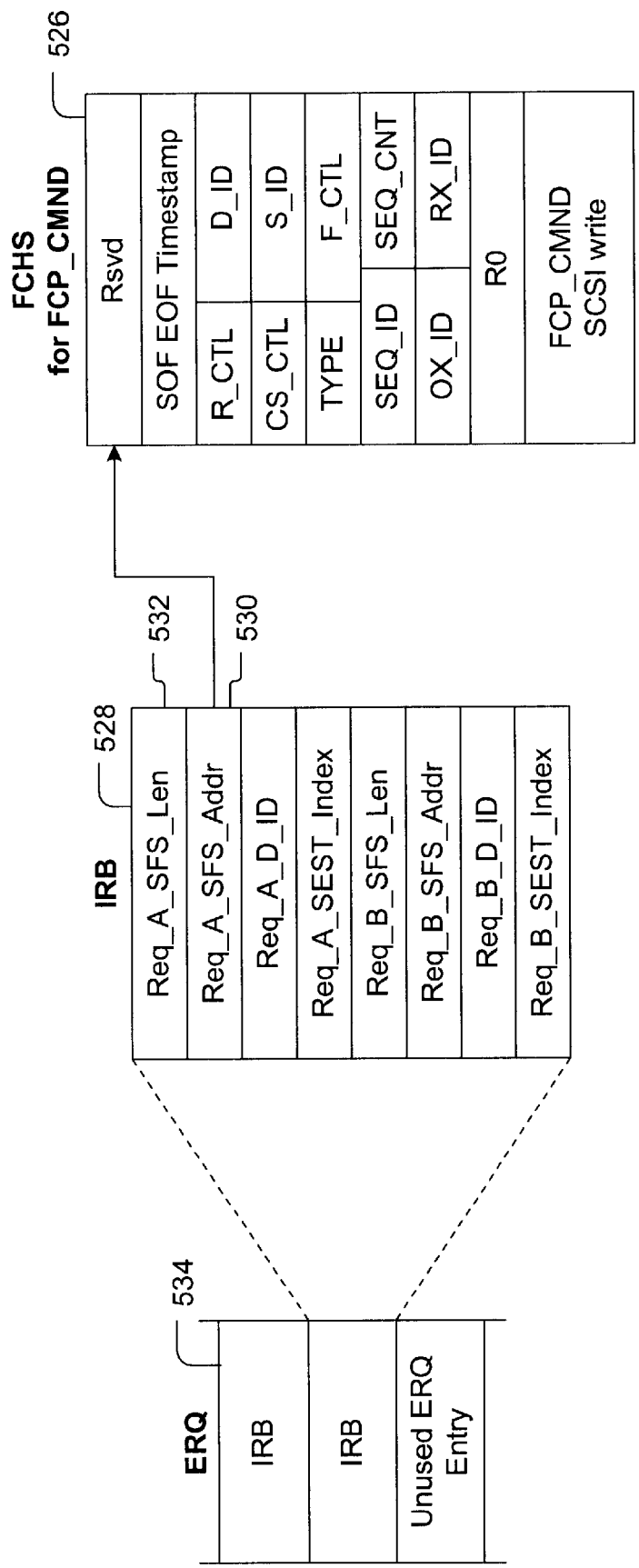

There are two types of scatter/gather lists: a local scatter/gather list and an extended scatter/gather list. The local scatter/gather list contains at most three buffers, or L/A pairs, which are part of the SEST entry. The local scatter/gather list is beneficial since fewer DMA operations are required per I/O operation since the L/A pairs are contained within the SEST entry. Referring to FIG. 16, there is shown a local gather list 509 with three L/A pairs 511a–511c that are part of the SEST 503 entry.

Figure 15A:
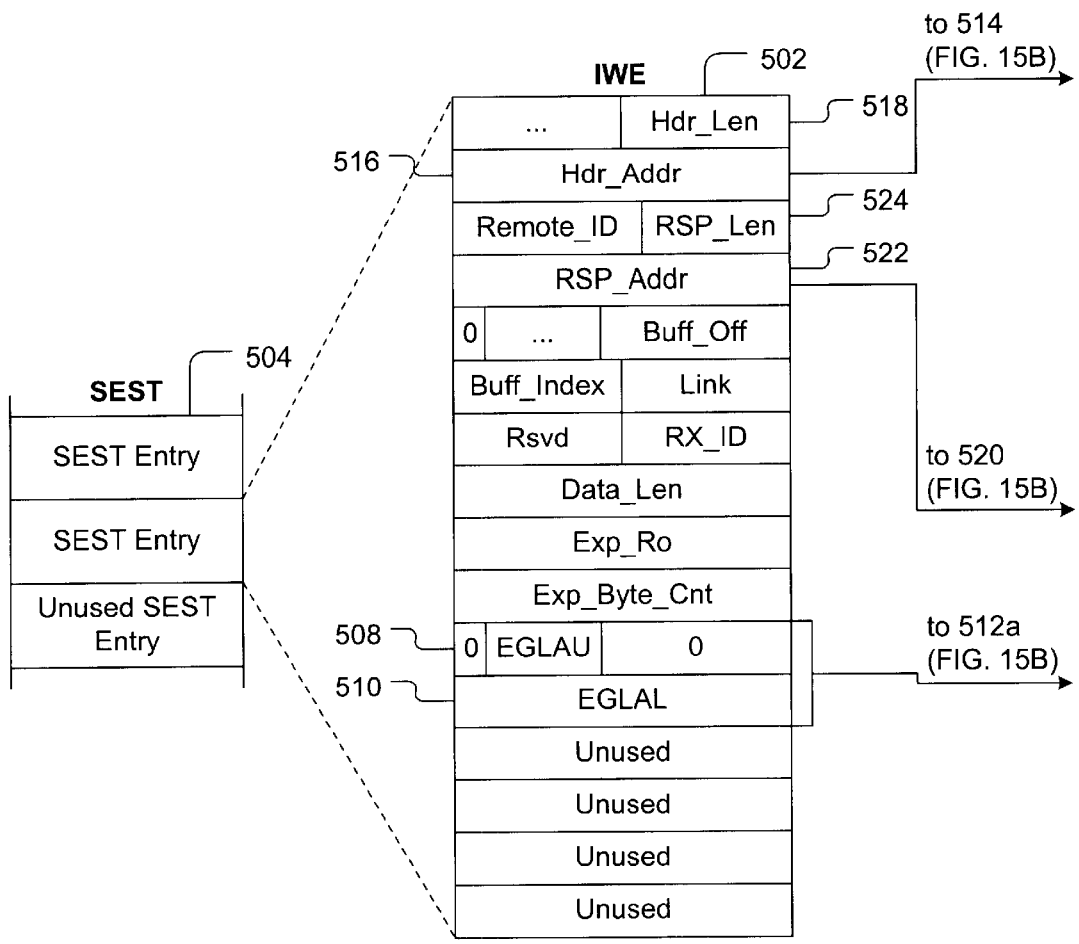
FIG. 15 depicts the data structures used in a first exemplary FCP initiator write operation.
Figure 15B:
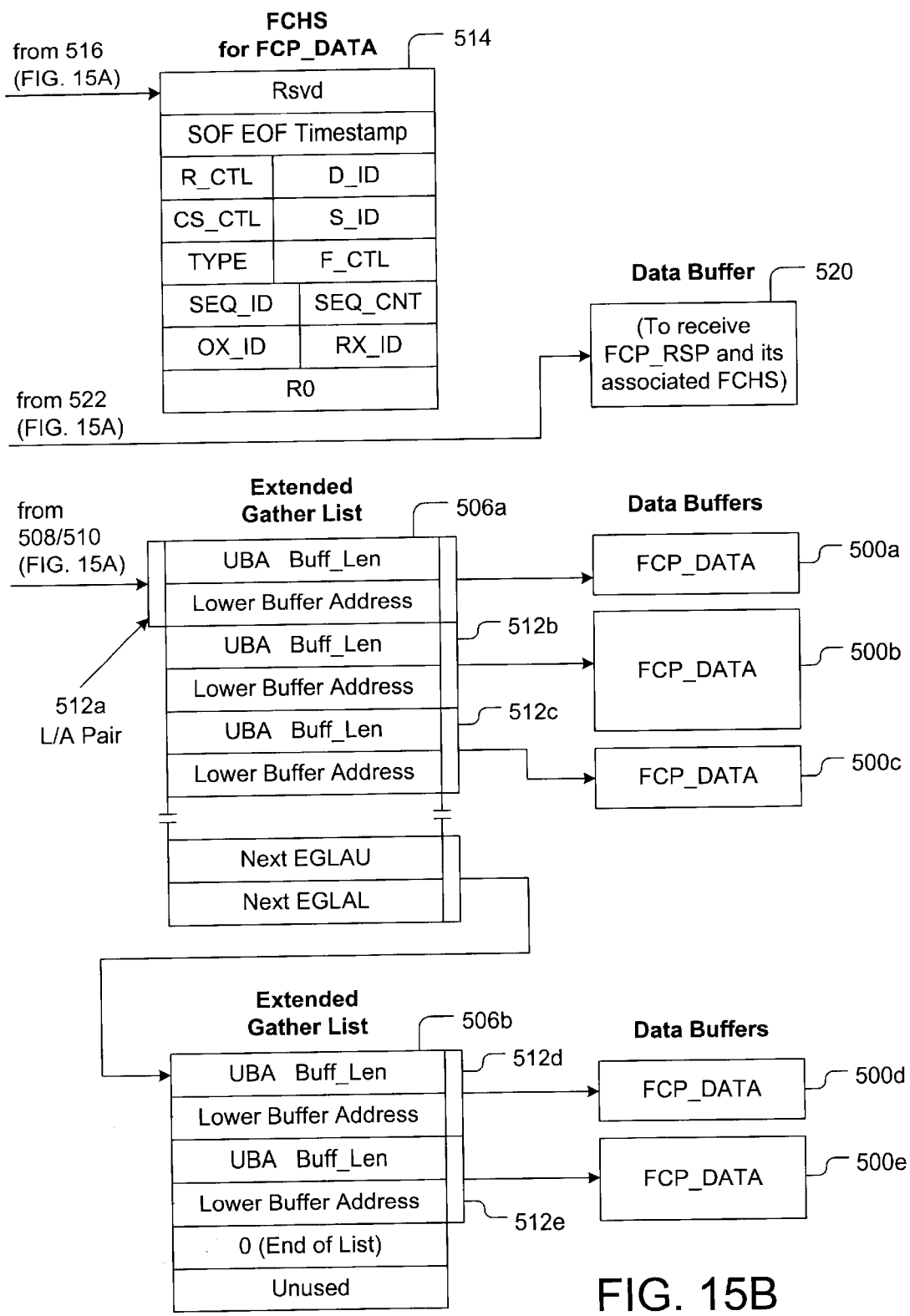
Figure 15C:
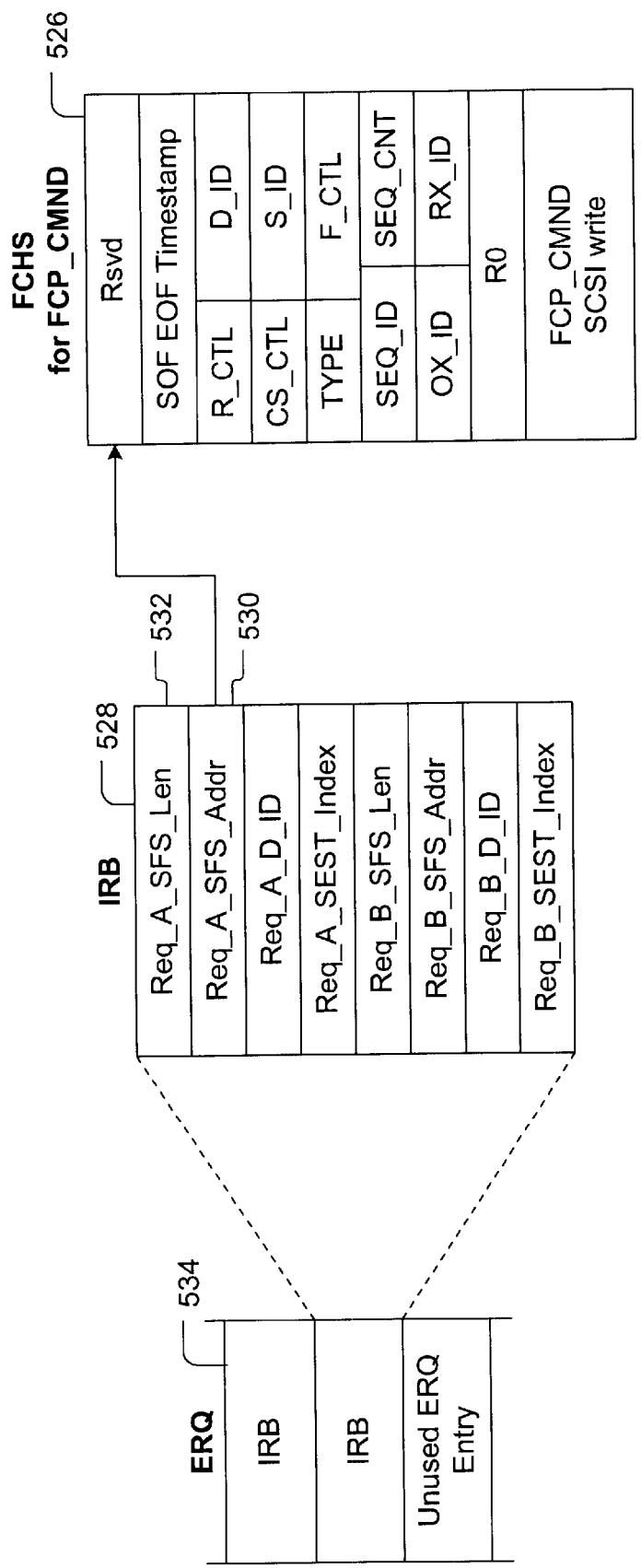

By contrast, the extended scatter/gather list 506, as shown in FIG. 15, has more than three L/A pairs 512a–512e. The extended scatter/gather list 506 is external to the SEST entry 502 and multiple extended scatter/gather lists 506a–506b can linked together to incorporate additional L/A pairs 512d–512e.

Fibre Channel Header Structure (FCHS)

The FCHS is a data structure used by both the FC controller 224 and the host system 222 to exchange frame information. The host system 222 generates a FCHS that is transmitted to the FC controller 224 and which includes information for the FC controller 224 to build the frame header and the frame delimiters for sending FC sequences. The FC controller 224 uses the FCHS to notify the host system 222 of the frame header and the frame delimiters of each FC frame received by the FC controller 224. The frame headers of the FCP_DATA sequence are not transmitted to the host system 222. FIG. 17 illustrates the format of a FCHS and Appendix F describes in more detail the fields of the FCHS.

SCSI Link List

Figure 18:
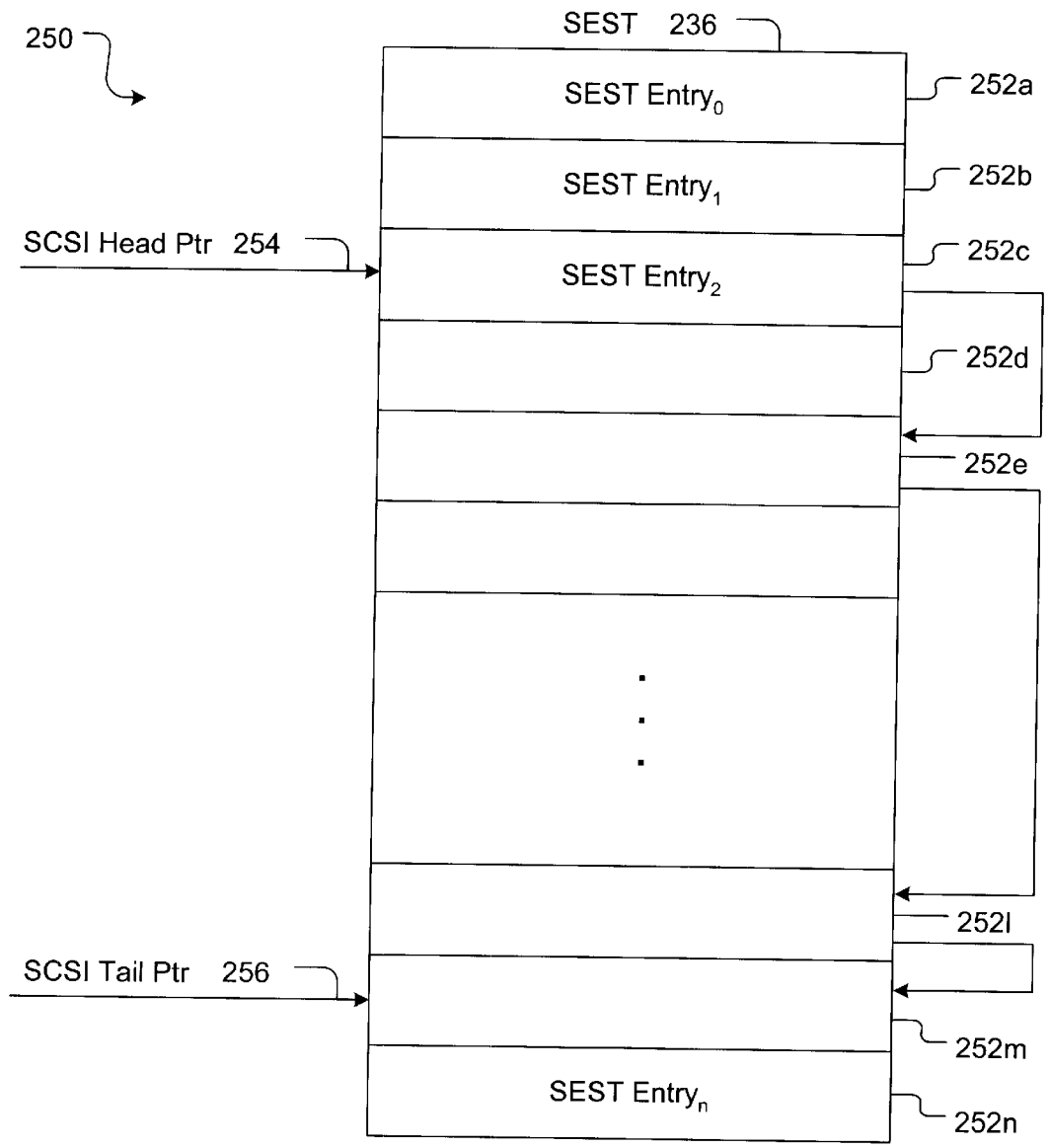
FIG. 18 depicts an exemplary SCSI Linked List.

FIG. 18 illustrates a SCSI Link List (LL) 250 that is stored in the host memory 228. The LL 250 is a linked list of certain SEST entries 252c, 252e, 252l, 252m and represents a list of work for the outbound control unit 706 that is generated by the inbound control unit 708 (see FIG. 22). The LL 250 is defined by a SCSI head pointer 254 that indicates the first entry 252c in the list 250 and a SCSI tail pointer 256 that defines the last entry 252m in the list 250. Each entry is linked to another entry by a link field in the SEST entry.

The foregoing description has described the external data structures that facilitate communications between the host system 222 and the FC controller 224. Attention now turns to a description of the manner in which these communications are made using these data structures.

The FC controller performs a dual role acting as both an initiator and as a target. As an initiator, the FC controller initiates requests to a target device and as a target, the FC controller is the recipient of requests. As such, there are four basic communications that are performed by the FC controller: a FCP initiator write operation; a FCP initiator read operation; a FCP target read operation; and a FCP target write operation.

Initiator Write

FIG. 15 illustrates the host/controller interface data structures 226 that are used in a FCP initiator write operation. In this example, the data payload requires five data buffers 500a–500e. The host system 222 initiates the initiator write operation by placing an IWE 502 in an entry of the SEST 504.

The host system 222 then allocates memory for the extended gather lists 506a–506b that describe the data buffers 500 that store the payload that will be transmitted to the target device. The address of the first extended gather list 506a is placed into the EGLAU 508 and EGLAL 510 fields of the IWE 502 and the addresses and lengths of the data buffers (i.e., L/A pairs) 512a–512e that describe the payload are placed into extended gather lists 506. The host system 222 uses as many extended gather lists 506a–506b as necessary to store the payload and links additional extended gather lists together, if needed.

The host system 222 then creates the FCHS 514 that is used in sending the FCP_DATA sequence. The Hdr_Addr 516 and Hdr_Len 518 fields of the IWE 502 are updated to point to the FCHS 514. A data buffer 520 for use in receiving the FCP_RSP frame is allocated and its address and length is stored in the RSP_Addr 522 and RSP_Len 524 fields of the IWE 502. A FCP_CMND sequence 526 is created that contains the SCSI Write command.

Next, the host system 222 generates an IRB 528 and sets the Req_SFS_Addr 530 and Req_SFS_Len 532 fields to point to the FCP_CMND frame 526. The IRB 528 is then placed in the ERQ 534 with the ERQ producer index incremented and written out to the FC controller 224.

The FC controller 224 initiates the command phase by transmitting the FCP_CMND sequence 526 described by the Req_A_SFS_Addr 530 and Req_A_SFS_Len 532 fields of the IRB 528 to the target. The target then starts the Data Phase by sending an FCP_XFER_RDY sequence 172. The FC controller 224 responds by transmitting the data described by the Extended Gather List 506 using frame header information 514 and which was requested by the FCP_XFER_RDY. The target may respond with zero or more FCP_XFER_RDY sequences.

The target then responds with a FCP_RSP sequence when the target has received all the data. The received FCP_RSP is placed in the previously allocated buffer 520 which is specified by the RSP_Addr 522 and RSP_Len 524 fields of the IWE 502. The IWE 502 is then invalidated. Finally, the FC controller 224 sends the host system 222 an inbound FCP exchange completion message thereby indicating the end of the FCP initiator write operation.

FIG. 16 illustrates the FCP initiator write operation of FIG. 15 with the use of a local gather list 509. The IWE 503 supports up to three L/A pairs 511a–511c to described the data buffers 501a–501c without the use of an external list structure. The addresses of each data buffer 501a–501c is stored in the LBAU 536 and LBAL 538 fields and the Local_Len 540 field indicates the length of a data buffer 501.

Initiator Read

Figure 19A:
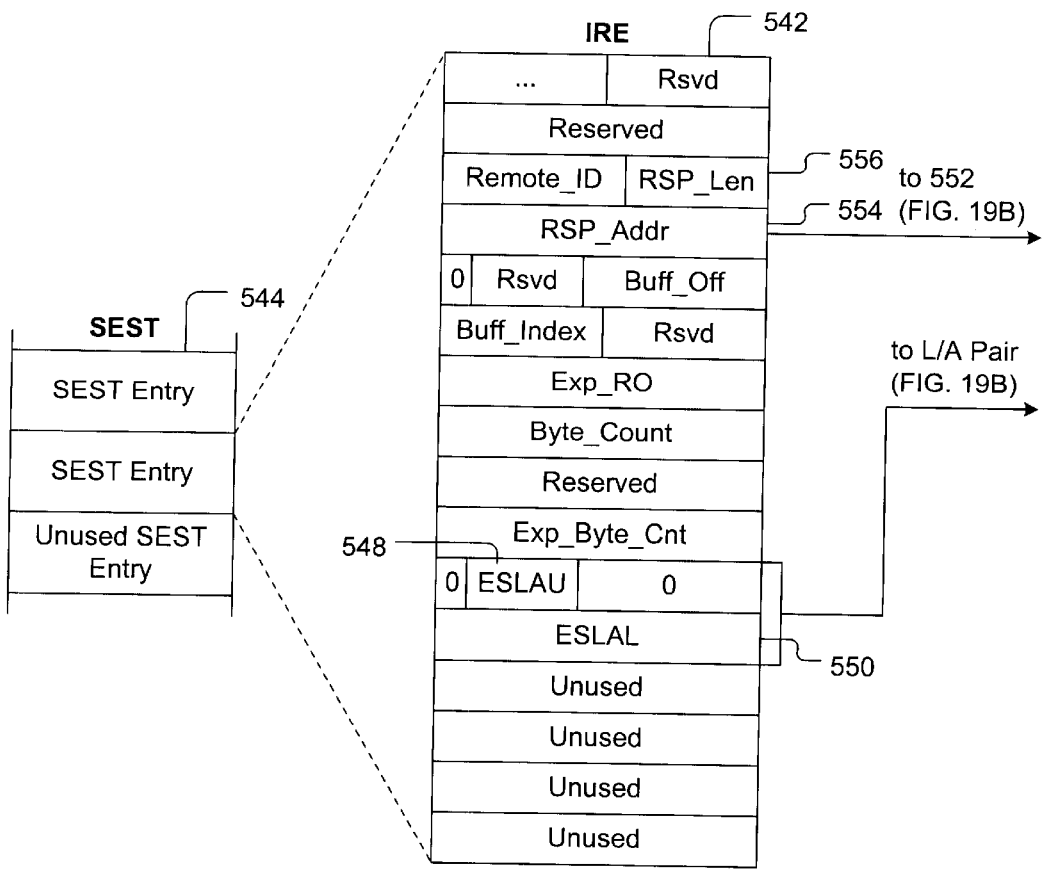
FIG. 19 depicts the data structures used in a FCP initiator read operation.
Figure 19B:
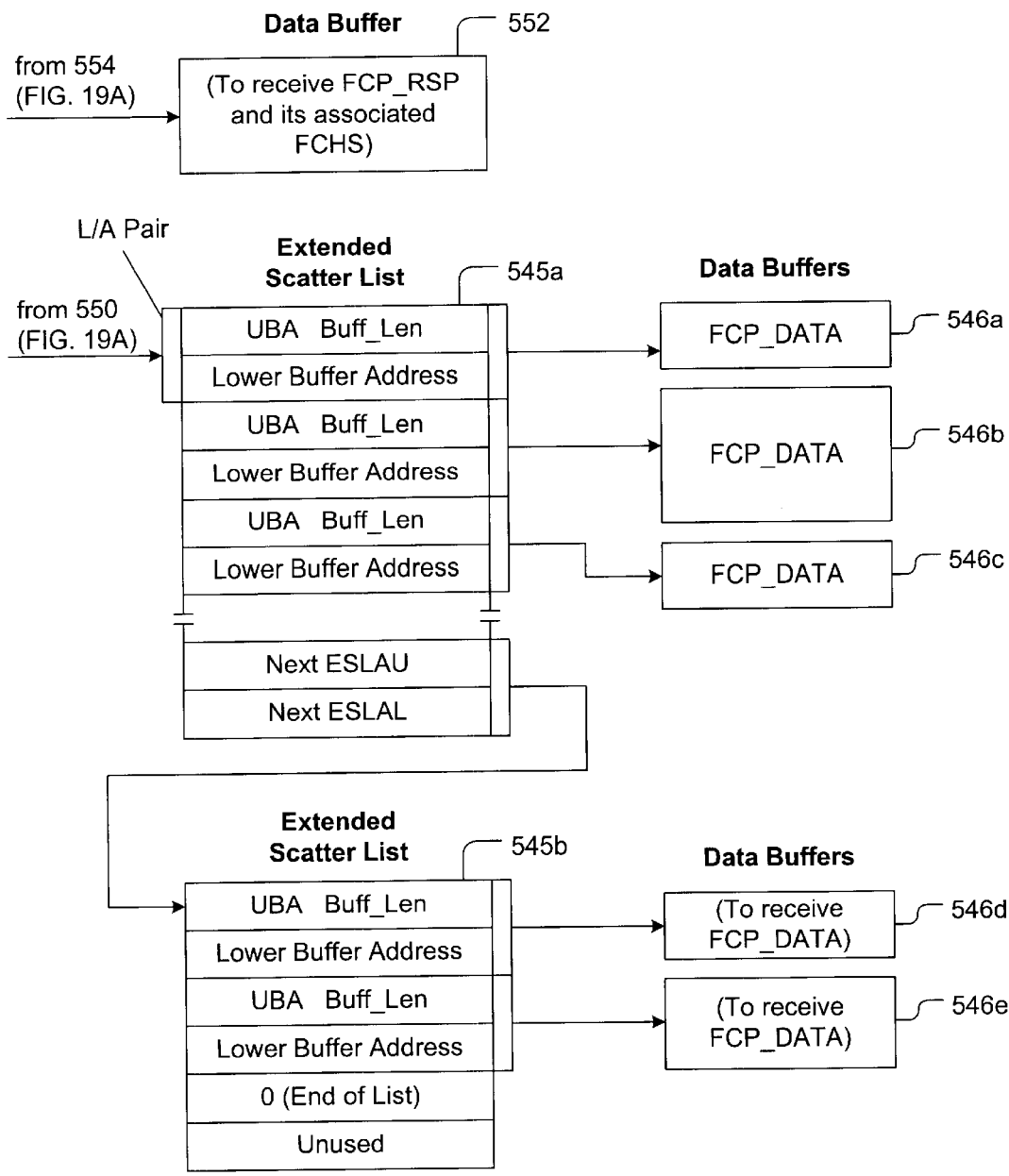
Figure 19C:
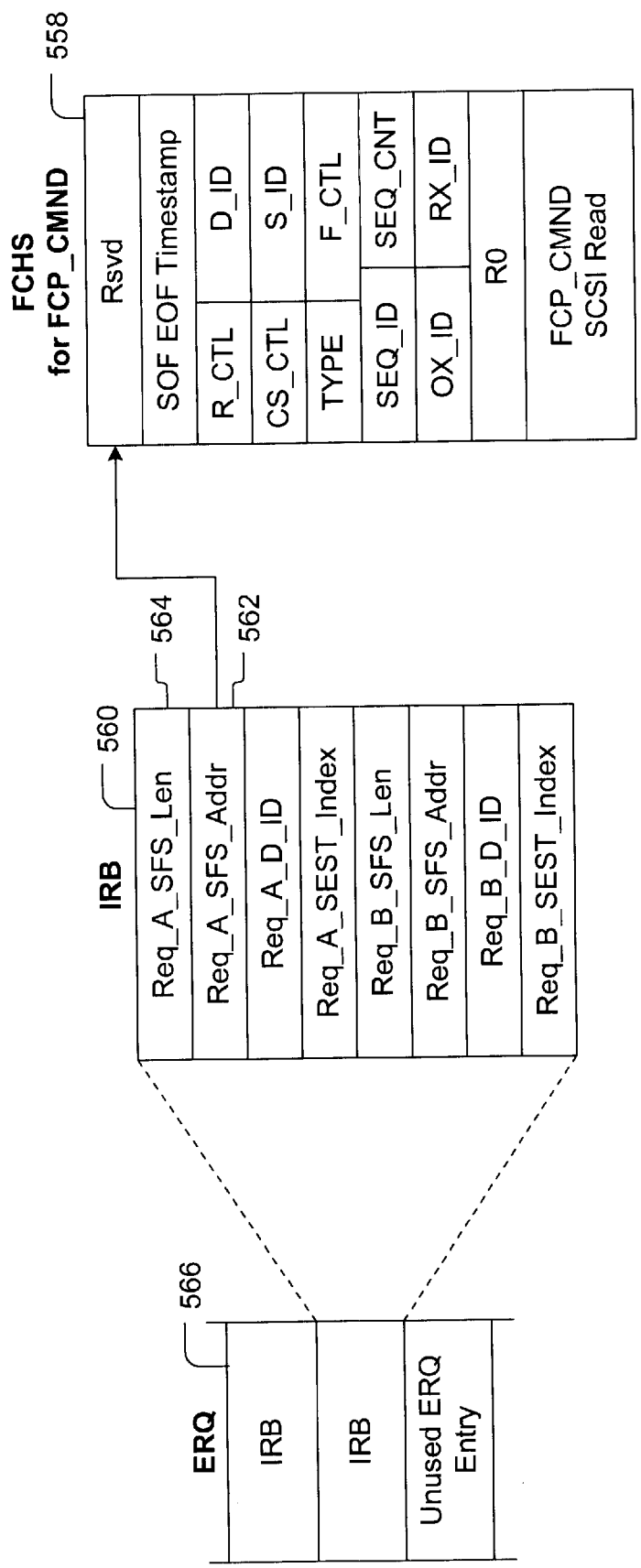

FIG. 19 illustrates the data structures used to perform a FCP initiator read operation. The host system 222 commences the operation by creating an IRE 542 that is placed in the SEST 544. The host system 222 then allocates memory for an extended scatter list 545 that describes the data buffers 546a–546e that store the payload that is transmitted to the host system 222. The address of the extended scatter list is placed into the EGLAU 548 and EGLAL 550 fields of the IRE 542. The addresses and lengths of the data buffers 546 (i.e., L/A pairs) that describe the payload are placed into the external gather list 545. The host system 222 uses as many extended scatter lists 545a–545b as necessary to store the payload and links the additional extended scatter lists together.

A data buffer 552 for use in receiving the FCP_RSP frame is allocated and its address and length is denoted in the RSP_Addr 554 and RSP_Len 556 fields of the IRE 542. A FCP_sequence 558 is created that contains the SCSI Read command.

Next, the host system 222 generates an IRB 560 with the Req_A_SFS_Addr 562 and Req_A_SFS_Len 564 fields updated to point to the FCP_frame 558. The IRB 560 is then placed in the ERQ 566 with the ERQ producer index incremented and written out to the FC controller 224.

The FC controller 224 initiates the command phase by transmitting the FCP_sequence 558 described by the Req_A_Addr 562 and Req_A_SFS_Len 564 fields of the IRB 560 to the target. The target retrieves the requested data. The target then starts the Data Phase by sending one or more FCP_sequences. The FC controller 224 receives each frame of each sequence and places the data payload into host memory 228 as indicated by the extended scatter lists 545.

When all the data has been transmitted by the target, the target sends a FCP_RSP sequence. The FCP_RSP is placed in the previously allocated buffer 552 which is specified by the RSP_Addr 554 and RSP_Len 556 fields of the IRE 542. The IRE 542 is then invalidated. Finally, the FC controller 224 sends the host system 222 an inbound FCP exchange completion message thereby indicating the end of the FCP initiator read operation.

It should be noted that an FCP initiator read operation using a local scatter/gather list operates in a similar manner.

Target Write

Figure 20A:
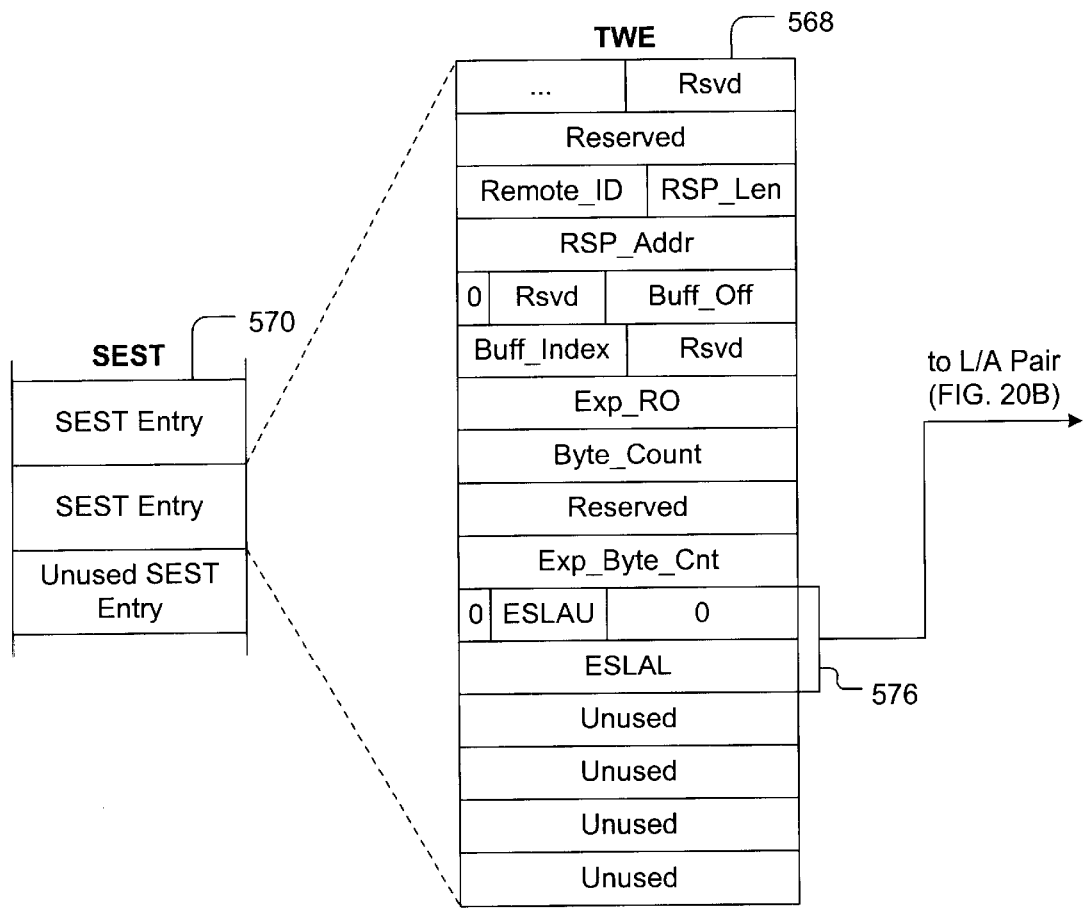
FIG. 20 depicts the data structures used in a FCP target write operation.
Figure 20B:
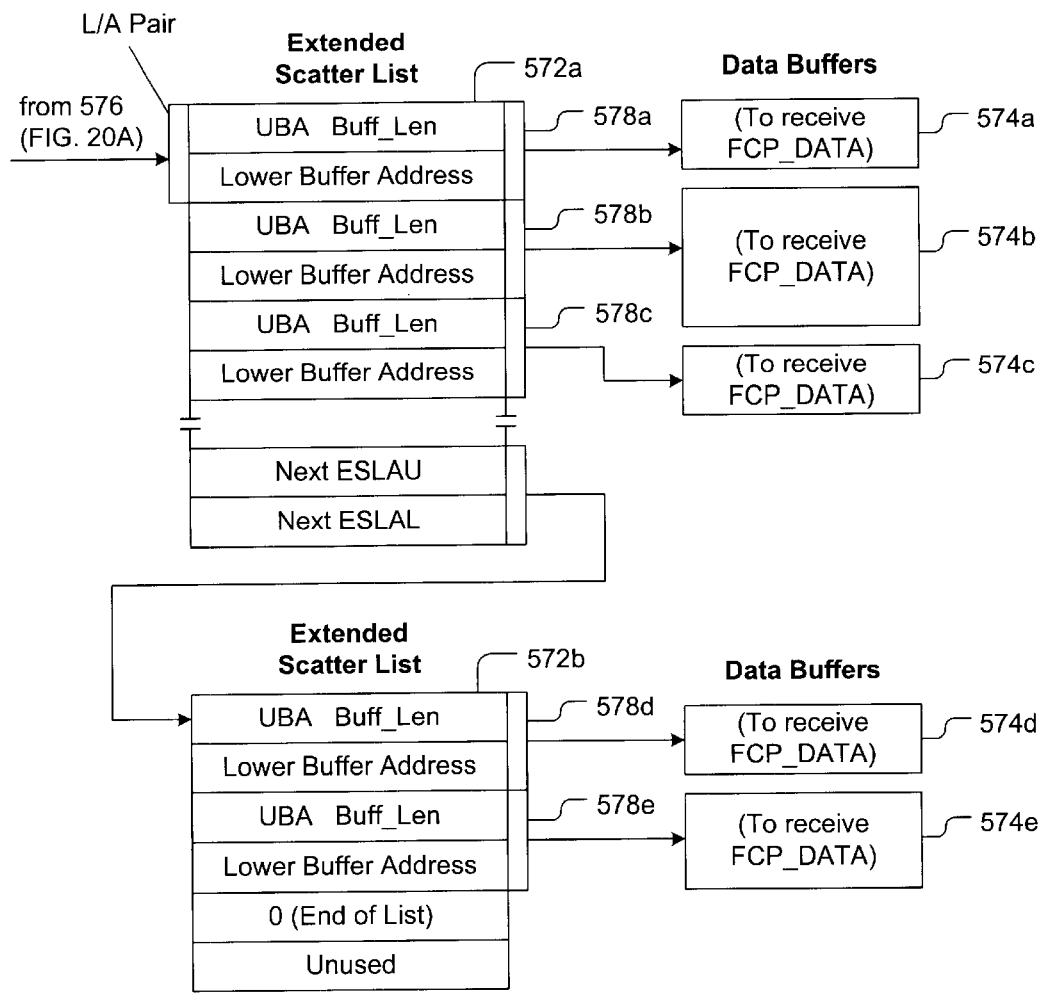
Figure 20C:
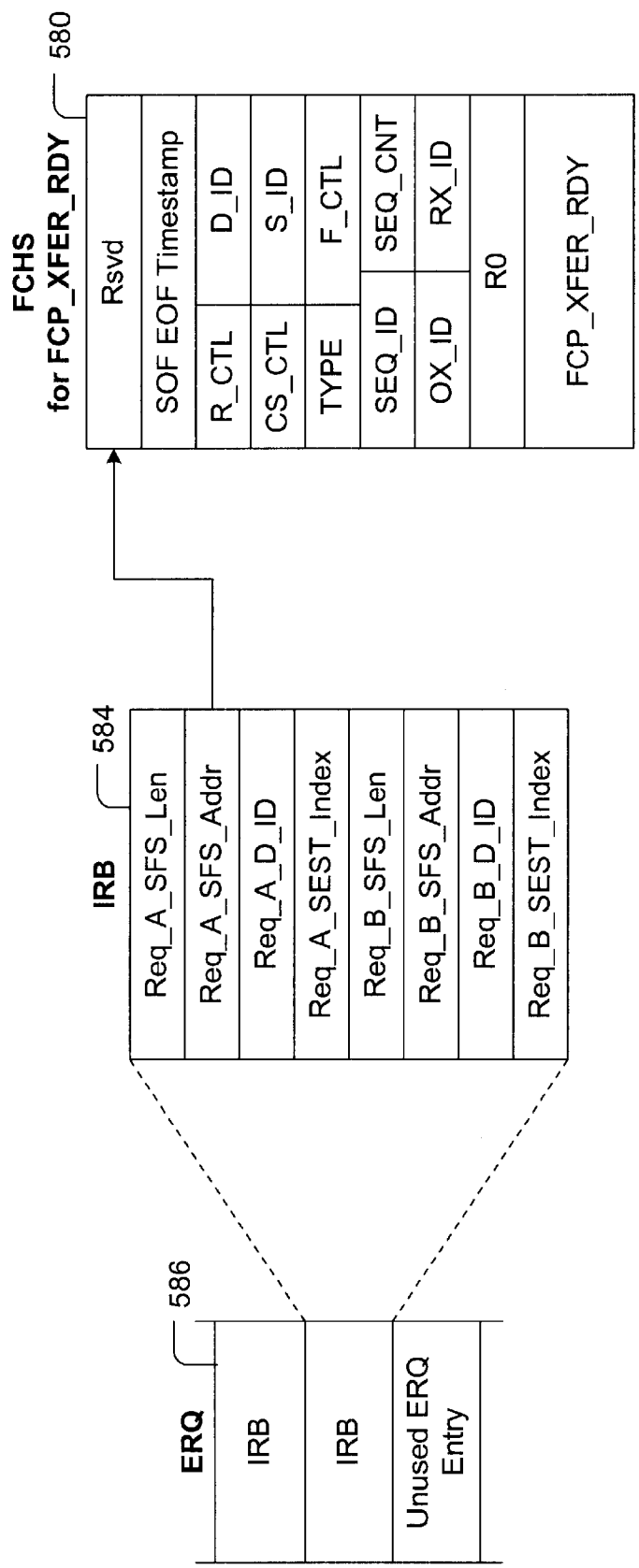

FIG. 20 illustrates the data structures used to perform a FCP target write operation. The FC controller 224 receives a FCP_frame from an initiator device and the frame is stored in the SFQ 234. The host system 222 is notified of the frame through an Inbound Completion Message of an Unassisted FCP type. The host system 222 processes the frame and responds by creating a TWE 568 which is stored in the SEST 570.

The host system 222 then allocates memory for an extended scatter list 572a–572b and the associated data buffers 574a–574e. The TWE 568 is updated with the address of the list 576 and the extended scatter list 572 is updated with the addresses and lengths of the data buffers 578a–578e.

Next, the host system 222 builds the FCHS 580 for the FCP_XFER_RDY sequence which indicates that the host system 222 is ready to receive the data. An IRB 584 is then constructed with the appropriate bit settings and linked to the FCP_XFER_RDY frame 580. The IRB 584 is placed in the ERQ 586 and the value of the ERQ producer index register is incremented.

The FC controller 224 initiates the data phase by sending the FCP_XFER_RDY sequence 580 and in response receives the read data, in one or more frames, from the initiator. The FC controller 224 places the data payload into the data buffers 574a–574e of the host memory 228 that are defined in the extended scatter lists 572a–572b. Once the FC controller 224 receives all the data, an inbound FCP exchange completion message is sent to the host system 222.

It should be noted that a FCP target read operation using a local scatter/gather list operates in a similar manner.

Target Read

Figure 21A:
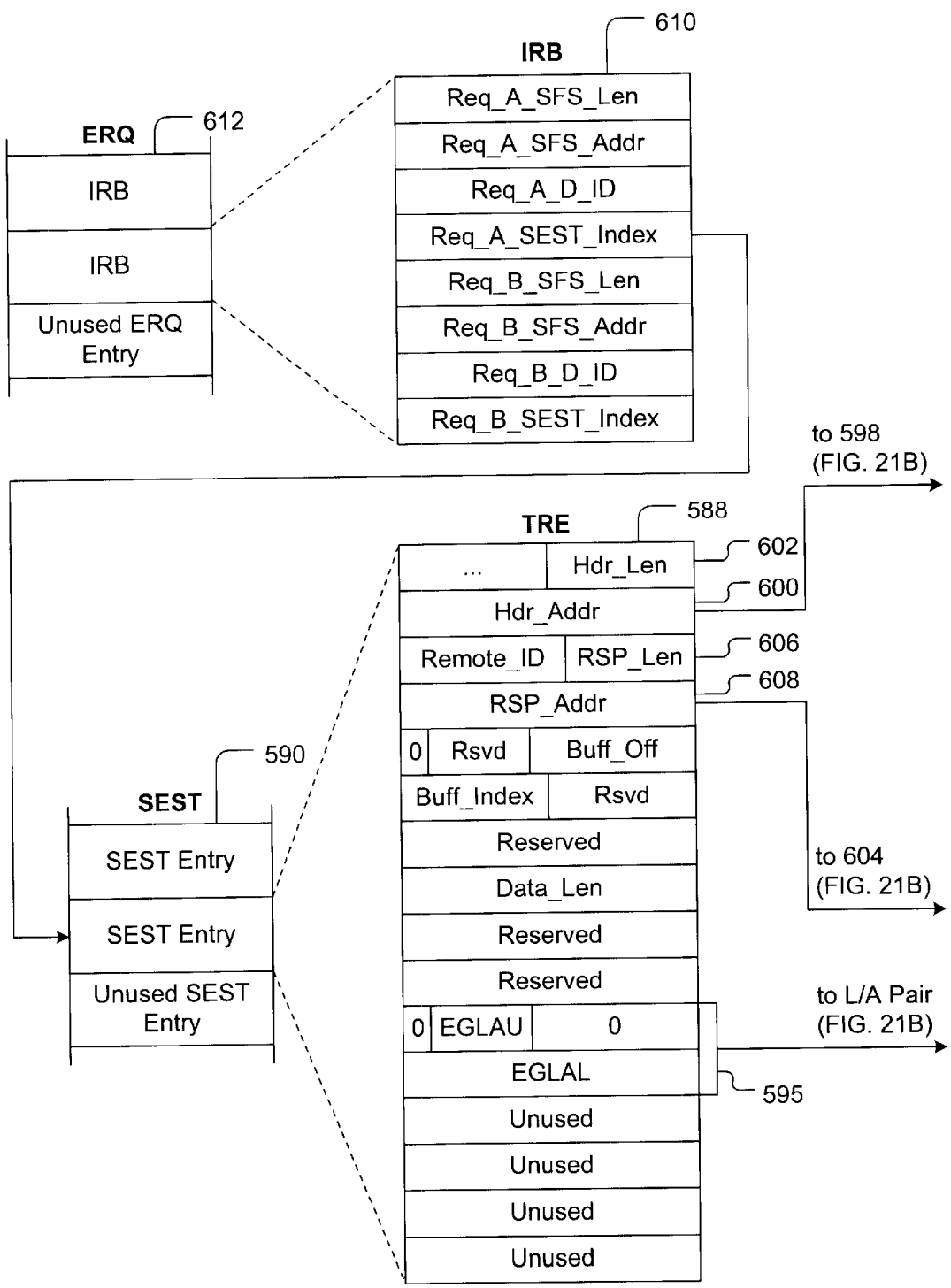
FIG. 21 depicts the data structures used in a FCP target read operation.
Figure 21B:
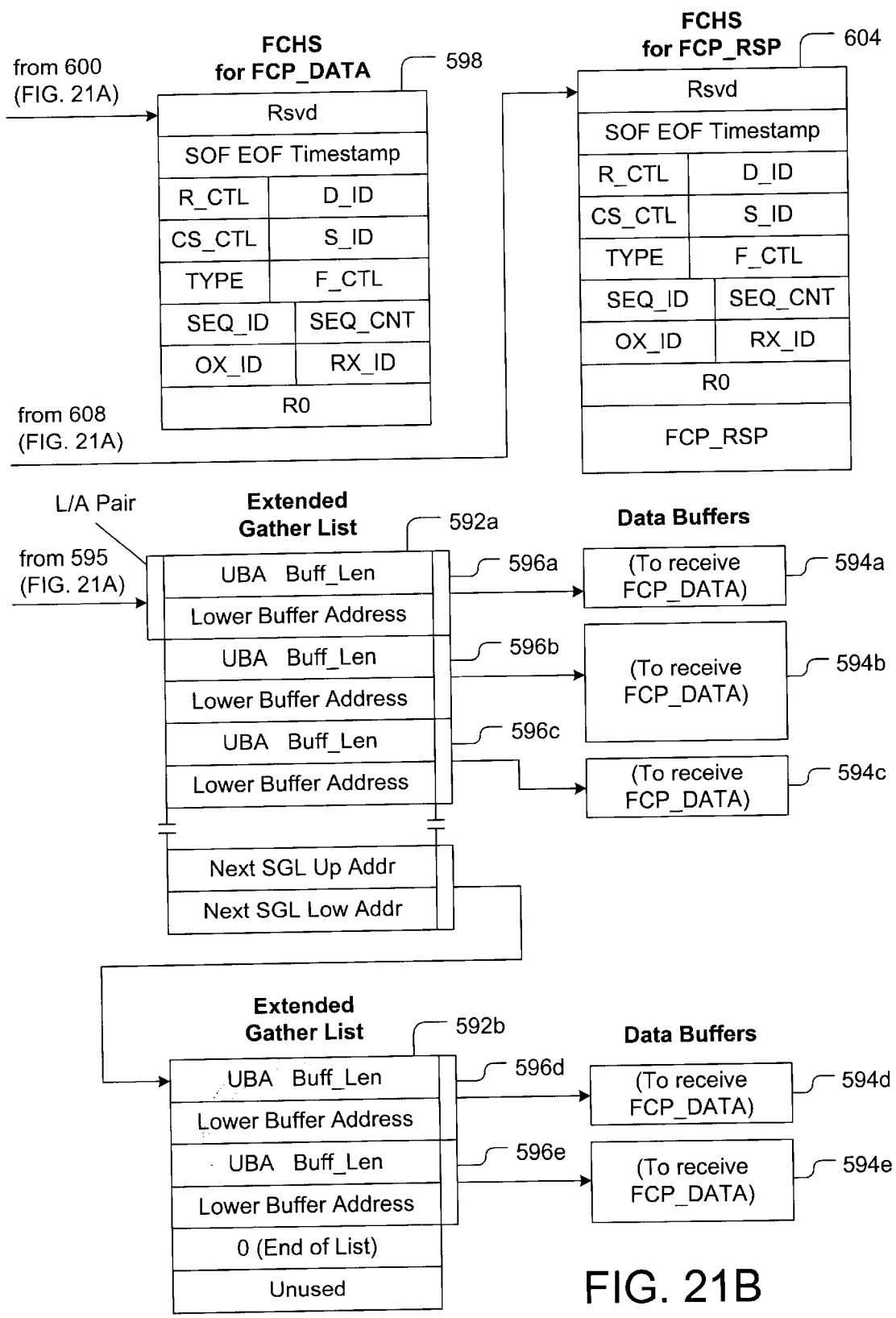

FIG. 21 illustrates the data structures used to perform a FCP target read operation. The FC controller 224 receives a FCP_CMND frame from an initiator device which is stored in the SFQ 234. The host system 222 is notified of the frame through an Inbound Completion Message of an Unassisted FCP type. The host system 222 processes the frame, obtains the requested data, and stores it in the memory buffers. A TRE 588 is generated and stored in the SEST 590.

The host system 222 then allocates memory for extended gather lists 592a–592b and the associated data buffers 594a–594e. The TRE 588 is updated with the address of the lists 595 and the extended gather lists 592a–592b are updated with the addresses and lengths 596a–596e of the data buffers 594a–594e.

Next, the host system 222 builds the FCHS 598 that is used to send the FCP_DATA sequence. The HDR_Addr 600 and HDR_Len 602 fields in the TRE 588 are updated to reflect this FCHS 598. A FCHS 604 for the FCP_RSP sequence is also generated and the RSP_Addr 606 and RSP_Len 608 fields of the TRE 588 are updated to reflect the FCP_RSP sequence 604.

An IRB 610 is then constructed and placed in the ERQ 612 by incrementing the value of the ERQ producer index register.

The FC controller 224 initiates the data phase by sending the data described in the extended gather list 592 as a FCP_DATA sequence. Once all the data is transmitted, the FC controller 224 transmits the FCP_RSP sequence, invalidates the TRE, and control returns to the host system 222.

It should be noted that a FCP Target Read operation using a local scatter/gather list operates in a similar manner.

The foregoing description described the four I/O operations that the FC controller manages. Attention now turns to a description of the components of the FC controller that are used to exchange data between the host system and the fibre channel.

FC Controller Architecture

Figure 22:
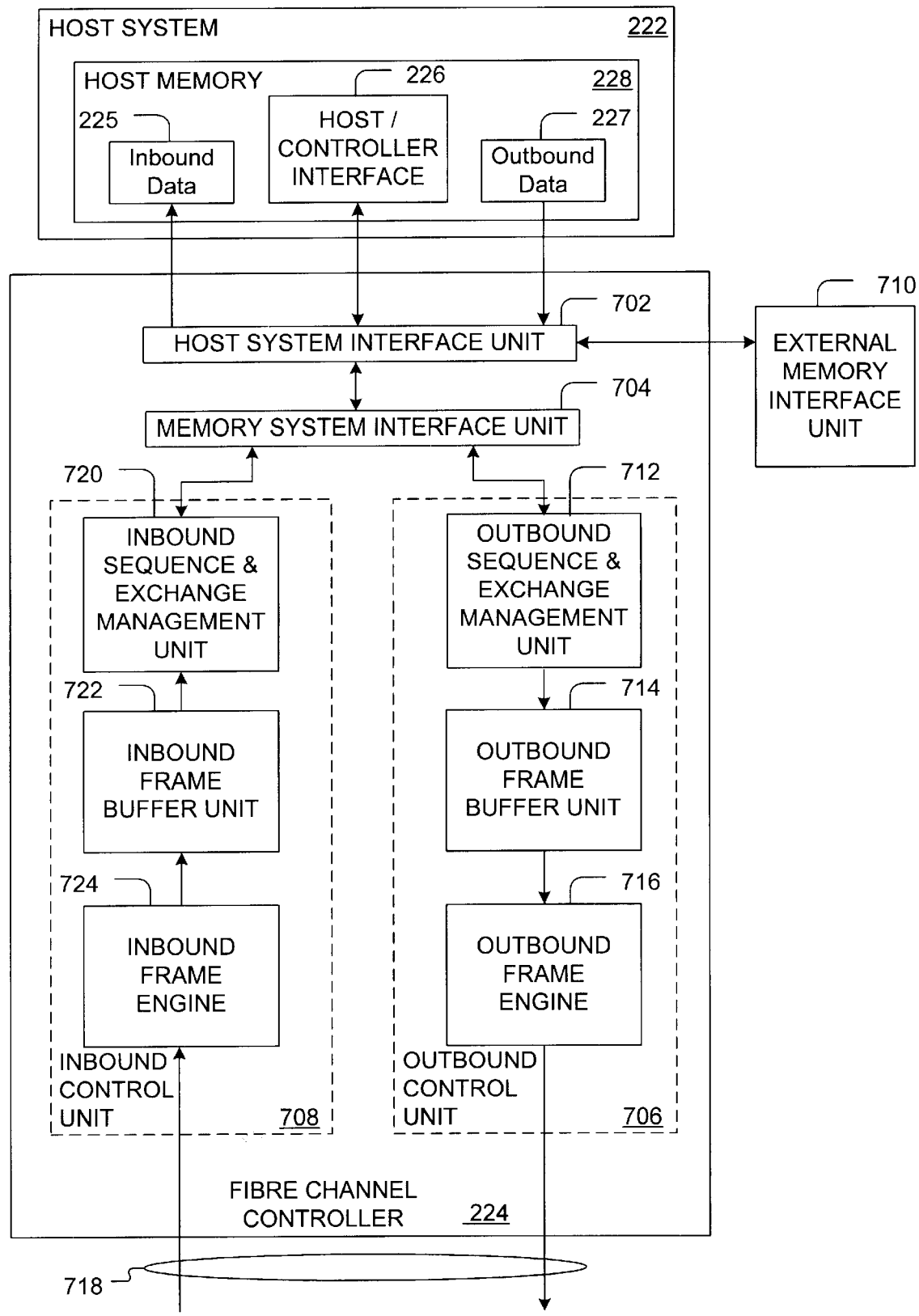
FIG. 22 is a block diagram illustrating the components of the FC controller.

FIG. 22 illustrates a computer system 700 embodying a first embodiment of the FC controller 224 of the present invention. Preferably, the FC controller 224 is fabricated as a single integrated semiconductor device. However, the present invention is not constrained to such an implementation and the components of the FC controller 224 can be partitioned into several semiconductor devices.

The FC controller 224 can be viewed as having a host system interface unit 702, a memory system interface unit 704, an outbound control unit 706, and an inbound control unit 708. The host system interface unit 702 enables the exchange of data between the host system 222 and the FC controller 224. The memory system interface unit 704 is provided to manage direct memory access (DMA) requests to the host memory 228 and to an external memory interface 710. The outbound control unit 706 accepts I/O requests from the host system 222 and maps them into the FC frames for transmission to the FC 718. The inbound control unit 708 accepts the FC frames from the FC 718 and routes the frames to their proper destination in the host system 222.

The outbound control unit 706 includes an outbound sequence and exchange management unit 712, an outbound frame buffer unit 714, and an outbound frame engine 716. The outbound sequence and exchange management unit 712 manages the phases of a SCSI exchange that require a FC sequence to be sent. The outbound frame buffer unit 714 assembles and stores the FC frames that result from the FC sequence. The outbound frame engine 716 performs the necessary functions to transmit the frames through the FC 718, which includes appending error correction data to each frame and converting each 8-bit byte of data into 10-bit characters for transmission.

The inbound control unit 708 includes an inbound sequence and exchange management unit 720, an inbound frame buffer 722, and an inbound frame engine 724. The inbound frame engine 724 retrieves the 10-bit character data from the FC 718 and converts it into 8-bit bytes of frame data. The inbound frame buffer unit 722 temporarily stores the frames and the inbound sequence and exchange management unit 720 manages storing the inbound data 225 in the proper location in the host memory 328 or initiates the next phase in the exchange.

The inbound and outbound sequence and exchange management units can be considered collectively as a sequence and exchange management unit, the inbound and outbound frame buffer units can be considered collectively as a frame buffer unit, and the inbound and outbound fibre engines can be considered collectively as a frame manager.

The external memory interface unit 710 can be used to store the host/controller interface data structures 226 instead of the host memory 228. The external memory interface can include a static RAM that stores the host/controller interface data structures 226 and a ROM that stores BIOS boot code, and other data required by the host system 222. It should be noted that the external memory interface unit 710 can utilize any type of memory storage unit, such as FLASH memory, DRAMs, and the like and can be used to store any type of data. Furthermore, it should also be noted that any accesses (read or write) indicated herein this application to the host/controller interface data structures 226 can be made to the external memory interface unit 710 as well as through the PCI bus through the host system interface.

Although, the application describes that these accesses are made to the host memory 228, this is not a limitation of the present invention and is done for illustration purposes only.

Figure 23A:
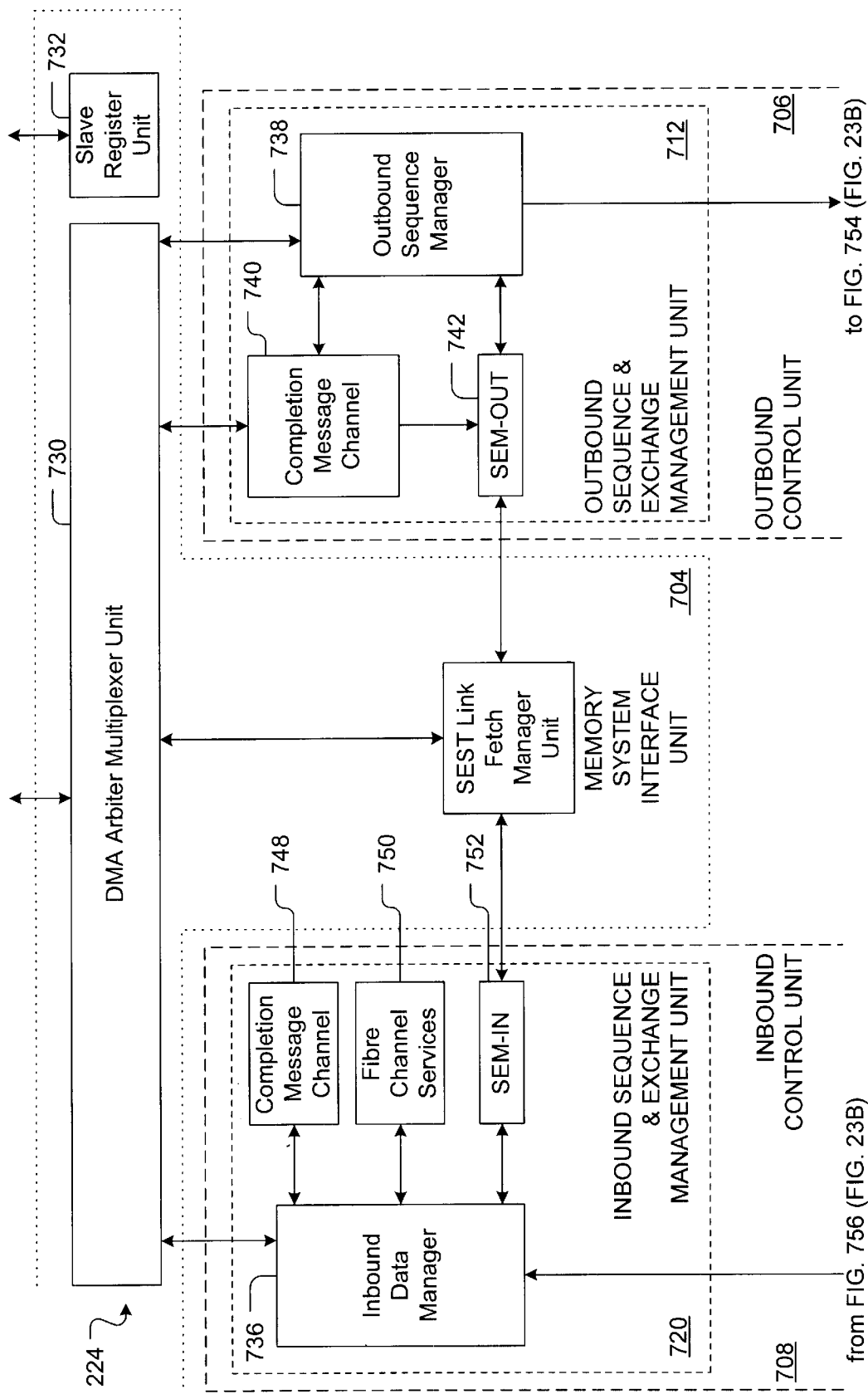
FIG. 23 is a block diagram detailing the components shown in FIG. 22.
Figure 23B:
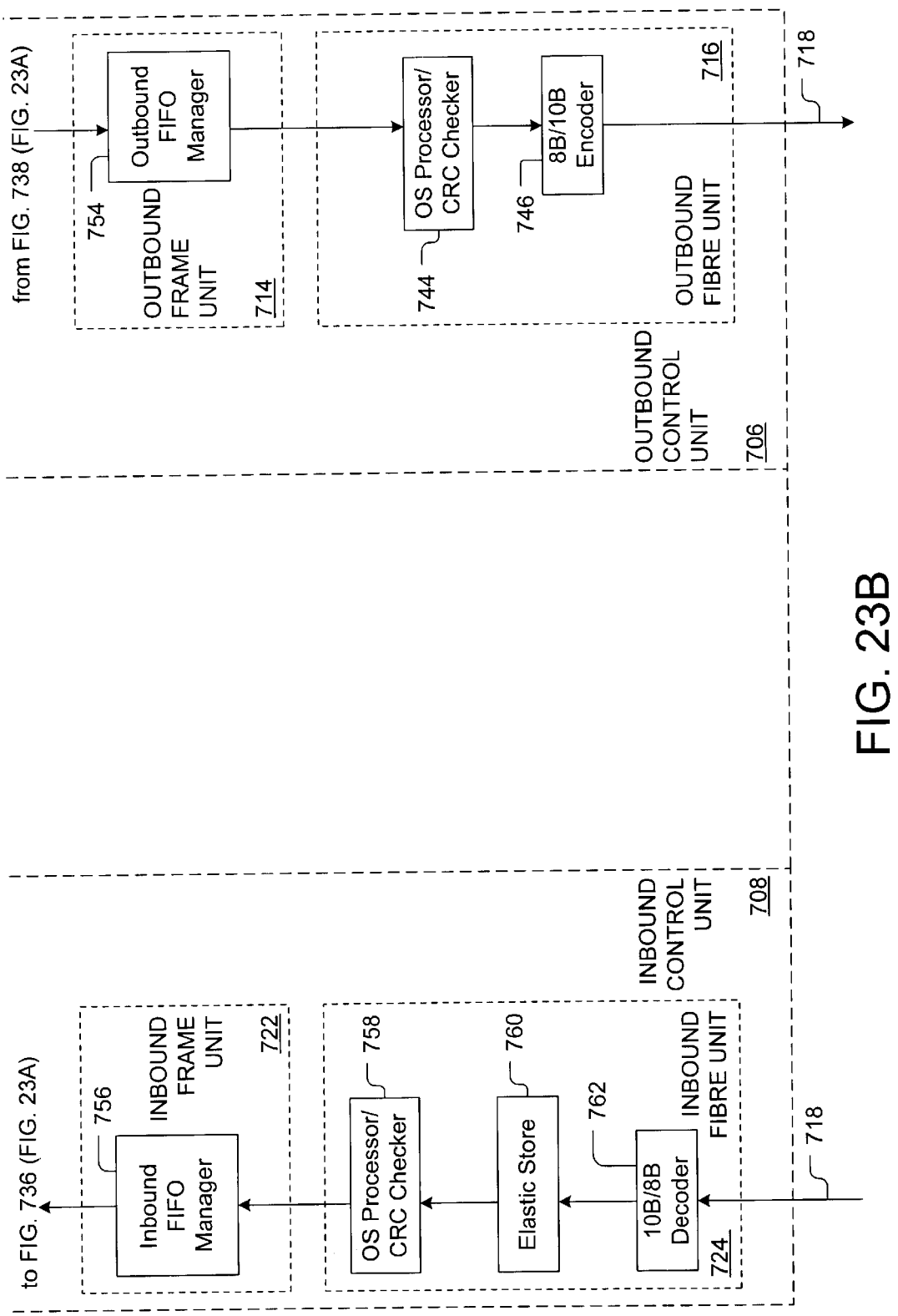

The components of the FC controller 224 are shown in further detail in FIG. 23. The memory system interface unit 704 includes a DMA arbiter multiplexer (DAM) unit 730, a slave register unit 732, and a SEST link fetch manager unit 734.

The DAM 730 manages DMA requests from several of the units to the host memory and the external memory interface. The slave register unit 732 provides a central location where the host system can exchange data with the FC controller 224. The SEST link fetch manager unit 734 manages accesses to the SEST for both the outbound 706 and the inbound 708 control units.

The outbound sequence and exchange management unit 712 includes an Outbound Sequence Manager (OSM) unit 738, an ERQ manager unit 740, and a Sequence Exchange Manager Outbound (SEM-OUT) unit 742. The ERQ manager unit 740 retrieves IRBs from the ERQ, the SEM-OUT unit 742 generates ODBs from the IRBs and SEST entries, and the OSM unit 738 generates the frames for the outbound sequence described in the ODB.

The outbound frame buffer unit 714 can be composed of an outbound FIFO manager unit 754 that includes a FIFO that assembles and buffers a FC channel frame for transmission. The outbound fibre engine 716 can include an Ordered Set (OS)/Cyclic Redundancy Check (CRC) generator unit 744 and an 8B/10B encoder 746. The OS/CRC generator maps the frames into FC-1 frames and appends a 32-bit CRC onto each frame. The 8B/10B encoder converts each 8-bit byte of data into 10-bit characters for transmission.

The inbound sequence and exchange management unit 720 includes an Inbound Data Manager (IDM) unit 736, a Completion Message Channel (CMC) unit 748, a Fibre Channel Services (FCS) unit 750, and a SCSI Exchange Management Inbound (SEM-IN) 752 unit. The IDM 736 receives new frames and routes the frames to a designated location in the host memory 228. In addition, the IDM 736 sends completion messages to the host system 222. The IDM 736 utilizes the CMC 748, FCS 750, and SEM-IN 752 units to route the frames into host memory 228 and to generate the completion messages.

The CMC unit 748 manages the IMQ 232 and provides the IDM 736 unit with an IMQ entry that the inbound data manager 736 uses to place the completion messages. The FCS 750 manages the unknown frames and places them into the SFQ 234. The SEM-IN unit 752 manages the inbound phases of a SCSI exchange that receive a FC sequence.

The inbound frame buffer unit 722 can be composed of an inbound FIFO manager unit 756 that includes a FIFO that buffers frames. The inbound fibre engine 724 can include an OS processor and CRC checker unit 758, an elastic store 760, and a 10B/8B decoder 762. The OS processor and CRC checker unit 758 receives the inbound data, parses it for an incoming frame boundary, and verifies the CRC of the frame when it is stored in the inbound FIFO manager unit 756. The elastic store 760 synchronizes the inbound data received within the clock domain of the 10B/8B decoder with the clock domain of the OS processor and CRC checker 758. The 10B/8B decoder 762 converts the received 10-bit characters into 8-bit bytes.

The foregoing description has provided an overview of the components of the FC controller 224. Attention now turns to a more detailed description of each component.

Host System Interface Unit

The host system interface unit 702 interfaces with the peripheral bus of the host system 222. Preferably, the peripheral bus is the Peripheral Component Interface (PCI). The operation of the PCI bus is well-known in the art. A more detailed description of the PCI bus and the manner in which a device interfaces with the PCI bus can be found in Solari and Willse, *PCI Hardware and Software Architecture and Design*, 4th edition, Annabooks (1998), in Mindshare, *PCI System Architecture*, 3rd edition, Addison Wesley (1996), and in *PCI Specification rev.* 2.1 from the PCI Special Interest Group (http://www.pcisig.com), each of which are hereby incorporated by reference as background information.

Memory System Interface Unit

Referring to FIGS. 22 and 23, the memory system interface unit 704 shows a DMA Arbiter Multiplexer (DAM) unit 730, a slave register unit 732, and a SEST link fetch manager unit (LFM) 734. The DAM manages multiple DMA requests to either the PCI bus or to the external memory interface 710. The slave register unit 732 is a centralized location where the host system 222 accesses certain data in the FC controller 234. The LFM unit 734 manages the read and write accesses of the SEST entries. Each of these units is described in more detail below.

DMA Arbiter Multiplexer (DAM) Unit

The DAM unit 730 manages DMA requests from various sources (IDM 736, OSM 738, LFM 734, and ERQ manager unit 740) and routes the selected source's signals to the host system interface unit 702. The IDM 736 and ERQ manager 740 units initiate read and write requests to the host memory 228, the IDM 736 initiates write requests, and the OSM 738 initiates read requests. The DAM unit 730 arbitrates between these four sources and selects the source having the highest priority. Preferably, the priority scheme is such that the highest priority is given to the LFM 734, then the ERQ manager unit 740, followed by the IDM 736, and lastly the OSM 738. When a source is selected, the source's request and associated data is transmitted to the host system interface unit 702. The DAM unit 730 generates and appends parity data to the write data transmitted from the ERQ manager unit 740 and the LFM 734.

Figure 24A:
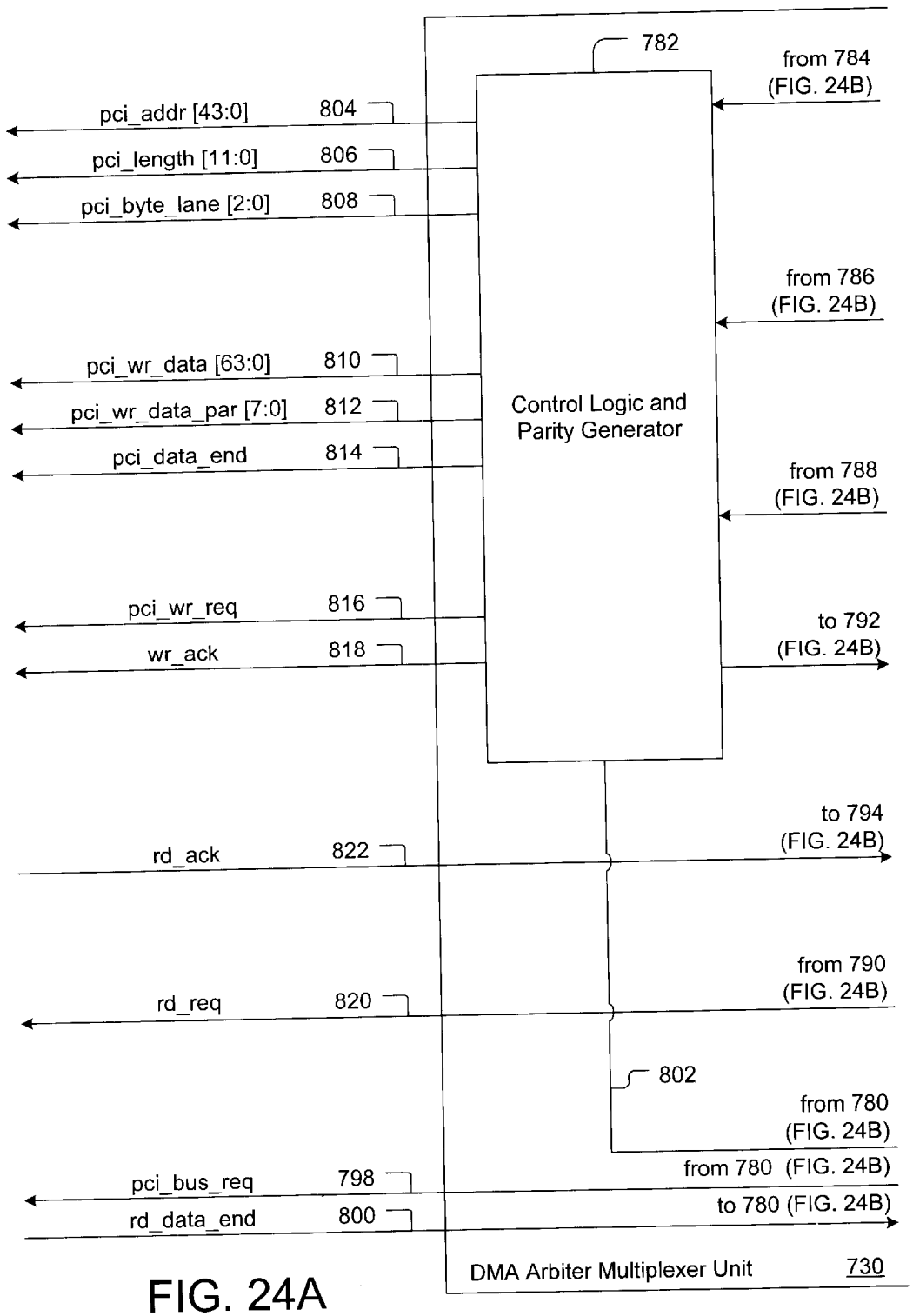
FIG. 24 is a block diagram depicting the DMA arbiter multiplexer unit (DAM) shown in FIG. 23.
Figure 24B:
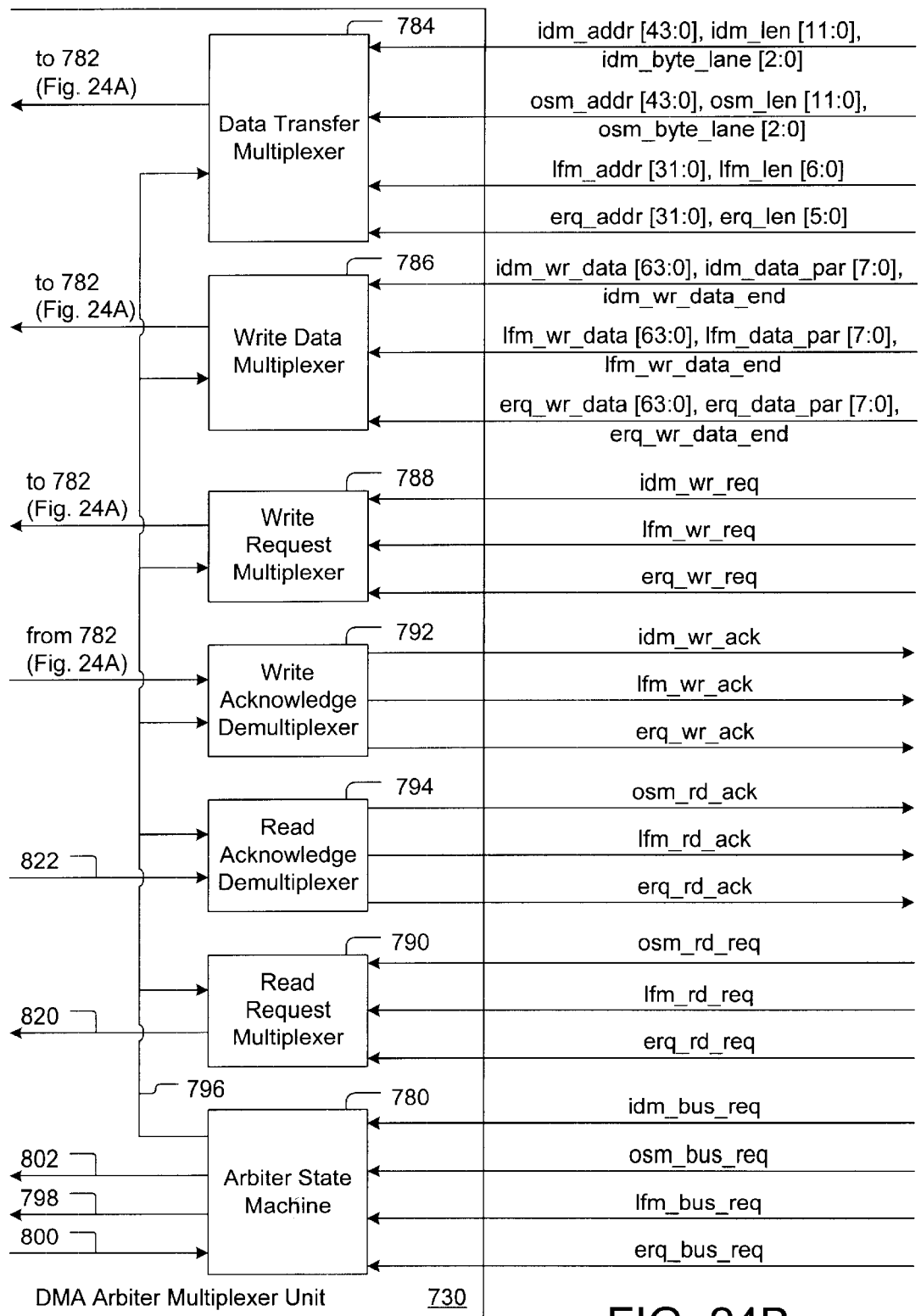

FIG. 24 illustrates the DAM unit 730 is more detail. There is shown an arbiter state machine 780, a control logic and parity generator 782, and several multiplexers 784–790 and demultiplexers 792–794. The arbiter state machine 780 receives a bus request signal from each of the four sources (idm_bus_req, osm_bus_req, lfm_bus_req, erq_bus_req) and selects the source with the highest priority. A select signal 796 is generated reflecting the selected source thereby enabling the multiplexers 784–790 to latch in the data from the selected source.

In addition, the arbiter state machine 780 asserts a bus request signal, pci_bus_req 798, to the host system interface unit 702 to initiate arbitration for the PCI bus. The host system interface unit 702 transmits a rd_data_end signal 800 to the arbiter state machine 780 signifying the completion of the transmission of read data. A control signal 802 is transmitted to the control logic and parity generator 782 to initiate the data transfer control and parity generation.

The control logic and parity generator unit 782 receives the multiplexed data signals and transmits the following signals to the host system interface unit 702: the pci_addr signal 804 reflects one of the address signals (idm_addr, osm_addr, lfm_addr, erq_addr); the pci length signal 806 reflects one of the length signals (idm_len, osm_len, lfm_len, erq_len); the pci_byte_lane signal 808 reflects one of the byte lane signals (idm_byte_lane, osm_byte_lane); the pci_wr_data signal 810 reflects the one of the write data signals (idm_wr_data, lfm_wr_data, erq_wr_data); the pci_wr_data_par signal 812 reflects one of the write data parity signals 744 (idm_wr_data, lfm_wr_data, erq_wr_data); the pci_wr_data_end signals 814 reflects one of the end of write data signals (idm_wr_data_end, lfm_wr_data_end, erq_wr_data_end); and the pci_wr_req signal 816 reflects one of the write request signals (idm_wr_req, lfm_wr_req, erq_wr_req).

For write data received from the IDM 736, LFM 734, and ERQ manager unit 740, parity is added to the write data. A write acknowledgment signal, wr_lack, 818 is received from the host system interface unit 702 which the control logic and parity generator unit 782 transmits to the selected source through a write acknowledge demultiplexer 792.

The DAM unit 730 has a data transfer multiplexer 784, a write data multiplexer 786, a write request multiplexer 788, a write acknowledge demultiplexer 792, a read acknowledge demultiplexer 794, and a read request multiplexer 790. The data transfer multiplexer 784 receives an address signal (idm_addr, osm_addr, idm_addr, erq_addr), a length signal (idm_len, osm_len, idm_len, erq_len), and from the IDM 736 and the OSM 738 units a byte lane signal (idm_byte_lane, osm_byte_lane). The address signals indicate the address of the initial memory location where the first unit of data is to be stored. Subsequent data units are stored in higher addressed consecutive memory locations. The length signals indicate the amount of data that is transmitted, and the byte lane signals are used to indicate which is the first valid data byte.

The write data multiplexer 786 receives the write data (idm_wr_data, lfm_wr_data, erq_wr_data) from the IDM 736, LFM 734, ERQ manager unit 740 in addition to parity bytes (idm_data_par, lfm_data_par, erq_data_par), and a write end signal (idm_wr_data_end, lfm_wr_data_end, erq_wr_data_end) signifies the completion of the write data transfer to the DAM unit 730.

The write request multiplexer 788 receives write request signals (idm_wr_req, lfm_wr_req, erq_wr_req) from the three sources that initiate write requests. The write acknowledge demultiplexer 792 transmits the write acknowledgment, wr_lack 818, received from the PCI bus to the selected source (idm_wr_lack, lfm_wr_lack, erq_wr_lack) so that more write data can be transmitted to the host system 222.

The read request multiplexer 790 receives read request signals (osm_rd_req, lfm_rd_req, erq_rd_req) from the OSM 738, LFM 734, and ERQ manager unit 740 and transmits the selected signal, rd_req 820, to the host system interface unit 702 in order to initiate a read request to the host memory 228. The read acknowledge demultiplexer 794 transmits the read acknowledgement, rd_lack 822, received from the PCI bus to the selected source. The read acknowledgment signal (osm_rd_lack, lfm_rd_lack, erq_rd_lack) indicates to the selected source that the data on the PCI bus is valid.

Figure 25:
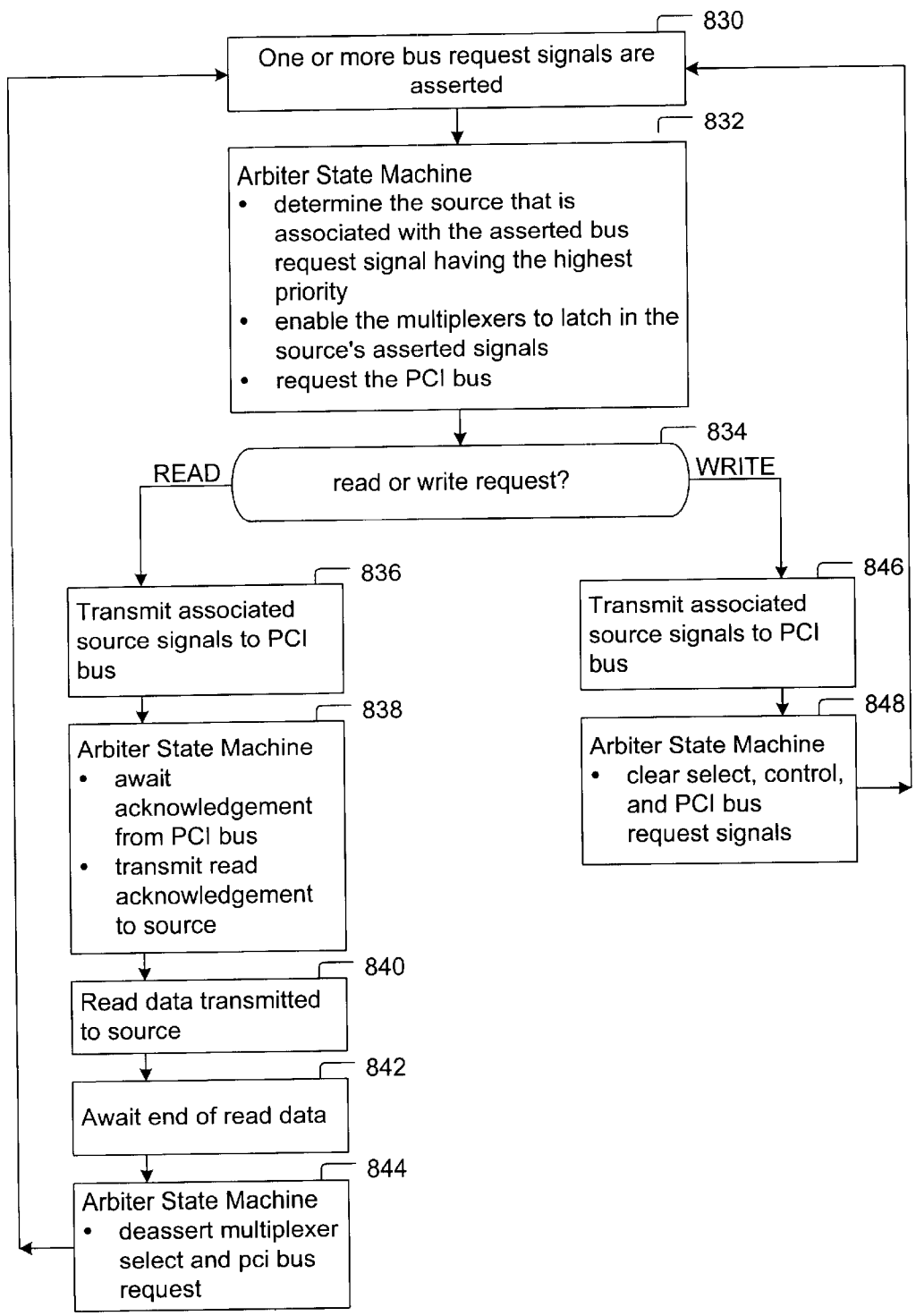
FIG. 25 is a flow chart illustrating the steps used by the DAM unit shown in FIG. 24.

FIG. 25 illustrates the manner in which the DAM unit 730 operates. The DAM unit 730 receives one or more asserted bus request signals (idm_bus_req, osm_bus_req, lfm_ bus_req, erq_bus_req) indicating the need for a DMA read or write operation to be performed to or from the host memory 228 (step 830).

In response, the arbiter state machine 780 determines which request will be serviced, latches in the data needed for the DMA operation, and requests the PCI bus from the host system interface unit 702 (step 832). The arbiter state machine 780 selects the request associated with the higher priority source and sets the select signal 796 to reflect the higher priority source. This enables the multiplexers 784–790 to latch in the data associated with the selected source. The control signal 802 is set to enable the control logic and parity generator unit 782 to enable the data transfer and to generate and append parity to the write data. In addition, the arbiter state machine 780 initiates a request for the PCI bus to the host system interface unit 702.

For a read DMA request (step 834—READ), the signals associated with the read DMA request are transmitted to the PCI bus through the host system interface unit 702. The control logic and parity generator 782 transmits the data transfer signals pertaining to the read DMA operation (i.e., address, length, and byte lane signals) to the host system interface unit 702 and the read request multiplexer 790 generates the rd_req signal 820 as well (step 836).

The arbiter state machine 780 then waits for acknowledgment from the host system interface unit 702 when the read data is available (step 838). This occurs when the rd_data_end signal 800 is asserted. The arbiter state machine 780 transmits this signal to the selected source (step 838). The read data is then transmitted to the selected source directly from the PCI bus (step 840). At the completion of the transmission, the arbiter state machine 780 receives an asserted rd_data_end signal 800 indicating the completion of the read data transfer (step 842) and in response, the arbiter state machine 780 deasserts the pci_bus_req signal 798 and clears the control 802 and select 796 signals (step 844).

For a write DMA request (step 834—WRITE), the signals associated with the write DMA request are transmitted to the PCI bus through the host system interface unit 702 (step 846). The control logic and parity generator unit 782 transmits the data transfer signals pertaining to the write DMA operation 804–816 (i.e., write request, address, length, byte lane, write data, write data parity and end-of-write data signals) to the host system interface unit 702. Parity is generated and appended to the write data associated with the ERQ manager unit 740, LFM 734, and IDM 736 (e.g., completion messages). At the completion of the data transfer, the arbiter state machine 780 deasserts the pci_bus_req 798 and clears the select 796 and control 802 signals (step 848).

The foregoing description described the structure and operation of the DAM 730. Attention now turns to the slave register unit 732.

Slave Register Unit

The slave register unit 732 is a central location that is used by the host system 222 to access data that is used to control the FC controller 224. The host system 222 accesses the registers in the slave register unit 732 in order to configure the FC controller 224, to update the host interface data structures 226, to control certain operations performed by the FC controller 224, as well as enable communications with the FC controller 224. Some of the registers are physically located in the slave register unit 732 and others are located in different units throughout the FC controller 224. For those registers located outside the slave register unit 732, the slave register unit 732 provides write enable signals so that the write data can be directly stored into those registers. All registers are mapped to either the PCI memory space or to PCI I/O space.

Figure 26:
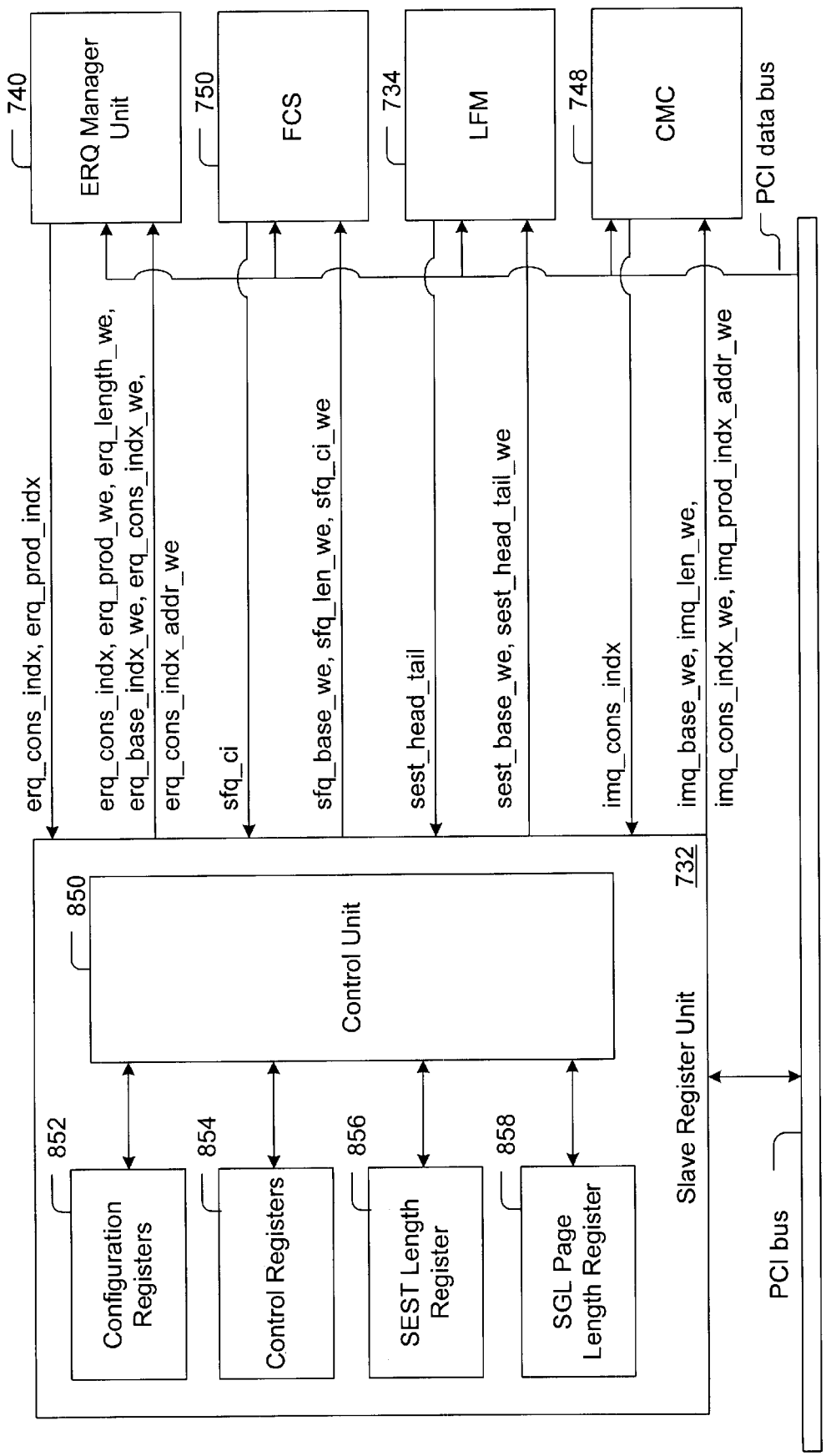
FIG. 26 is a block diagram showing the components of the slave register unit shown in FIG. 23.

FIG. 26 illustrates the structure and operation of the slave register unit 732.

There is shown a control unit 850 coupled to a set of configuration registers 852, a set of control registers 854, the SEST length register 856, and the scatter gather list (SGL) page length register 858. The control unit 850 manages the operation of the slave control unit 732.

The configuration registers 852 can include FC controller 224 and PCI configuration registers (not shown). The FC controller configuration registers 852 contain configuration information for the FC controller 224. The PCI configuration registers 852 are used to enable the FC controller 224 to utilize the PCI bus. A more detailed description of the PCI configuration register space is found in the PCI references noted above.

The control registers 854 are used by the host system 222 to control the operation of portions of the FC controller 224. The SEST length register 856 indicates the number of 64-byte SEST entries in the SEST 236 and the SGL page length register 858 indicates the length of a single scatter or gather list page.

The slave register unit 732 is coupled to the PCI bus through the host system interface unit 702 and receives read and write access requests as well as read and write data from the PCI bus. Upon receipt of a read or write access request, the control unit 850 enables the requested access if it corresponds to the configuration, control, SEST length, and SGL page length registers 852–858. For all other register write accesses, a corresponding write enable signal is generated.

The slave register unit 732 asserts write enable signals for the ERQ manager unit 740, the Fibre Channel Services (FCS) unit 750, the SEST Link Fetch Manager (LFM) unit 734, the Completion Message Manager (CMC) unit 748.

For the ERQ manager unit 740, the slave register unit 732 can assert any one of the following write enable signals that pertain to the ERQ: erq_prod_indx_we, which enables a write to the ERQ producer index register; erq_base_we, which enables a write to the ERQ base register; erq_length_we, which enables a write to the ERQ length register; eq_length_we, which enables a write to the ERQ length register; erq_cons indx_we, which enables a write to the ERQ consumer index regiser; and erq_cons indx_addr_we, which enables a write to the ERQ consumer index address register.

For the FCS 750, the slave register unit 732 asserts the following write enable signals: sfq_base_we, which enables a write to the SFQ base register; sfq_len_we, which enables a write to the SFQ length register; and sfq_ci_we, which enables the SFQ consumer index register.

For the LFM 734, the slave register unit 732 asserts the following write enable signals: sest_base_we, which enables a write to the SEST base register; and sest_head_tail_we, which enables a write to the SEST head and tail register.

For the CMC 748, the slave register unit 732 asserts the following write enable signals: imq_base_we, which enables a write access to the IMQ base register; imq_len_we, which enables a write access to the IMQ length register; imq_prod_indx_addr_we, which enables a write access to the IMQ producer index address register; imq_cons_indx_we, which enables a write access to the IMQ consumer index register.

In addition, the ERQ manager unit 740, FCS 750, LFM 734, and CMC 748 are directly coupled to the PCI data bus which transmits the write data into the mapped registers once the corresponding write enable is asserted.

The slave register unit 732 manages host read accesses to certain registers. The control unit 850 receives the requested read data which is then transmitted to the PCI bus. For the ERQ manager unit 740, the host system can read the ERQ consumer index, erq_cons_indx, and the ERQ producer index, erq_prod_indx. For the FCS 750, the host system 222 can read the SFQ consumer index, sfq_ci. The slave register unit 732 also enables read accesses by the host system to the SEST head and tail, sest_head_tail which is stored in the LFM 734, and the IMQ consumer index which is stored in the CMC 748.

The foregoing description has described the architecture and operation of the slave register unit 732. Attention now turns to the SEST Link Fetch Manager 734.

SEST Link Fetch Manager (LFM) Unit

The LFM unit 734 manages accesses to the SEST entries for the SEM-IN 752 and SEM-OUT 742 units as well as manage the SCSI Linked List 250.

The SEM-OUT unit 742 manages the outbound phases of a SCSI I/O transaction. One task of the SEM-OUT unit 742 is to generate ODBs which are transmitted to the OSM 738. In order to perform this task, SEM-OUT 742 requests SEST entries from the LFM unit 734. The SEM-OUT unit 742 is also responsible for updating an SEST entry when OSM 738 finishes a sequence transmission. The SEM-OUT unit 742 accomplishes this by requesting the LFM 734 to write specified data in a SEST entry. In addition, LFM 734 provides SEM-OUT 742 with entries from the SCSI Linked List 250. The SCSI Linked List 250 contains SEST entries that require an outbound sequence and the SEM-OUT unit 742 initiates such a sequence.

In sum, the LFM unit 734 receives from the SEM-OUT unit 742 the following commands:

Q_FETCH $_{13}$ instructs the LFM unit 734 to retrieve a complete SEST entry which is then transmitted to SEM-OUT 742;

LL_FETCH _instructs the LFM unit 734 to obtain the next SEST entry on the SCSI Linked List 250 which is transmitted to SEM-OUT 742;

WRITEBACK _instructs the LFM unit 734 to write the contents of an SEST entry back into the SEST; and INVALIDATE _instructs the LFM unit 734 to write data into an SEST entry located in the host memory 228.

The SEM-IN unit 752 parses the inbound frames and requests L/A pairs that are delivered to IDM 736. The L/A pairs are part of a SEST entry and as such, the LFM unit 734 obtains the associated SEST entry in order retrieve the associated L/A pair. In addition, the SEM-IN unit 752 instructs the LFM 734 to place SEST entries onto the SCSI Linked List 250 when an outbound sequence is needed.

In sum, the LFM unit 734 receives from the SEM-IN unit 752 the following commands:

FETCH_Alq_instructs the LFM unit 734 to get 4 L/A pairs which are then passed to SEM-IN 752;

FETCH-SEST-AL0—instructs the LFM unit 734 to get the first L/A pair of a specific SEST entry which is then passed to SEM-IN 752;

FETCH-SEST—instructs the LFM unit 734 to retrieve from host memory 228 an entire SEST entry;

FETCH-SEST2—instructs the LFM unit 734 to retrieve a certain portion of a SEST entry;

LINK_SEST—instructs the LFM unit 734 to transfer a SEST entry from the SEM-IN unit 752 to the SEM-OUT unit 742 and to link it into the SCSI Linked List 250; and FLUSH_SEST and FLUSH-SEST1—instructs the LFM unit 734 to write a specified portion of data in a specific SEST entry.

Figure 27:
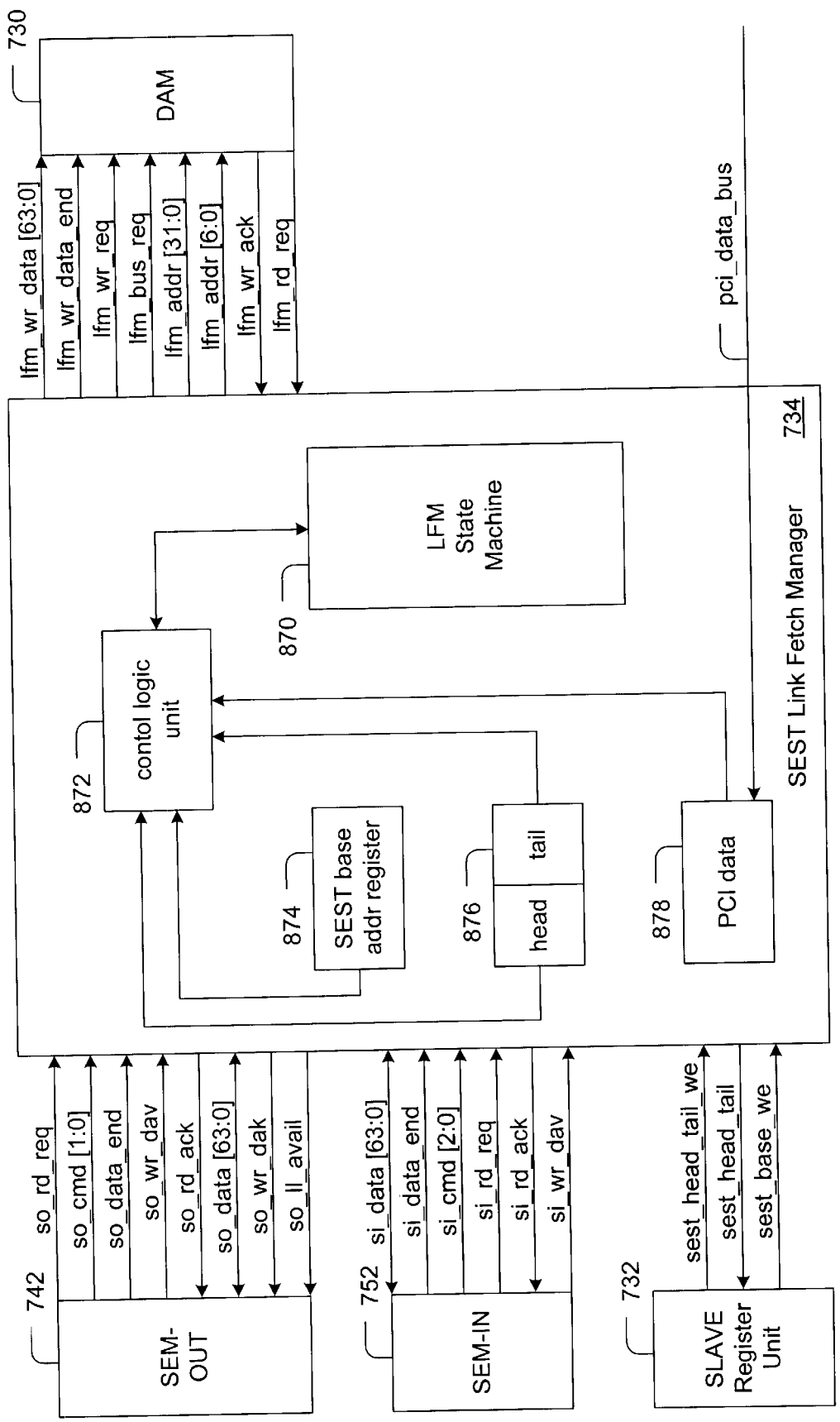
FIG. 27 is a block diagram showing the components of the SEST link fetch manager (LFM) unit shown in FIG. 23.

FIG. 27 illustrates the LFM unit 734. There is shown a LFM state machine 870, a control logic unit 872, the SEST base address register 874, the SCSI Linked List head/tail pointer register 876, and a register to buffer the PCI data 878. The SEST base address register 874 holds the base memory address in host memory 228 for the SEST. The SCSI LL head/tail pointer register 876 stores the pointers to the head and tail of the SCSI LL 250. The PCI data register 878 buffers the data received from the PCI bus which was requested from the host memory 228.

The LFM 734 is coupled to the DAM 730, the SEM-OUT unit 742, the SEM-IN unit 752, and the slave register unit 732. The LFM 734 accesses the SEST entries in host memory 228 through the DAM 730 and these requests were described above with respect to the operation of the DAM 730. The slave register unit 782 enables write access by the host system 222 to the SEST base address register through the sest_base_we signal and enables write access by the host system 222 to the SCSI LL 250 head/tail register through the sest sest_head_tail_we signal.

The LFM 734 and SEM-OUT 742 units exchange data through the following signals:

so_rd_req—read request line from SEM-OUT 742; enables data transfer from LFM 734 to SEM_OUT 742;

so_cmd—command bus for initiating data transfers between SEM-OUT 742 and LFM 734;

so_data_end—indicates the last data word in on the so_data bus;

so_wr_dav—write request line from SEM-OUT 742 to LFM 734; enables a data transfer from SEM-OUT 742 to LFM 734;

so_rd_ack—indicates to SEM-OUT 742 that data on the so_data bus is valid;

so_data—data bus for exchanging data between LFM 734 and SEM-OUT 740; and so_11_avail—asserted to SEM-OUT 740 when there is an entry in SCSI LL 250 and when SEM-IN 752 is preparing to link an entry into SCSI LL 250.

The LFM 734 and SEM-IN 752 units exchange data through the following signals:

si_rd_req—read request line from SEM-IN 752; enables data transfer from LFM 734 to SEM_IN 752;

si_cmd—command bus for initiating data transfers between SEM-IN 752 and LFM 734;

si_data_end—indicates the last data word in on the si_data bus;

si_wr_dav—write request line from SEM-IN 752 to LFM 734; enables a data transfer from SEM-IN 752 to LFM 734;

si_rd_ack—indicates to SEM-IN 752 that data on the si_data bus is valid; and si_data—data bus for exchanging data between LFM 734 and SEM-IN 752.

Figure 28A:
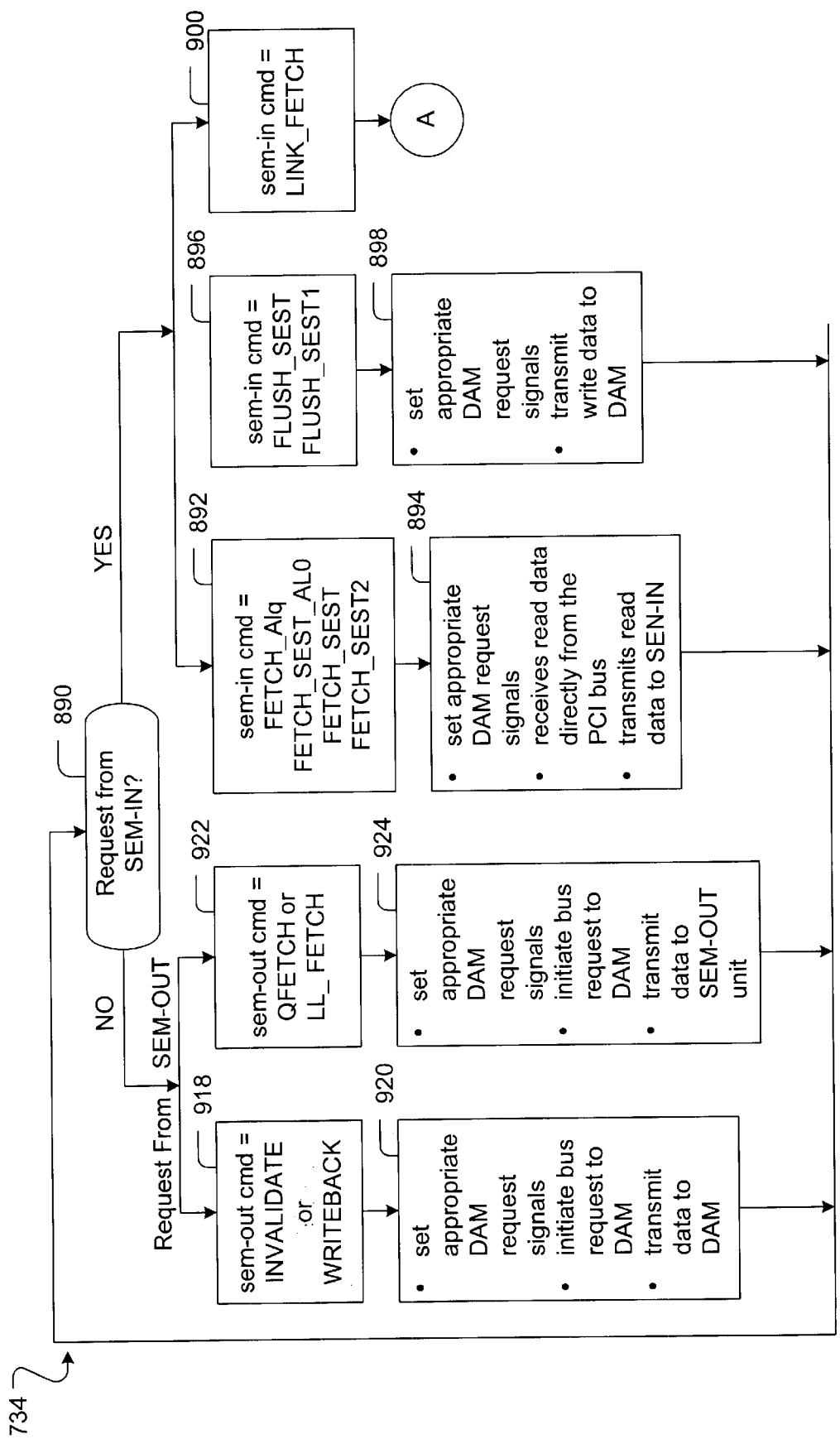
FIGS. 28A–28B are flow charts illustrating the steps used by the LFM unit shown in FIG. 27.
Figure 28B:
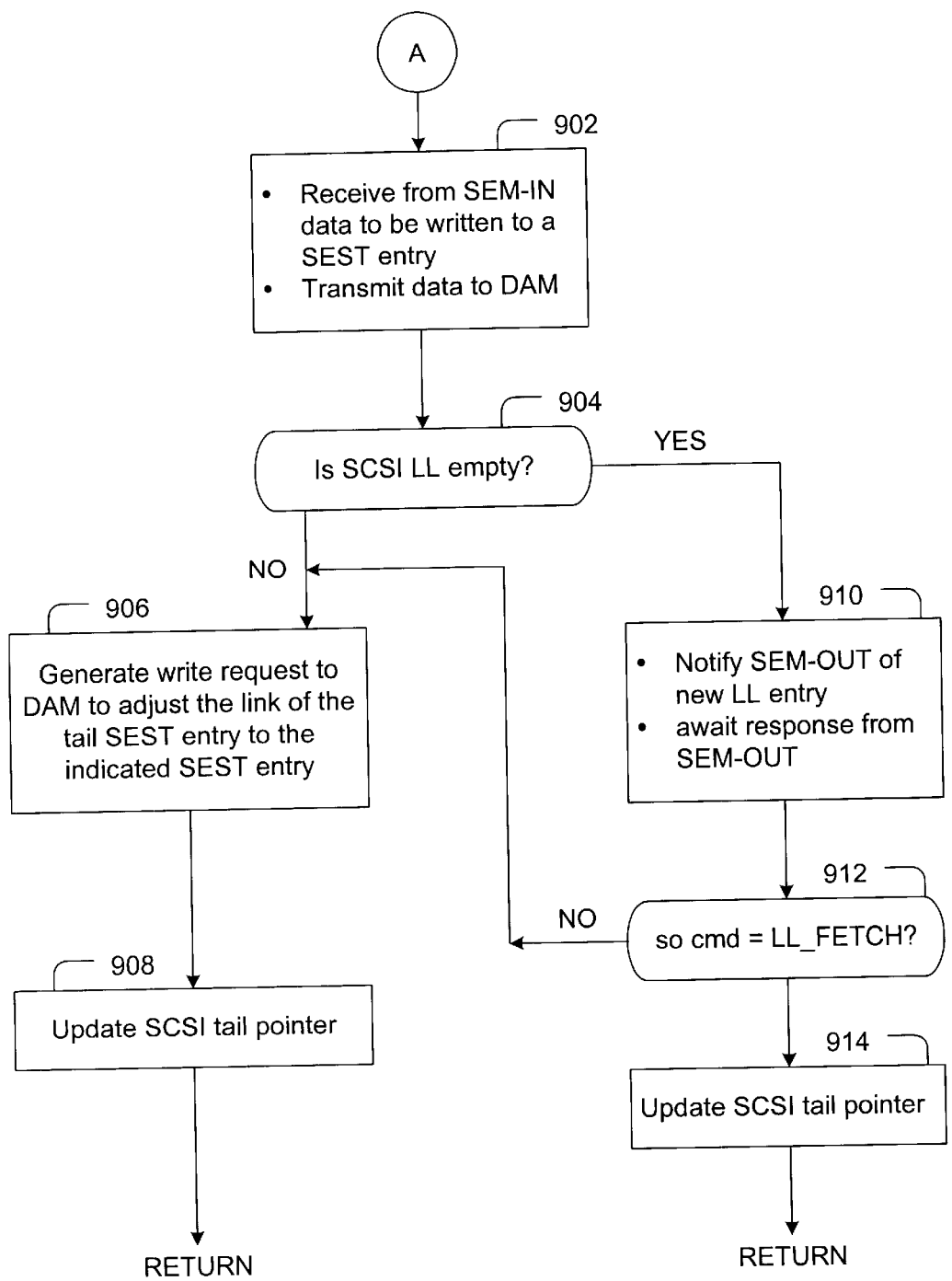

FIGS. 28A–28B illustrate the operation of the LFM 734. Referring to FIG. 28A, the LFM state machine 870 receives read request (si_rd_req, so_rd_req) and write data available (si_wr_dav, so_wr_dav) signals from the SEM-IN 752 and SEM-OUT 742 units. Requests from the SEM-IN unit 752 have priority over requests from the SEM-OUT unit 742. Thus, the LFM state machine 870 services the read request signal from SEM-IN 752 if asserted (step 890— YES).

The LFM state machine 870 then decodes the si_cmd signal asserted from SEM-IN 752 to determine the type of request that is initiated by the SEM-IN unit 752. If the command is either FETCH_Alq, FETCH_SEST_AL0, FETCH_SEST, or FETCH_SEST2 command (step 892), then the control logic unit 872 receives the address of the data to be retrieved from SEM-IN 752 (si_data) and generates the appropriate request signals to the DAM 730 to obtain the requested data (step 894). The data is received directly from the PCI bus (pci_data_bus) and stored in the PCI data register 878 and then transmitted to SEM-IN 752 (step 894).

If the command from SEM-IN 752 is FLUSH_SEST or FLUSH_SEST1, the LFM state machine 870 sets the appropriate signals for the control logic unit 872 to obtain the write data from SEM-IN 752 and sets the appropriate signals to request the write operation to the DAM 730 (step 898).

FIG. 28B illustrates the steps that are performed when the command from SEM-IN 752 is a LINK_FETCH command (step 900). The address of a specified SEST entry and the data to be written to that SEST entry is received from SEM-IN 752 (step 902). The appropriate request signals are generated to the DAM 730 to initiate a write request to the specified location in host memory 228 (step 902). If the SCSI LL 250 is not empty (step 902—NO), then an SEST entry is placed onto the SCSI LL 250 (steps 906–908). The link field in the SEST entry pointed to by the SCSI tail pointer 876 is updated to reflect the added SEST entry (step 906). This is accomplished by generating a write request to the DAM 730 to adjust this link field (step 906). Lastly, the SCSI tail pointer 876 is updated to reflect to the added SEST entry (step 908).

When the SCSI LL 250 is empty (step 904—YES), the LFM 734 notifies the SEM-OUT unit 742 of an available SEST entry and awaits a response from the SEM-OUT unit 742 (step 910). If the received response, so_cmd, is a LL_FETCH command (step 912—YES), then the data received from the SEM-IN unit 752 is passed to the SEM-OUT unit 742 (step 914). If the SEM-OUT unit 742 does not transmit a LL_FETCH command (step 912—NO), then the SEST entry is placed to the tail of the SCSI LL 250 (steps 906–908).

Referring back to FIG. 28A, requests from SEM-OUT 742 are handled when there are no requests from SEM-IN 752. If the command from SEM-OUT 742 is INVALIDATE or WRITEBACK (step 918), then data is written out to a specified SEST entry (step 920). The write data is received from SEM-OUT 742 and the control logic unit 872 generates the appropriate request signals to DAM 730 to initiate the write to host memory 228 (step 920). For a QFETCH or LL_FETCH command from SEM-OUT 742 (step 922), a specified SEST entry is requested from host memory 228 (step 924). The index or offsetof the SEST entry is received from SEM-OUT 742 and the control logic unit 872 generates the appropriate signals for the DAM 730 to read the SEST entry (step 924). The read data is stored in the PCI data register 878 and transmitted to the SEM-OUT 742 (step 924).

The foregoing description describes the architecture and operation of the SEST Link Fetch Manager Unit. Attention now turns to the outbound sequence and exchange management unit.

Outbound Sequence and Exchange Management Unit

The outbound sequence and exchange management unit 712 manages the phases of a SCSI exchange that requires a FC sequence. This unit 712 includes an ERQ manager unit 740, a SCSI exchange manager outbound unit (SEM-OUT) 742, and an outbound sequence manager (OSM) 738. Each of these units will be discussed in further detail below.

ERQ Manager Unit

The ERQ manager unit 740 retrieves IRB entries from the ERQ 230 in the host memory 228 and transfers them to the SEM-OUT unit 742. In addition, the ERQ manager unit 740 maintains the ERQ producer index 932.

Figure 29A:
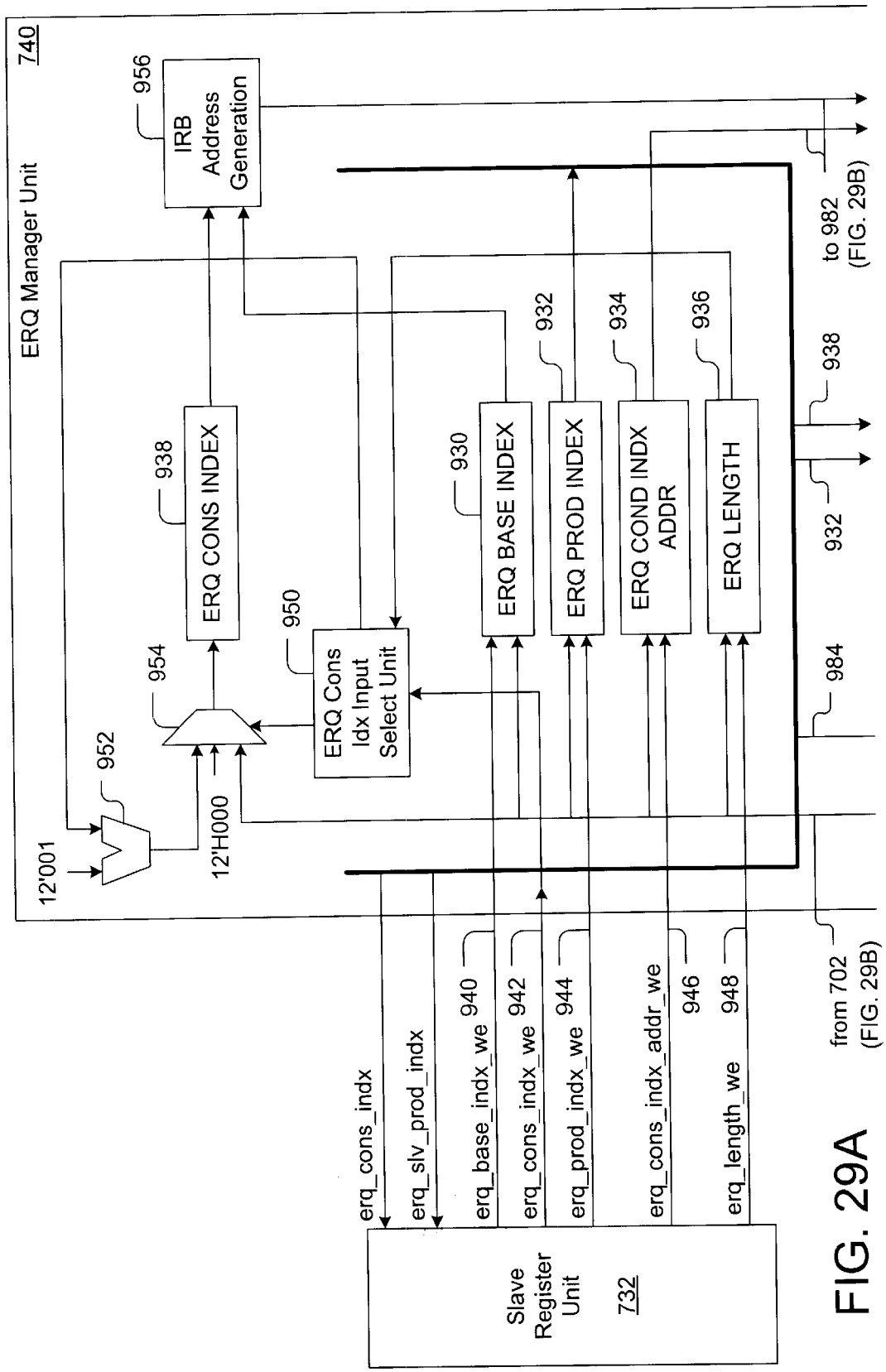
FIG. 29 is a block diagram depicting the ERQ manager unit shown in FIG. 23.
Figure 29B:
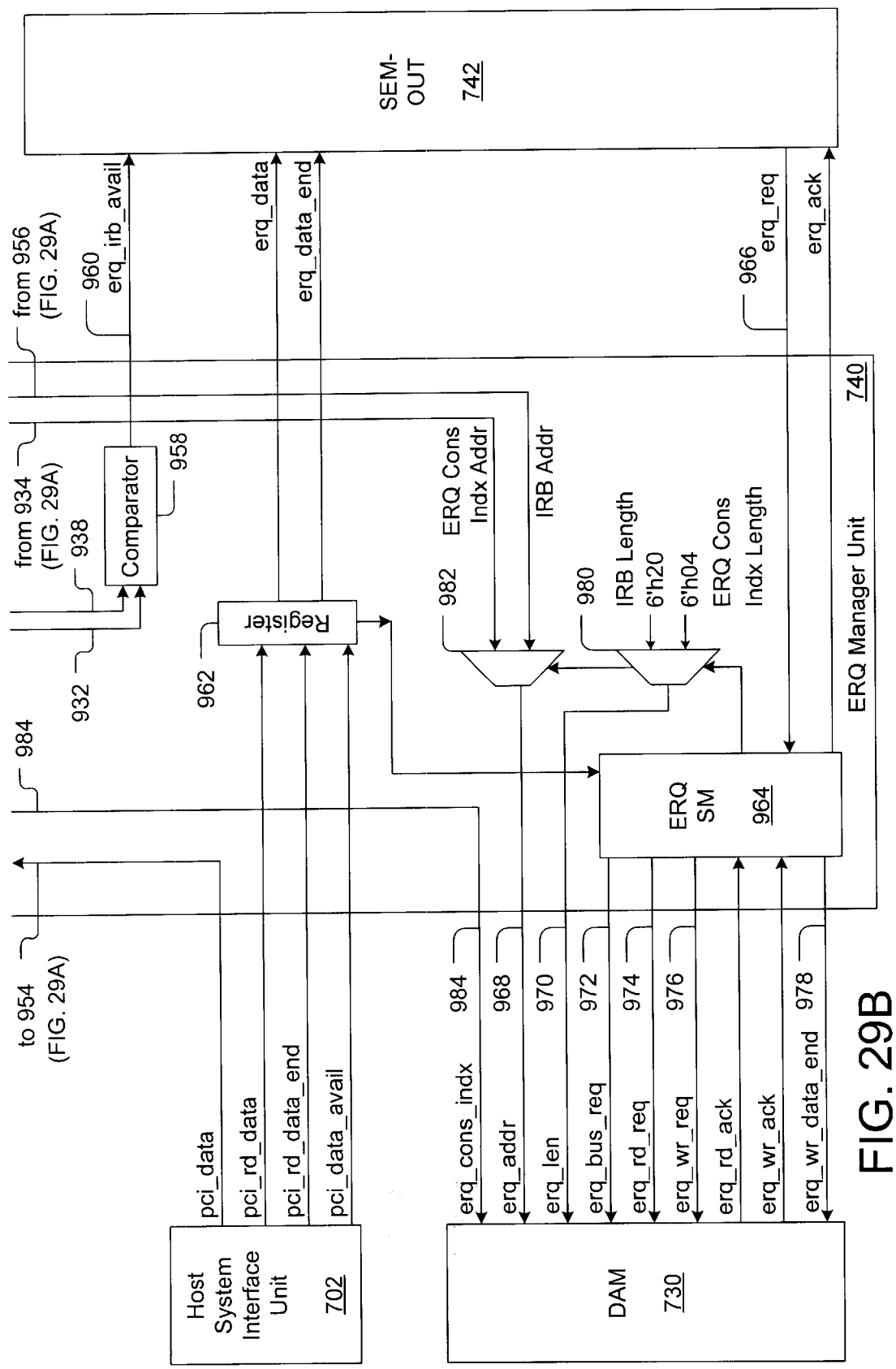

FIG. 29 illustrates the architecture of the ERQ manager unit 740. There is shown an ERQ base index register 930, an ERQ producer index register 932, an ERQ consumer index address register 934, an ERQ length register 936, and an ERQ consumer index register 938. The ERQ base index register 930 stores the base memory location in the host memory 228 of the ERQ 230. The ERQ producer index register 932 stores the producer index, the ERQ consumer index address register 934 stores the address of the consumer index, the ERQ length register 936 stores the length of the ERQ 230, and the ERQ consumer index register 938 stores the consumer index of the ERQ 230. The slave register unit 732 sets the initial values for these registers 930–938 through their respective write enable signals 940–948.

An ERQ consumer index input select unit 950 is provided which controls the input sources for the ERQ consumer index register 934. There are three such sources: the value provided by the host system 222 when the erq_cons_indx_we signal 942 is asserted; a clear, 12'h000, to the current value; and a queue wrap increment calculated by the adder 952 as the sum of the ERQ consumer index and the increment 12'h001. The ERQ consumer index input select unit 950 controls a multiplexer 954 that selects one of the three inputs as the value of the ERQ consumer index. The ERQ consumer index 938 is used as an input to an IRB address generation unit 956 along with the ERQ base 930 to generate the address for the next IRB in the ERQ 230.

The ERQ producer index 932 and the ERQ consumer index 938 are inputs to a comparator unit 958 that determines whether or not a valid entry exists in the ERQ. When the values of these two indices differ, the irb_avail signal 960 is asserted thereby notifying the SEM-OUT unit 742 that an IRB is available for processing.

An IRB is transmitted from host memory 228 to the ERQ manager unit 740 and latched into a register 962 before being transmitted to the SEM-OUT unit 742.

An ERQ state machine (SM) 964 is provided to manage the transfer of an IRB from the DAM 730 to the SEM-OUT unit 742. The ERQ SM 964 receives a request signal 966 from the SEM-OUT unit 742 and generates the appropriate request signals 968–978 to the DAM 730 to initiate a DMA read access for the IRB. In addition, the ERQ SM 964 initiates a DMA write access to write out the updated ERQ consumer index 984. Since the ERQ SM 964 performs both DMA requests to the DAM 730, a length multiplexer 980 is used to select the appropriate length signal 970 to the DAM 730, and an address multiplexer 982 is used to select the appropriate address signal 968 to the DAM 730.

Figure 30:
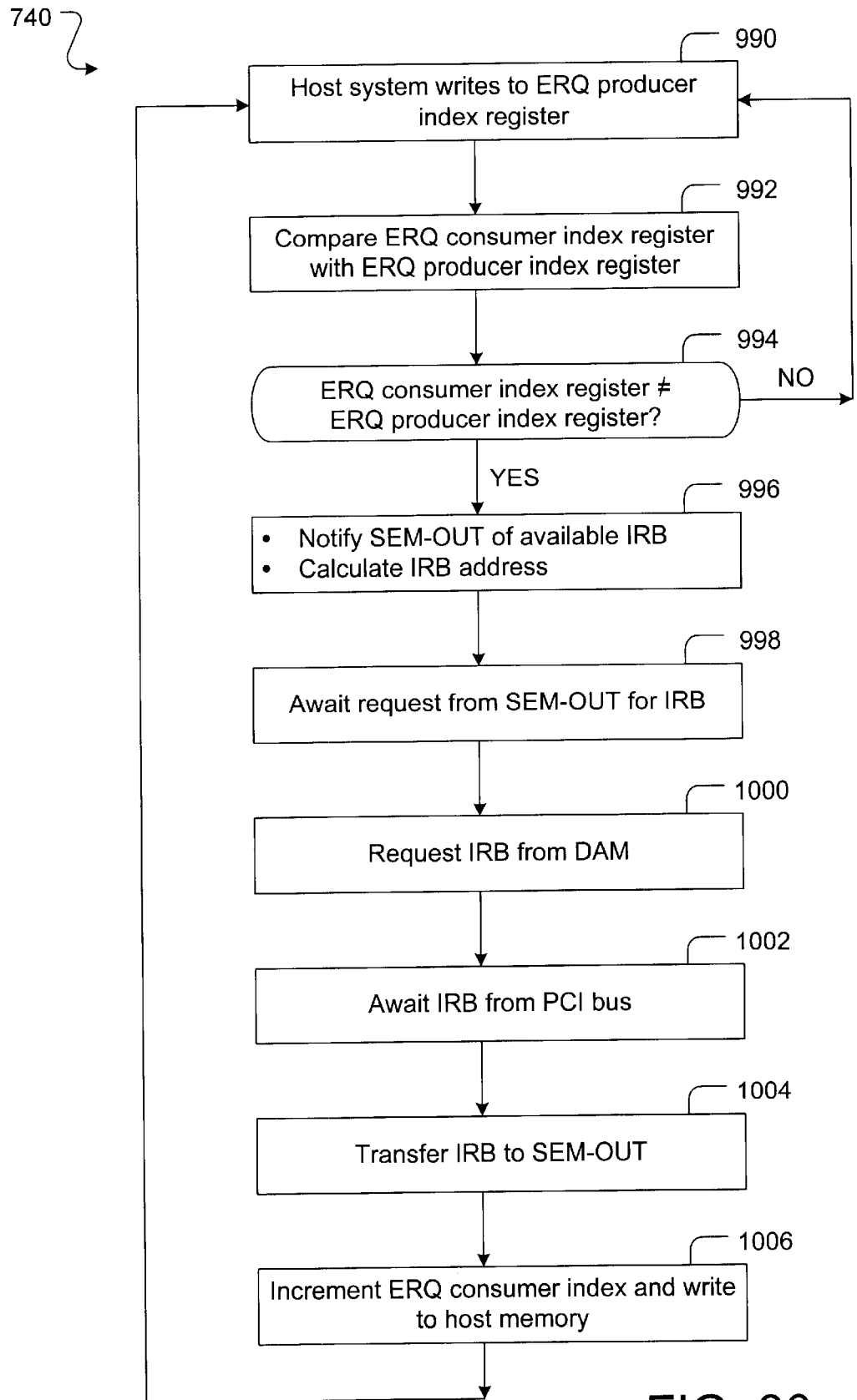
FIG. 30 is a flow chart illustrating the steps used by the ERQ manager unit shown in FIG. 29.

The operation of the ERQ manager unit 740 is more fully appreciated by considering FIG. 30. Initially, the host system 222 initializes the contents of the ERQ base 930, consumer 938, producer 932, length 936, consumer address 934 registers. Thereafter, the host system 222 notifies the FC controller 224 when an IRB is added to the ERQ 230 by writing to the ERQ producer index register 932 (step 990). The comparator 958 compares the values of the ERQ producer 932 and consumer 938 indices (step 992). If these values are equal (step 994—NO), then the entry is invalid and not processed. Otherwise (step 994—YES), if these values differ then the irb_avail signal 960 is asserted thereby notifying the SEM-OUT unit 742 of an available IRB (step 996).

Next, the IRB address is computed from the ERQ length 986 and the ERQ consumer index 938 (step 996). The ERQ manager unit 740 awaits notification from the SEM-OUT unit 742 when it is able to accept the IRB and such notification is manifested when the request signal 966 is asserted (step 998). When this notification is made, the ERQ SM 964 generates the appropriate signals to initiate a DMA read request to the DAM 730 to obtain the IRB specified by the IRB address and having the specified length (step 1000). The ERQ SM 964 sets the select signals to the multiplexers 980, 982 to obtain the IRB address and length.

The requested data is received from the host system interface unit 702 (step 1002) and latched into a register 962 and then transmitted to the SEM-OUT unit 742 (step 1004). Lastly, the consumer index 938 is incremented and its value is written back to the host memory 228 (step 1006). The ERQ SM 964 sets the select signals to the multiplexers 980, 982 to obtain the address and length associated with the ERQ consumer index 938. In addition, the ERQ SM 964 initiates a DMA write request to write out the new value of the ERQ consumer index 938 to the host memory 228.

The foregoing description has described the architecture and operation of the ERQ manager unit 740. Attention now turns to the SEM-OUT unit 742.

SCSI Exchange Manager Outbound (SEM-OUT)

The SEM-OUT unit 742 manages the outbound sequences for the FCP initiator and FCP target read and write operations. The SEM-OUT unit 742 initiates the process for an outbound sequence (e.g., FCP_CMD, FCP_, FCP_XFER_RDY, FCP_RSP) once it is notified that such a sequence is required. This happens in one of two ways. One such way occurs when an IRB is transmitted to the SEM-OUT unit 742 from the ERQ manager unit 740. A second way is when the SEM-IN unit 752 receives a frame indicating that an outbound sequence is needed. The SEM-IN unit 752, in turn, requests the LFM unit 734 to pass the associated SEST entry to the SEM-OUT unit 742.

In some cases, the IRB contains an I/O request having a single or multiple frame sequence. In the case of a multiple frame sequence, the SEM-OUT unit 742 utilizes the LFM unit 734 to obtain the associated SEST entry. In the case of a single frame sequence, the necessary information is contained in the IRB and there is no need to retrieve any additional control data from the host memory 228. However, a pseudo_SEST entry is generated for the single frame sequence so that it appears to have as a SEST entry. The SEM-OUT unit 742 can store a single IRB and two SEST entries at one time.

Figure 31:
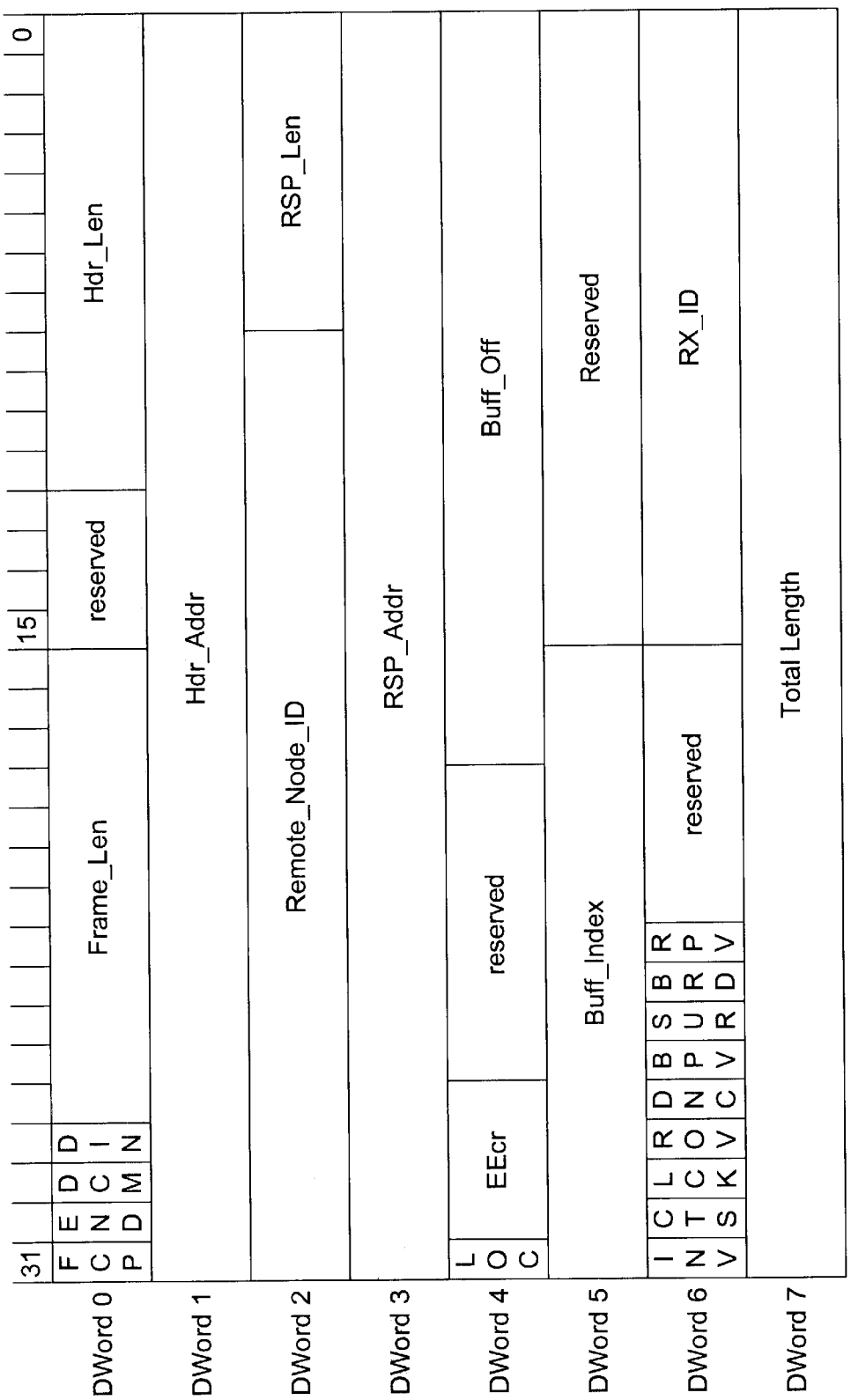
FIG. 31 illustrates the data format of an Outbound Description Block (ODB).

In order to initiate an outbound sequence, the SEM-OUT unit 742 generates outbound descriptor blocks (ODBs) that contain information describing the sequence. FIG. 31 illustrates the layout of an ODB and the fields on the ODB are described in further detail in Appendix G. The ODBs are transmitted to the OSM 738 and the OSM 738 uses the ODBs to continue processing the outbound sequence.

In certain circumstances, the OSM 738 instructs the SEM-OUT unit 742 to perform a Sequence Update Request (SUR). The SUR updates the SEST entry with status information once the corresponding sequence is completed.

Figure 32:
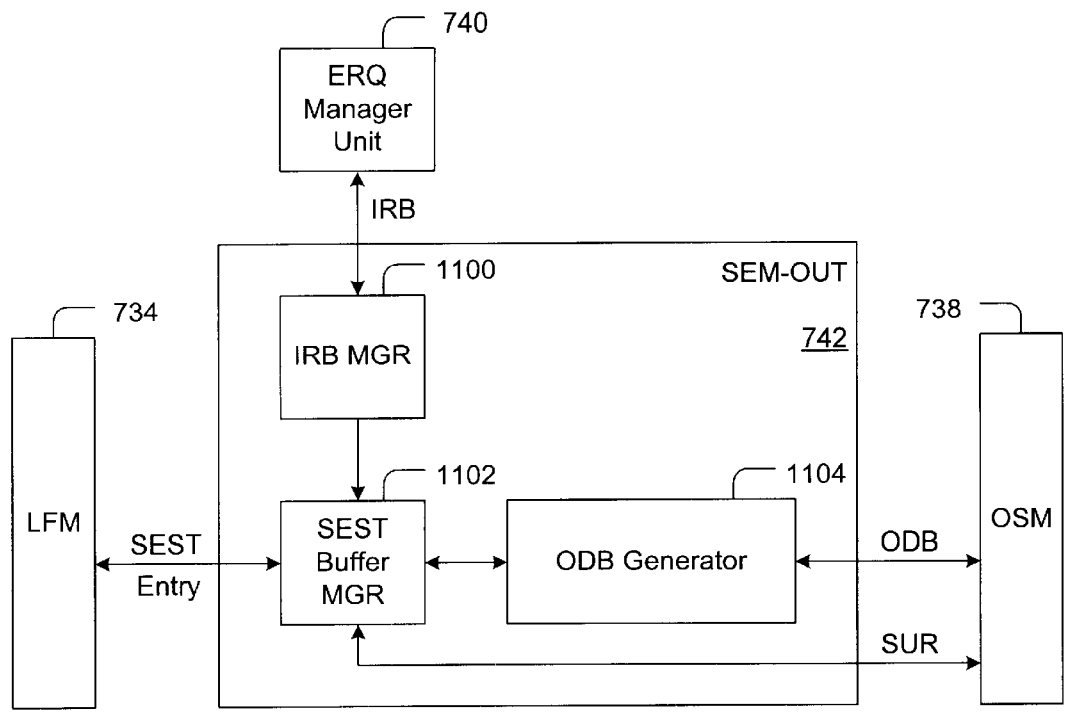
FIG. 32 is a block diagram depicting the SEM-OUT unit shown in FIG. 23.

FIG. 32 illustrates an architecture of the SEM-OUT unit 742. There is shown an IRB manager unit 1100, a SEST buffer manager unit 1102, and an ODB generator unit 1104. The IRB manager unit 1100 receives an IRB from the ERQ manager unit 740 and transmits the IRB to the SEST buffer manager unit 1102. The SEST buffer manager unit 1102 interfaces with the LFM 734 to retrieve SEST entries and in some instances updates these entries. The SEST buffer manager unit 1102 transmits the SEST entries to the ODB generator unit 1104 which maps the SEST entries into an associated ODB which is transmitted to the OSM unit 738. In some instances, the OSM unit 738 transmits a SUR back to the SEST buffer manager unit 1102 which the SEST buffer manager unit 1102 uses to update a SEST entry and then transmits the SEST entry to the LFM 734.

Figure 33:
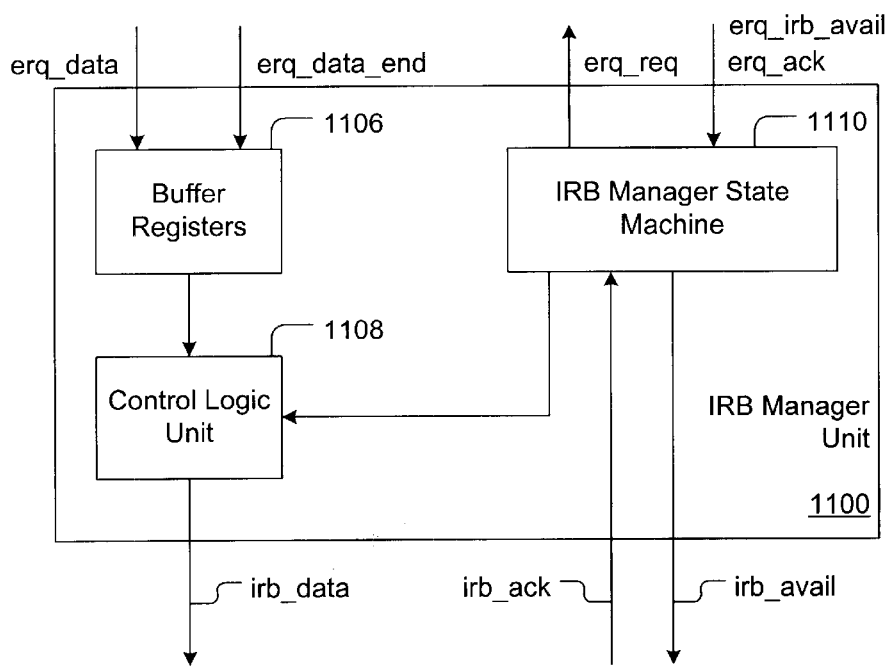
FIG. 33 is a block diagram depicting the IRB manager unit shown in FIG. 32.

FIG. 33 illustrates the structure of the IRB manager unit 1100. There is shown a set of buffer registers 1106 that store an IRB received from the ERQ manager unit 740. A control logic unit 1108 is coupled to the buffer registers 1106 and controls when the data in the buffer registers 1106 is transmitted to the SEST buffer manager unit 1102. The control logic unit 1108 is under the control of an IRB manager state machine 1110. The IRB manager state machine 1110 controls the data transfer between the ERQ manager unit 740 and the SEST buffer management unit 1102.

Figure 34:
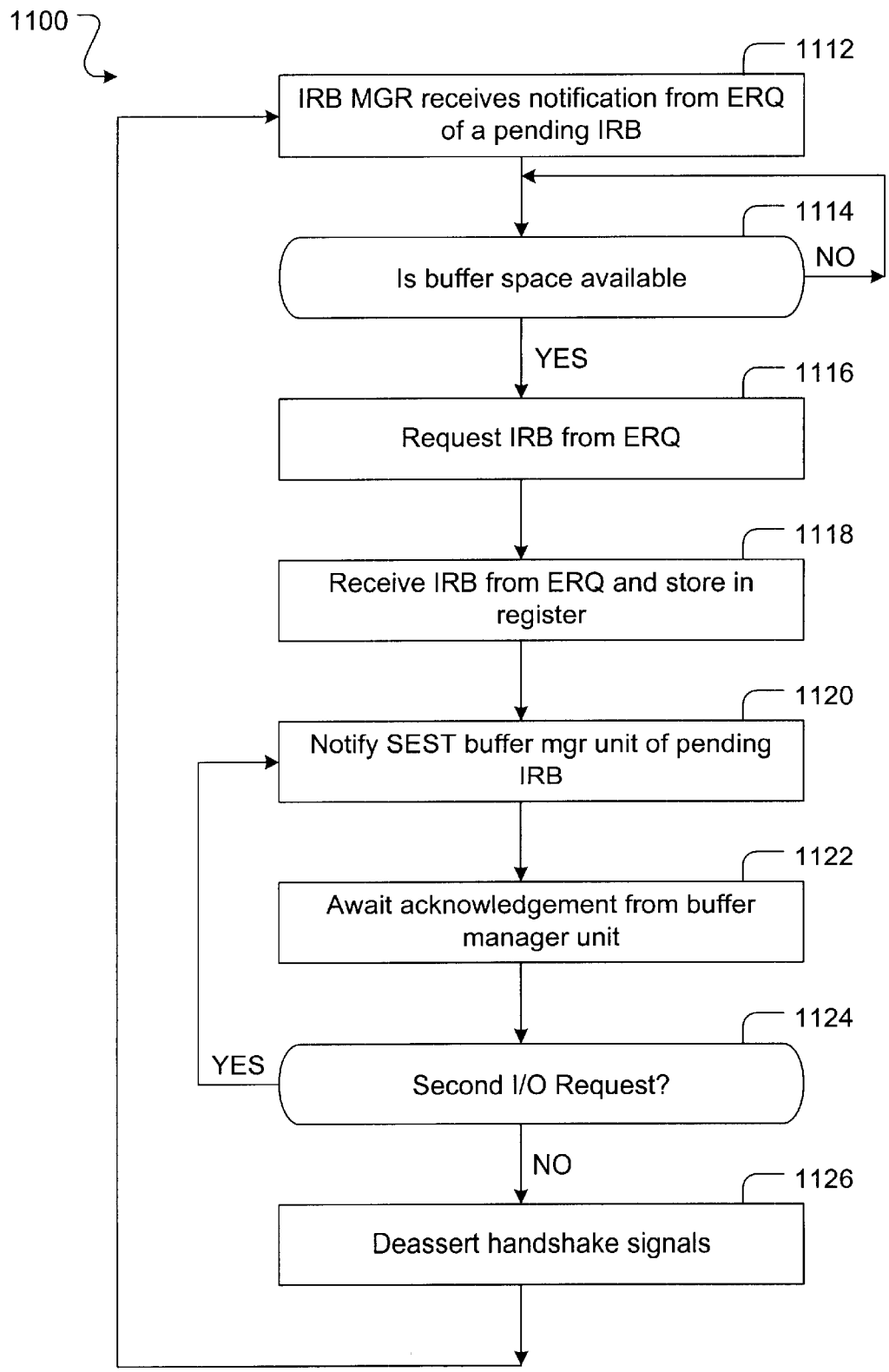
FIG. 34 is a flow chart illustrating the operation of the IRB manager unit shown in FIG. 33.

FIG. 34 illustrates the steps used by the IRB manager unit 1100. When an IRB is available, the IRB manager unit 1100 will receive notification from the ERQ manager unit 740 (i.e., asserted erq_irb_avail) (step 1112). The request is serviced when buffer space 1106 is available. The IRB manager unit 1100 has enough register space for one IRB entry which can contain at most two I/O requests. If space is not available (step 1114—NO), then the request is ignored until space becomes available. Otherwise (step 1114—YES), the IRB manager unit 1100 requests the IRB by asserting the erq_req signal (step 1116) and stores the IRB in the buffer registers 1106 (step 1118). The IRB manager state machine 1110 then notifies the SEST buffer management unit 1102 of the received IRB (i.e., asserts the irb_avail signal) and transmits the first I/O request on the irb_data bus (step 1120). When the SEST buffer management unit 1102 acknowledges receipt of the first I/O request (step 1122) and if the IRB has a second I/O request (step 1124—YES), then the second I/O request is transmitted to the SEST buffer management unit (step 1102). Otherwise (step 1124—NO), the IRB manager state machine 1110 clears the signals used to interface with the SEST buffer management unit 1102 and proceeds to the next request (step 1126).

Figure 35:
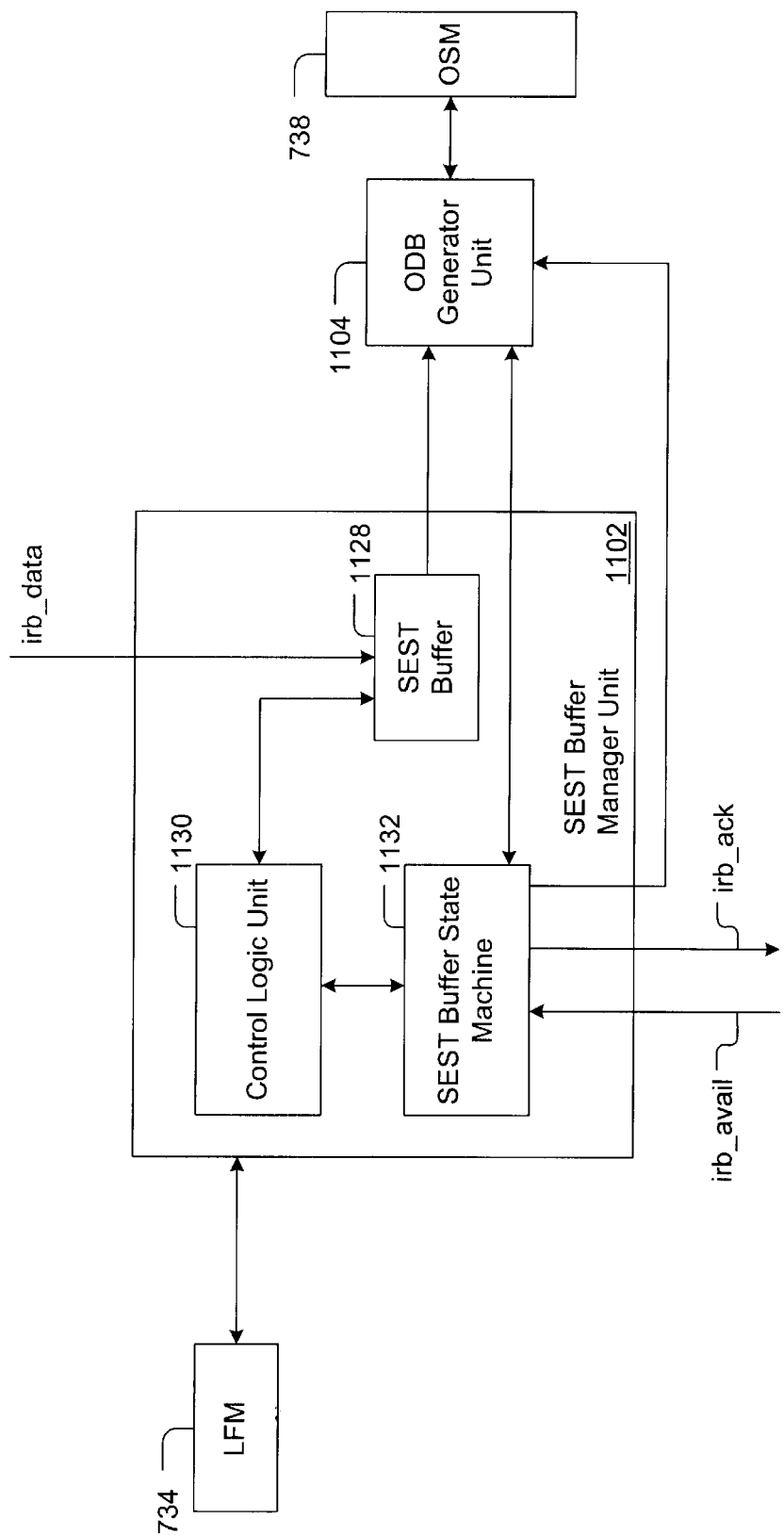
FIG. 35 is a block diagram illustrating the SEST buffer manager unit shown in FIG. 32.

FIG. 35 illustrates the SEST buffer manager unit 1102. There is shown a buffer 1128 for storing two SEST entries, a control logic unit 1130, and a SEST buffer state machine 1132. The SEST buffer manager unit 1102 interfaces with the LFM 734 to obtain SEST entries from the host memory 228 and to update the SEST entries stored in the host memory 228 (e.g., Q_FETCH, LL_FETCH, WRITE-BACK and INVALIDATE commands referred to in the LFM unit description above). The SEST buffer manager unit 1102 interfaces with the OSM 738 in order to receive SURs. The SUR contains information that the SEST buffer manager unit 1102 uses to update a particular SEST entry.

Figure 36:
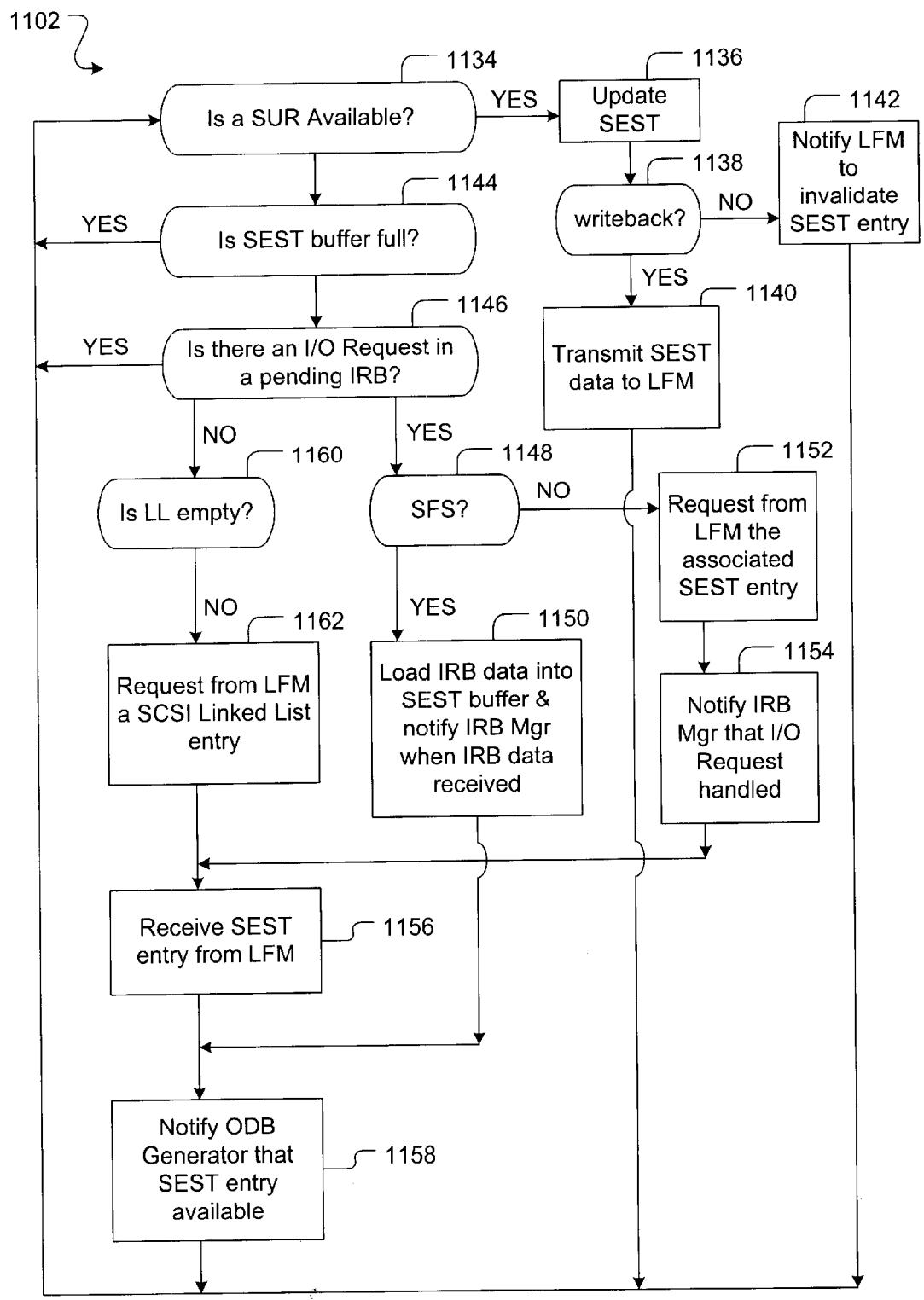
FIG. 36 is a flow chart illustrating the steps used by the SEST buffer manager unit shown in FIG. 35.

FIG. 36 illustrates the steps used by the SEST buffer manager unit 1102. If the SEST buffer state machine 1132 receives a SUR from the OSM 738 (step 1134—YES), the SEST buffer manager unit 1102 updates the corresponding SEST entry with the information contained in the SUR (step 1136). If the SUR indicates that the SEST entry should be written back to the SEST 236 (step 1138—YES), then the SEST buffer manager unit 1102 initiates the requisite handshaking with the LFM 734 so that the SEST entry is transmitted to the LFM 734 and then back to the host memory 228. Otherwise (step 1138—NO), the LFM 734 is instructed to invalidate the indicated SEST entry in the host memory 228 (step 1142).

If there is no pending SUR and there is a single frame sequence I/O request pending from the IRB buffer manager unit 1100 (steps 1144—NO, 1146—YES, 1148—YES), then the SEST buffer manager unit 1102 loads in the IRB into a SEST buffer 1128 and asserts the irb_consume signal to indicate to the IRB manager unit 1100 that it has received the IRB (step 1150) and the ODB Generator 1104 is notified (step 1158). If the pending I/O request is a multiple frame sequence (steps 1144—NO, 1146—YES, 1148—NO), then the SEST buffer manager unit 1102 instructs the LFM 734 to obtain from the host memory 228 the corresponding SEST entry (step 1152). The IRB buffer manager unit 1100 is then notified that the SEST buffer manager unit 1102 has received the IRS (step 1154). Once the SEST buffer manager unit 1102 loads in the SEST entry (step 1156), it notifies the ODB generator unit 1104 so that it can further process the SEST entry (step 1158).

If there is no pending SUR or I/O request and there is an entry on the SCSI Linked List 250 (step 1160—NO), then the SEST buffer manager unit 1102 instructs the LFM 734 to obtain the next entry on the SCSI Linked List 250 (step 1162). Once the SEST buffer manager unit 1102 loads in the SEST entry (step 1156), it notifies the ODB generator unit 1104 so that it can further process the SEST entry (step 1158).

Figure 37:
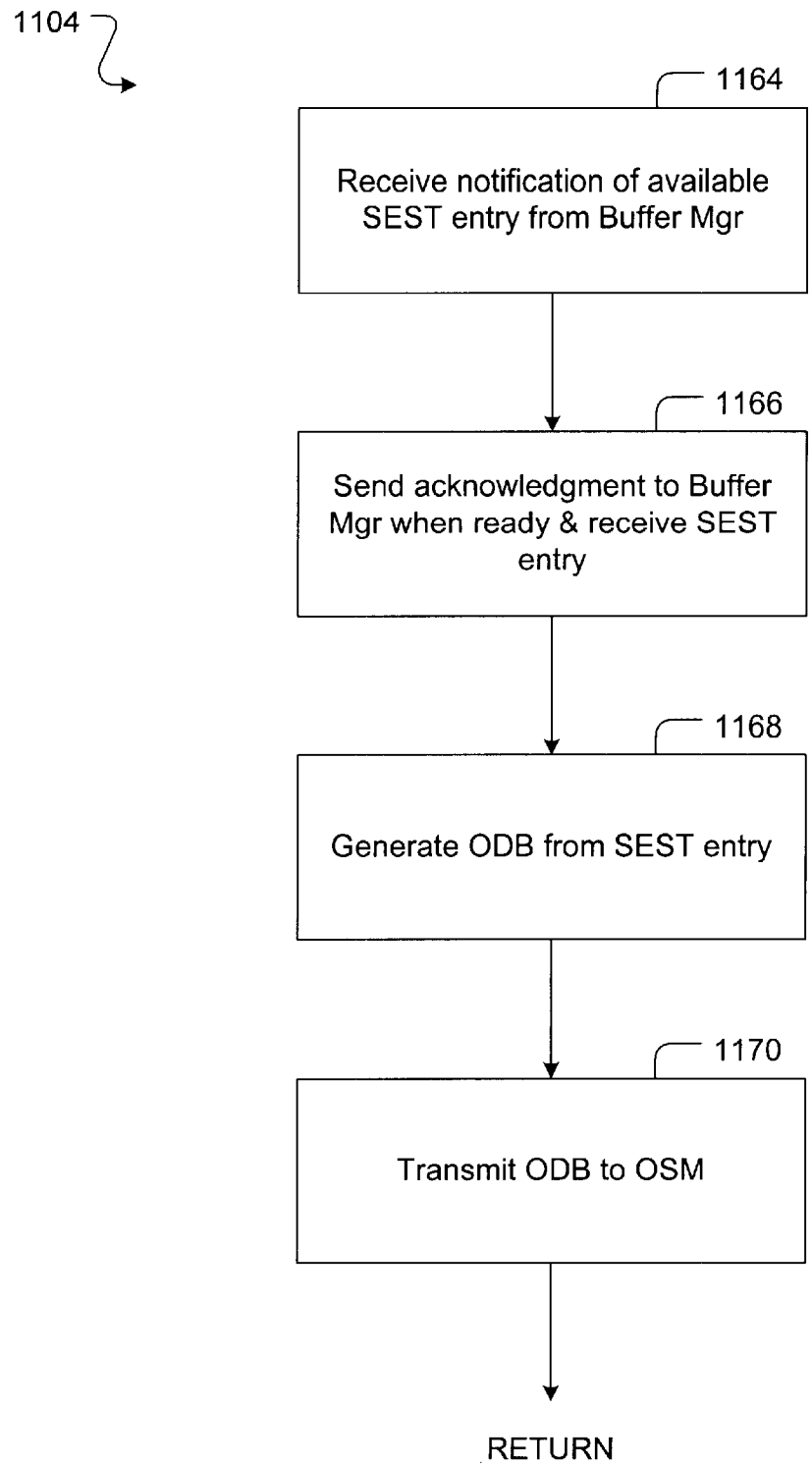
FIG. 37 is a flow chart illustrating the steps used by the ODB generator unit shown in FIG. 32.

FIG. 37 illustrates the operation of the ODB generator unit 1104. The SEST buffer manager unit 1102 notifies the ODB generator unit 1104 when an SEST entry is available (step 1164). When the ODB generator unit 1104 is available to process the entry, the ODB generator unit 1104 notifies the SEST buffer manager unit 1102 and the SEST entry is buffered into the ODB generator unit 1104 (step 1166). Control logic in the ODB generator unit 1104 generates an ODB from the SEST entry (step 1168) and initiates the appropriate handshaking signals to transmit the ODB to the OSM 738 (step 1170).

The design of the SEM-OUT unit 742 is such that some of the units within SEM-OUT 742 can operate independently thereby performing some tasks in parallel. For instance, the IRB manager unit 1100 and the SEST buffer manager unit 1102 can operate concurrently. The IRB manager unit 1100 can retrieve IRBs from the ERQ manager unit 740 simultaneously as the SEST buffer manager unit 1102 is retrieving and processing the ODBs from LFM 734. In this manner, the SEM-OUT unit 742 can achieve a faster throughput in processing the ODBs.

The foregoing description has described the architecture and operation of the SEM-OUT unit. Attention now turns to the OSM unit 738.

Outbound Sequence Manager (OSM) Unit

The OSM 738 is responsible for the processing and transmission of an outbound sequence. The OSM 738 receives ODBs from SEM-OUT 742 which describe the outbound sequence. The OSM 738 then obtains the associated frame header structure and the payload data (i.e., data buffers corresponding to a L/A pair). The frame header structure and the payload is obtained from host memory 228. Once this data is received, the OSM 738 controls the packaging of the data into the frame format in the OFM 754. Update and completion messages are transmitted back to the host memory 228 through the IDM 736 and the CMC 748.

Figure 38A:
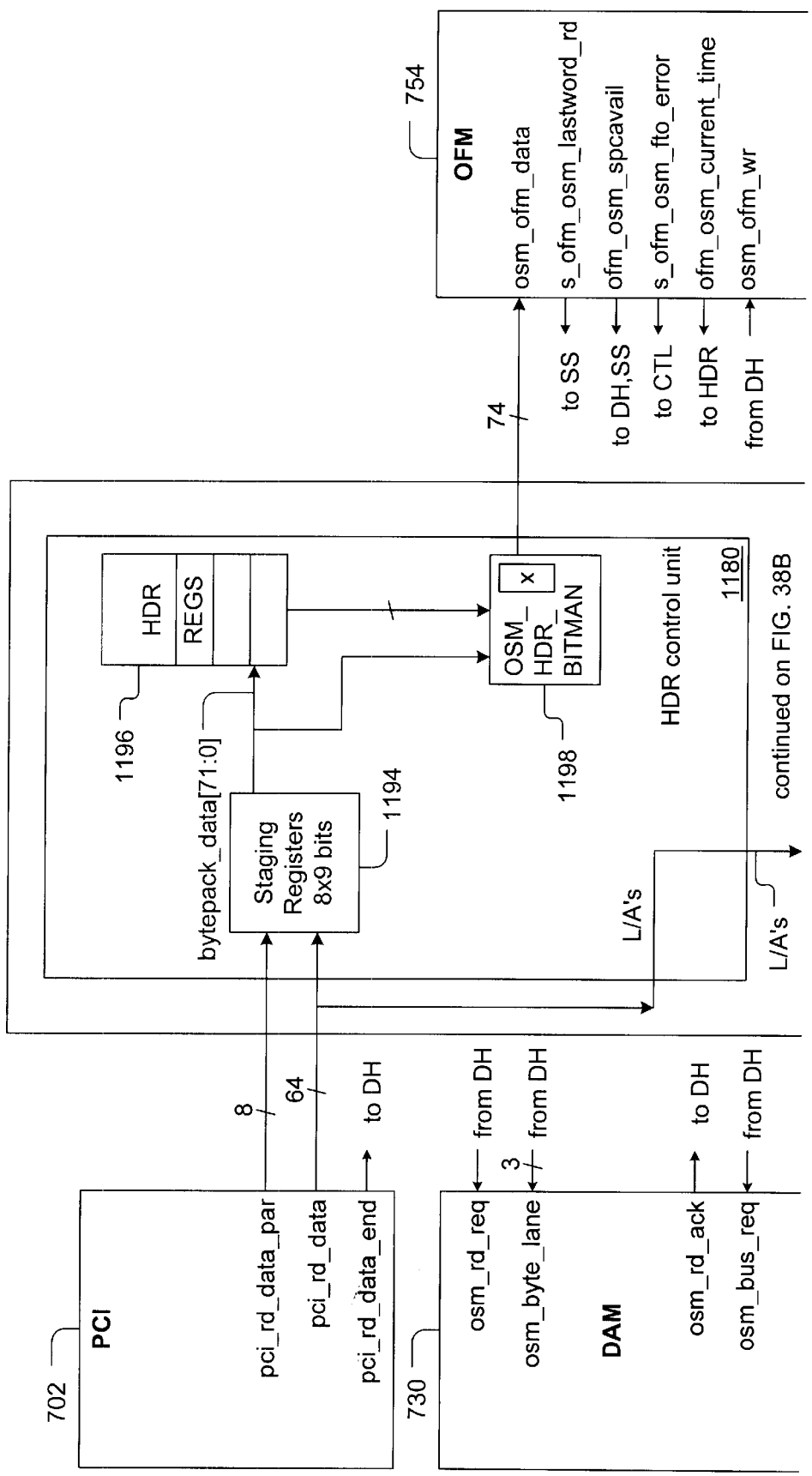
FIG. 38 is a block diagram illustrating the Outbound Sequence Manager (OSM) shown in FIG. 23.
Figure 38B:
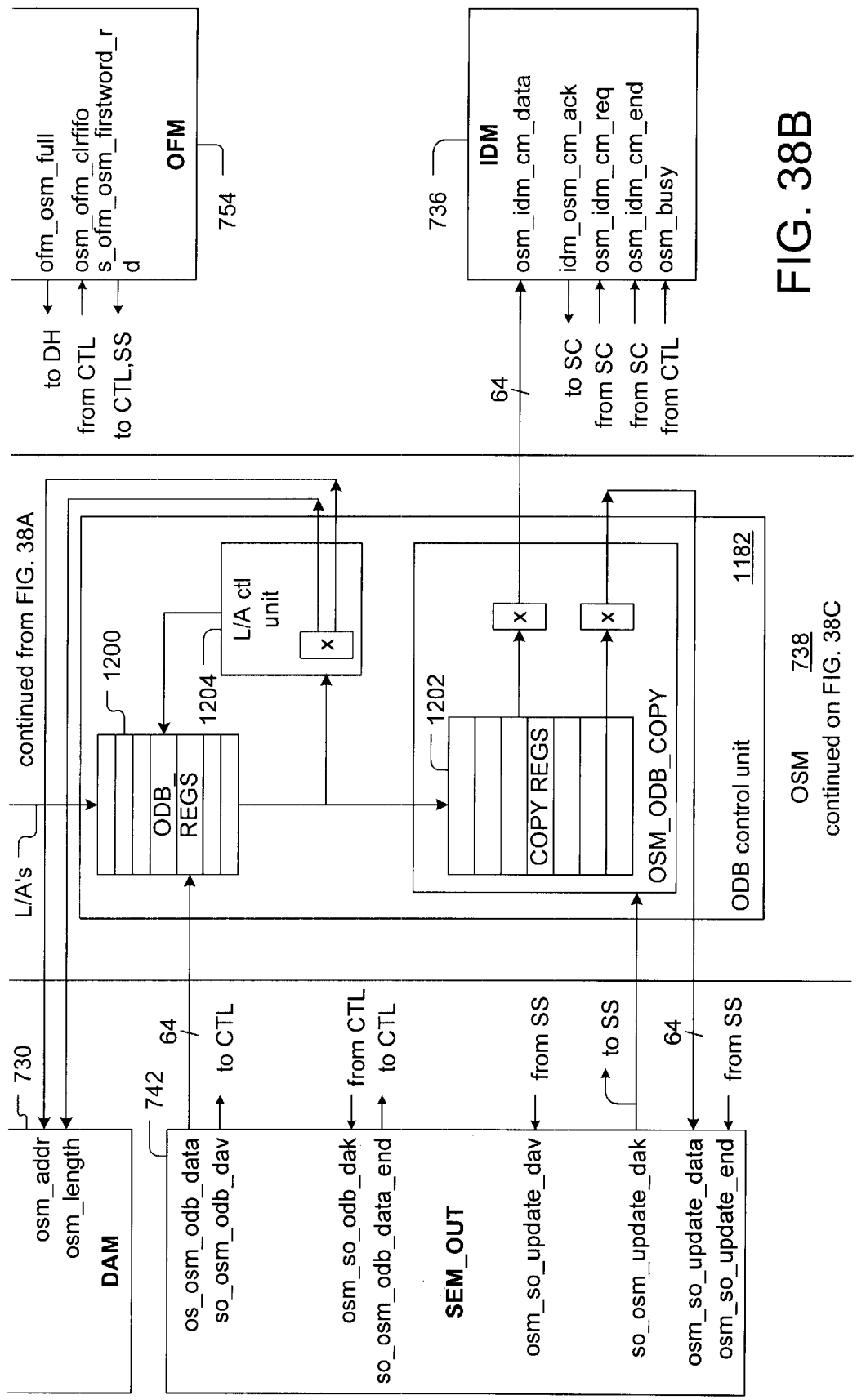
Figure 38C:
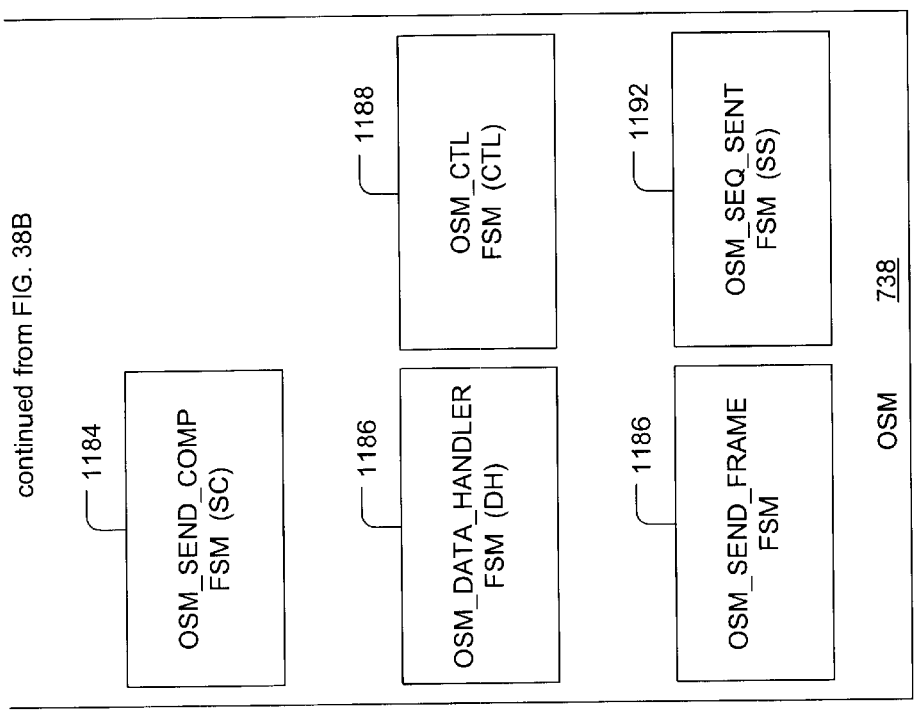

FIG. 38 illustrates the architecture of the OSM unit 738. There is shown a HDR control unit 1180, a ODB control unit 1182, an OSM_SEND_COMP state machine 1184, an OSM_DATA_HANDLER state machine 1186, an OSM_CTL state machine 1188, an OSM_SEND_FRAME state machine 1190, and an OSM_SEQ_SENT state machine 1192. The HDR control unit 1180 is used to store frame headers fetched from the host memory 228 and is used to transmit the frame headers to the OFM 754. The ODB control unit 1182 is used to store the ODBs and L/A pairs, as well as generate the data needed for update and completion messages. The OSM_SEND_COMP state machine 1184 generates the completion messages, the OSM_DATA_HANDLER state machine 1186 controls the movement of data in and out of OSM 738, the OSM_CTL state machine 1184 initiates the outbound sequence processing, the OSM_SEND_FRAME state machine 1190 processes the ODB and manages the frame generation process; and the OSM_SEQ_SENT state machine 1192 manages the actions needed at the end of a sequence transmission. Each of these components is described in more detail below.

The HDR control unit 1180 includes a set of staging registers 1194, storage registers for the FC headers 1196, and a header bit manipulation unit (HDR BITMAN) 1198. The staging registers 1194 are used to stage the data and parity written to the OFM 754. The HDR BITMAN unit 1198 manipulates the fields of the frame header on the fly as the frame header is being transmitted to the OFM 754.

The ODB control unit 1182 includes a set of ODB registers 1200, a set of copy registers 1202, and an L/A control unit 1204. The ODB registers 1200 are used to store ODBs received from SEM-OUT 742, the copy registers 1202 store select portions of the ODB and frame headers which are used in an update or completion message, and the L/A control unit 1204 is used to generate the appropriate length and address signals for use in fetching the data associated with an L/A pair.

The OSM unit 738 interfaces with the host system interface unit 702, the DAM 730, the SEM-OUT unit 742, the OFM 754, and the IDM 736. The host system interface unit 702 sends the requested data from the PCI bus to the OSM 738, the DAM 730 is used to initiate read DMA requests to the host memory 228, the SEM-OUT unit is used to receive ODBs and to perform SEST updates, the IDM transmits completion messages, and the OFM assembles the frame data.

Figure 39:
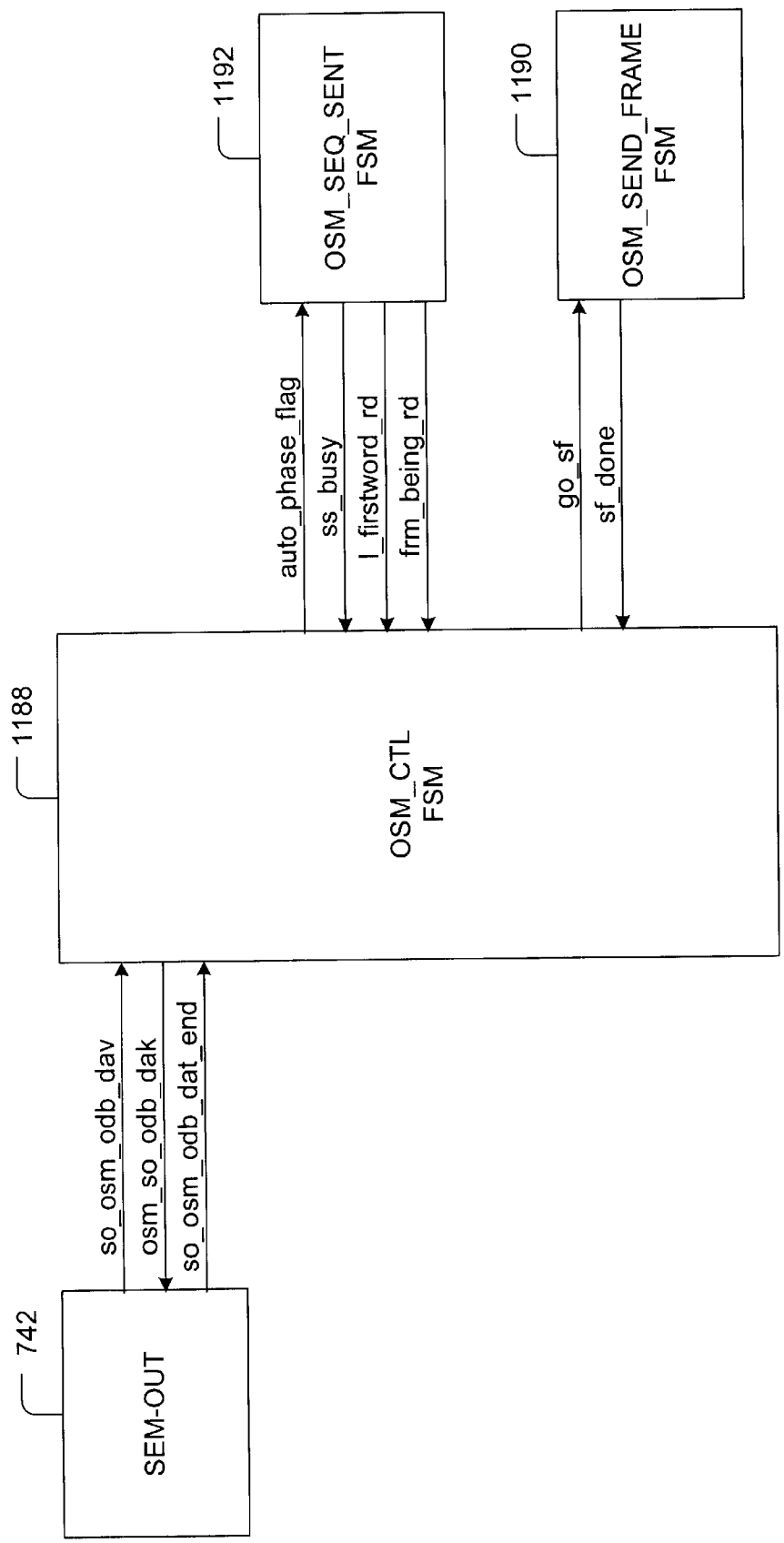
FIG. 39 is a block diagram illustrating the OSM_CTL state machine shown in FIG. 38.

FIG. 39 illustrates the OSM_CTL state machine 1188 interface. The state machine 1188 is coupled to the SEM-OUT unit 742 through the following handshake signals:

so_osm_odb_dav—asserted by SEM-OUT 742 when there is data on the osm_odb_data bus;

osm_so_odb_dak—asserted by OSM_CTL 1188 when data from SEM-OUT 742 has been written into a register; and so_osm_odb_data_end—asserted by SEM-OUT 742 with the last word of data.

The OSM_CTL state machine 1188 is coupled to the OSM_SEQ_SENT state machine 1192 through the following signals:

auto_phase_flag—indicates that an auto FCP_RSP response sequence is sent;

ss bus_indicates that the state machine is busy;

l-firstword_rd—indicates that the first word of a frame is being read; and frm_being_rd—indicates that a frame is being read from OFM 754.

Figure 40:
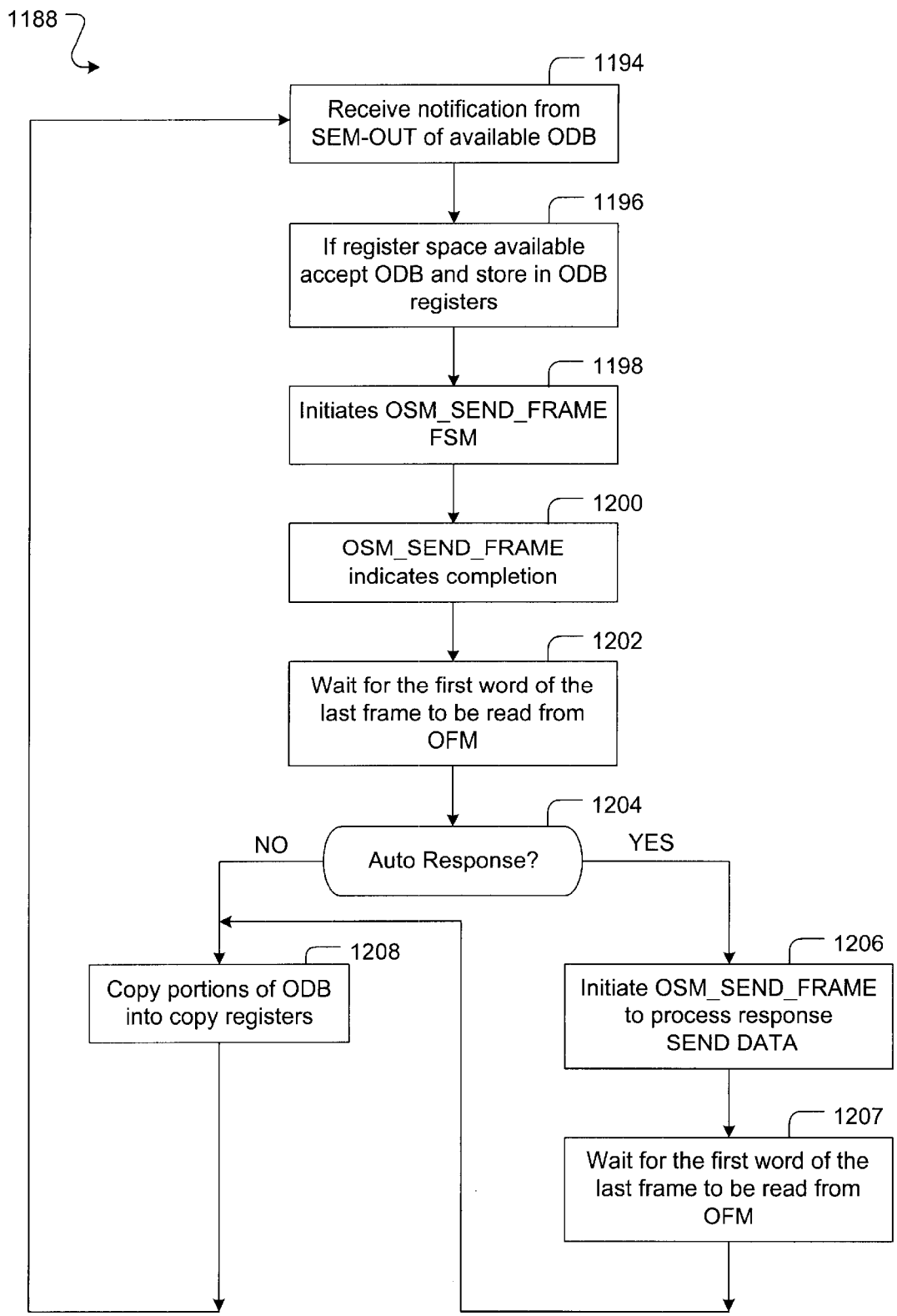
FIG. 40 is a flow chart illustrating the operation of the OSM_CTL state machine shown in FIGS. 38–39.

The OSM_CTL state machine 1188 is coupled to the OSM_SEND_FRAME state machine 1190 through a go_sf signal that activates the state machine 1190 and the sf_done signal which indicates completion of a task to OSM 738. FIG. 40 illustrates the steps performed by the OSM_CTL state machine 1188. The state machine 1188 receives notification from the SEM-OUT 742 unit that an ODB is available through an asserted so_osm_odb_dav signal (step 1194). If the OSM_CTL 1188 is able to service the request and has space available in the ODB registers 1200, the OSM 738 initiates the necessary handshake signals with SEM-OUT 742 to read in the ODB which is stored in the ODB registers 1200 (step 1196). The OSM_SEND_FRAME state machine 1190 is activated to process the ODB (step 1198) and indicates through an asserted sf_done signal when processing is completed (step 1200). When the first word of the last frame is read from the OFM 754, the OSM 738 assumes that the rest of the data will be transmitted and continues processing. The OSM_SEQ_SENT state machine 1192 asserts the 1_firstword_rd signal when this happens (step 1202).

Next, the OSM_CTL state machine 1188 determines whether an auto FCP_RSP_sequence is needed (step 1204). The auto FCP_RSP sequence is sent if the FCP_sequence was sent normally. In this case (step 1204—YES), the response L/A is contained in the current ODB and the OSM_CTL state machine 1188 initiates the OSM_SEND_FRAME state machine 1190 to DMA the FCP_RSP sequence from the host memory 228 (step 1206). Once the first word of the last frame is read from the OFM 754 (step 1207), the state machine 1188 copies portions of the ODB into the copy registers 1202 so that an update and/or completion message can be formulated (step 1208). In addition, in the event where an auto FCP RSP sequence is not needed (step 1204—NO), the state machine 1188 copies portions of the ODB into the copy registers 1202 so that an update and/or completion message can be formulated (step 1208).The OSM_SEND_FRAME state machine 1190 is used to control the processing of the outbound sequence. This state machine 1190 interprets the ODB to determine whether a local or extended gather list is required. In the case of an extended gather list, L/As are obtained from host memory 228. It then obtains the payload data described by the L/A pairs and segments it into frames which are placed into the OFM 754 in a format within the constraints of the frame length. The state machine 1190 uses the OSM_DATA_HANLDER state machine 1186 to assist with these tasks.

Figure 41:
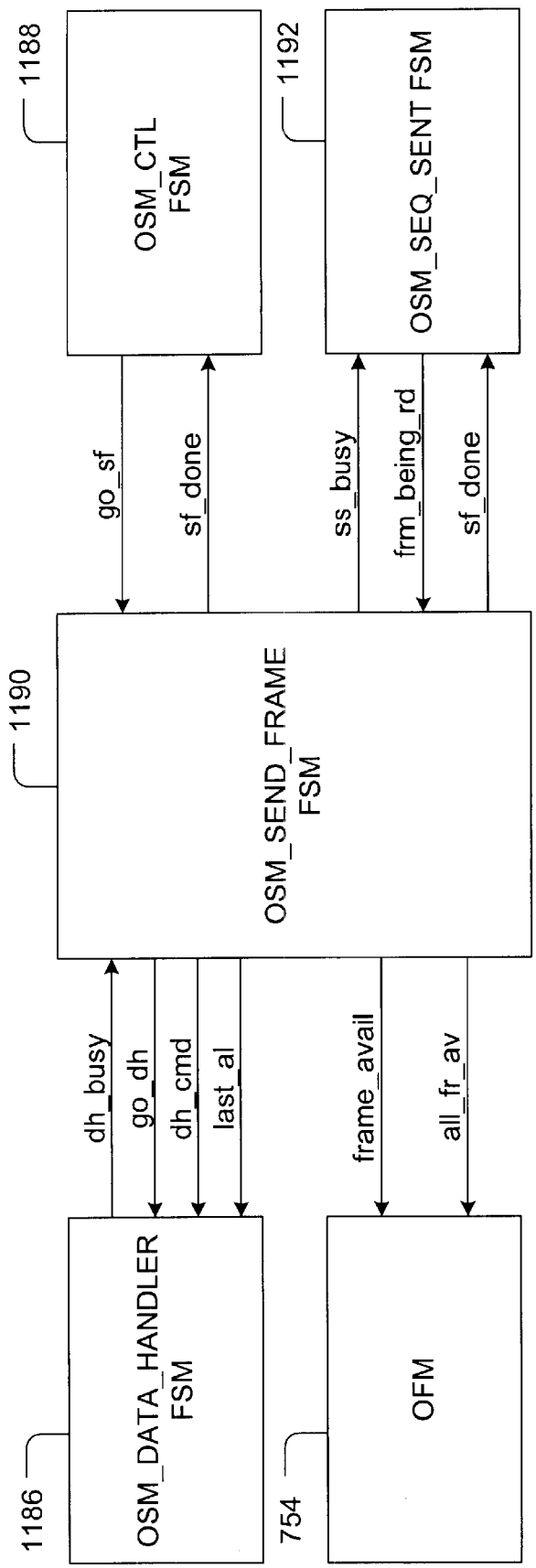
FIG. 41 is a block diagram illustrating the OSM_SEND_FRAME state machine shown in FIG. 38.

The OSM_SEND_FRAME state machine 1190 is shown in FIG. 41. The OSM_SEND_FRAME state machine 1190 interfaces with the OSM_DATA_HANDLER state machine 1186, the OFM 714, the OSM_CTL state machine 1188, and the OSM_SEQ_SENT state machine 1192. The OSM_SEND_FRAME state machine 1190 asserts the frame_avail signal to the OFM unit 714 when a frame is placed in the OFM 714 and assserts the all_fr_av signal to the OFM unit 714 when all the frames of a particular sequence are placed in the OFM 754.

The OSM_SEND_FRAME state machine 1190 interfaces with the OSM_DATA_HANDLER state machine 1186 through the following signals:

dh_busy—indicates to the OSM_SEND_FRAME state machine 1190 that the OSM_DATA HANDLER state machine 1186 is busy;

go_dh—activates the OSM_DATA_HANDLER state machine 1186;

dh_cmd—indicates the requested task; and last_al_indicates the last L/A of the sequence being processed.

The interface to the OSM_SEQ_SENT state machine 1192 can include the following signals:

ss_busy—indicates that the OSM_SEND_FRAME state machine 1190 is busy;

frm_being_rd—signals that a frame is being read from the OFM 754; and sf_done—indicates that the OSM_SEQ_SENT state machine 1192 has completed a task.

Figure 42:
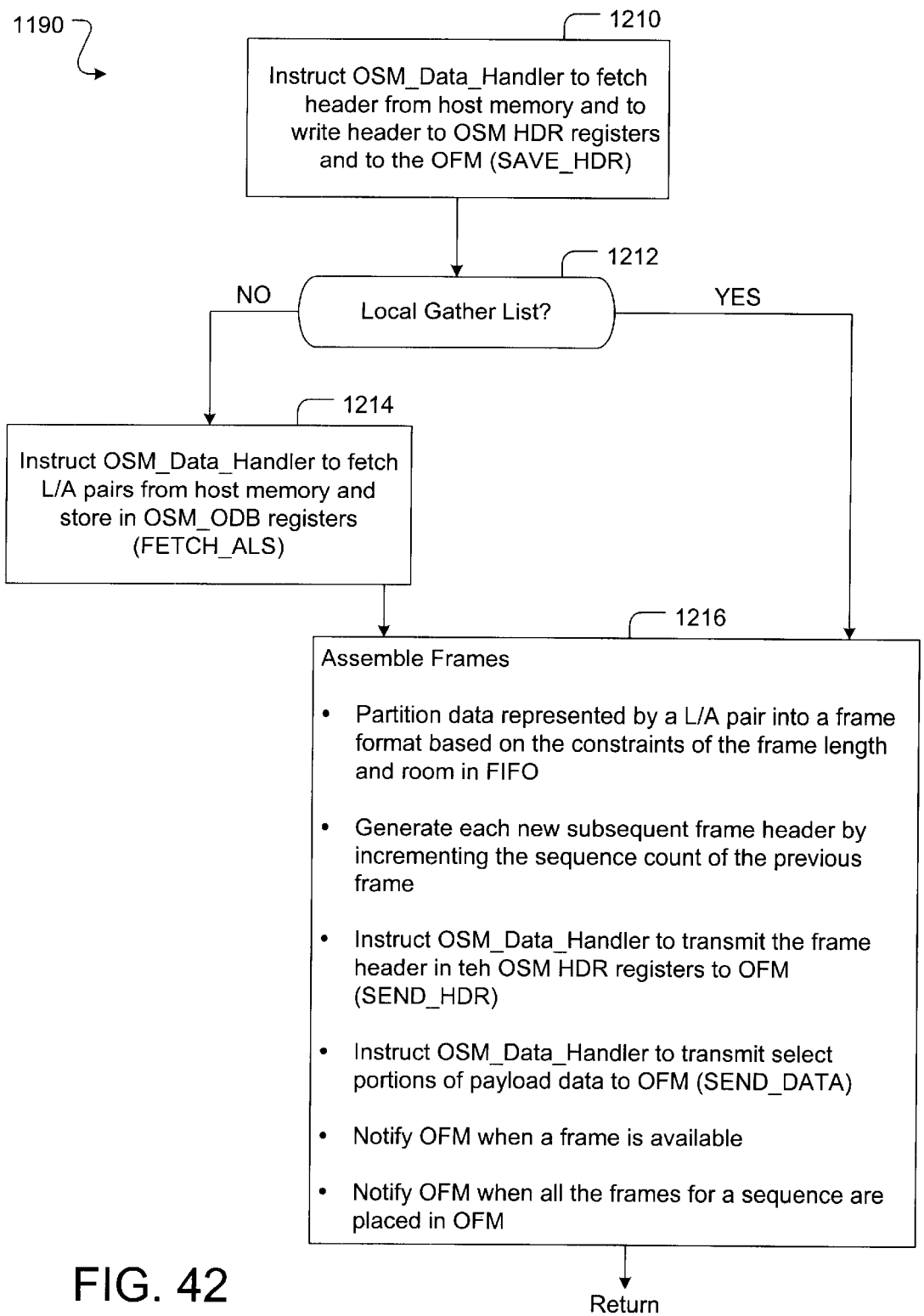
FIG. 42 is a flow chart illustrating the operation of the OSM_SEND_FRAME state machine shown in FIGS. 38 and 41.

FIG. 42 is a block diagram illustrating the steps performed by the OSM_SEND_FRAME state machine 1190. The OSM_SEND_FRAME state machine 1190 instructs the OSM_DATA_HANDLER state machine 1186 to fetch the frame header from the host memory 228 and to write the frame header to the HDR registers 1196 and to the OFM 754 (i.e., SAVE HDR command) (step 1210). Next, the state machine 1190 interprets the ODB to determine whether a local or extended gather list is used (step 1212). If a local gather list is used, then the ODB contains the L/A pairs for the data payload (step 1212—YES). Otherwise (step 1212—NO), the state machine 1190 instructs the OSM_DATA_HANDLER state machine 1186 to fetch the L/A pairs from host memory 228 and to store them in the ODB registers 1200 (i.e., FETCH_ALS) (step 1214).

Next, the state machine 1190 generates frames by placing the frame header stored in the HDR registers 1196 in the OFM 754 and by downloading the payload from the host memory 228 into the OFM 754 (step 1216). First, the payload is partitioned into one or more frames based on the frame length. The initial frame header is stored in the HDR registers 1196 and each subsequent frame header is generated by incrementing the sequence count of the previous frame. The OSM_DATA_HANDLER state machine 1186 is then instructed to transmit the frame header from the HDR registers 1196 to the OFM 754 (i.e., SEND HDR command) and then instructed to transmit the payload to the OFM 754 (i.e., SEND DATA command). When the frame is assembled in the OFM 754, the OSM_SEND_FRAME state machine 1190 notifies the OFM unit 754 and when all the frames associated with a sequence are assembled in the OFM 754, the OFM unit 754 is notified as well.

Figure 43:
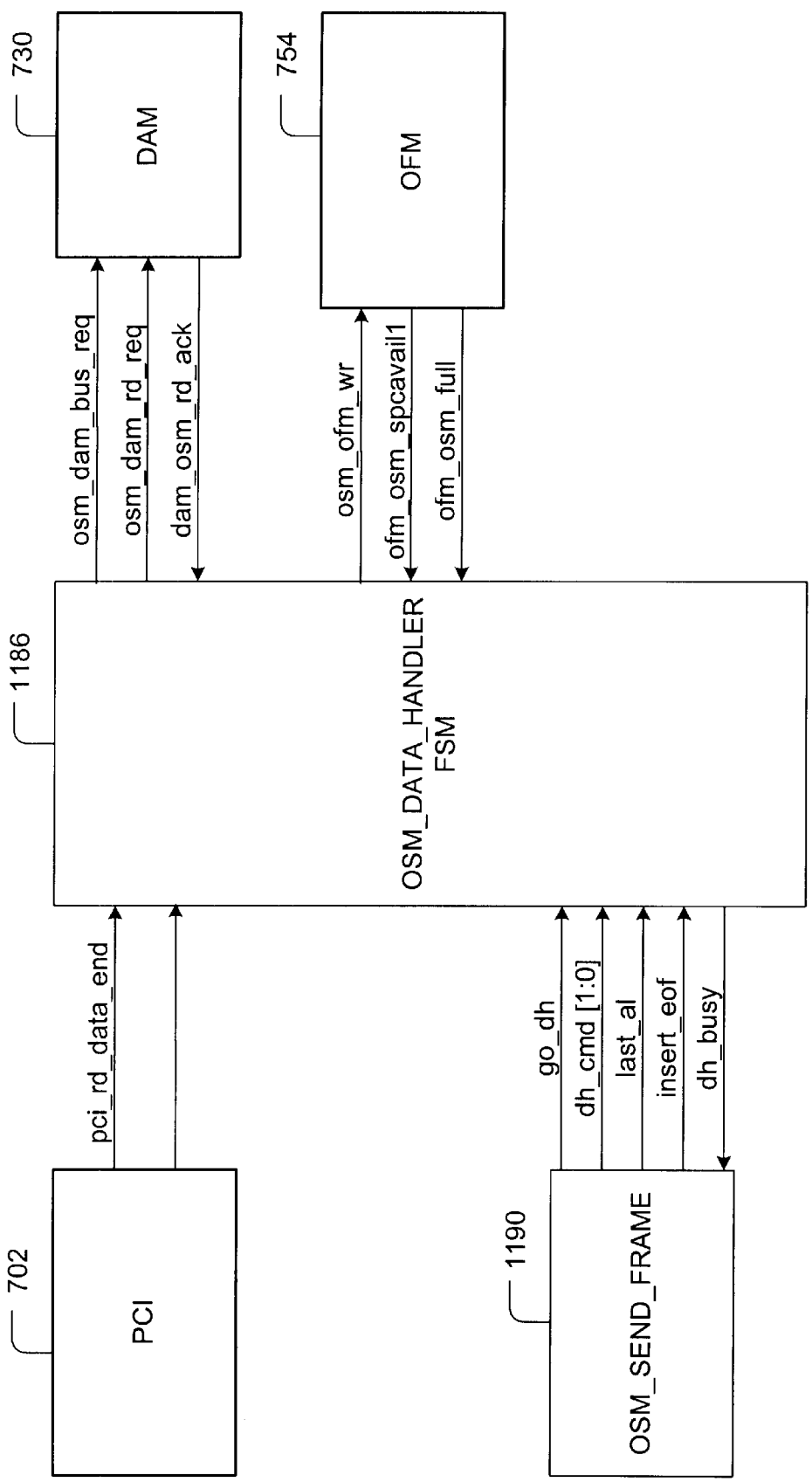
FIG. 43 is a block diagram depicting the OSM_DATA_HANDLER state machine shown in FIG. 38.

The OSM_DATA_HANDLER state machine 1186 interfaces with the appropriate units to coordinate the requested data transfers. Referring to FIG. 43, the OSM_DATA_HANDLER state machine 1186 generates the requisite handshaking signals with the DAM 730 to initiate a DMA read request. The data is transmitted directly from the PCI bus to OSM 738. The state machine 1186 also provides the requisite handshaking signals with the OFM 754 in order to write data into the OFM 754. The OSM_DATA_HANDLER state machine 1186 receives commands from the OSM_SEND_FRAME state machine 1190.

Figure 44:
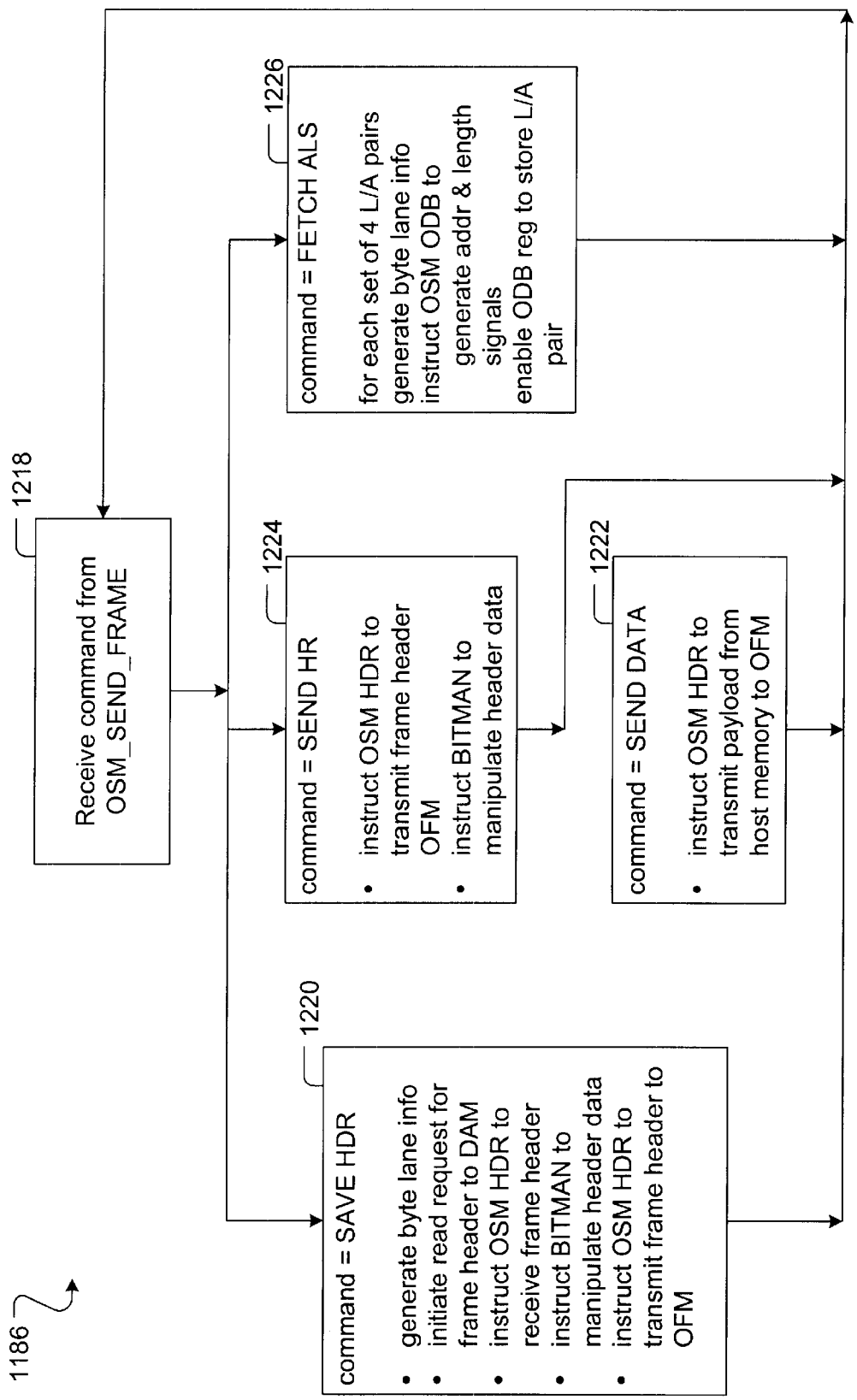
FIG. 44 is a flow chart illustrating the operation of the SM_DATA_HANDLER shown in FIGS. 38 and 43.

FIG. 44 illustrates the steps performed by the OSM_DATA_HANDLER state machine 1186. This state machine 1186 receives commands from the OSM_SEND_FRAME state machine 1190 (step 1218). In the case of a SAVE HDR command, the state machine 1186 is instructed to retrieve a frame header from host memory 228 which is stored in both the HDR registers 1196 and the OFM 754 (step 1220). The state machine 1186 generates the byte lane data as well as generate the appropriate handshaking signals to perform the DMA read request (step 1220). The state machine 1186 also generates the appropriate handshaking signals with the HDR control unit 1180 to read in the requested data, to store the data in the HDR registers 1196, to instruct the HDR BIT-MAN unit 1198 accordingly, and to transmit the frame header to the OFM 754 (step 1220).

In the case of a SEND HDR command, the state machine 1186 is instructed to write the frame header currently stored in the HDR registers 1196 to the OFM 754 (step 1224). The state machine 1186 instructs the HDR control unit 1180 to transmit the frame header to the OFM 754, including instructing the HDR BITMAN unit 1198 accordingly, and notifies the OFM 754 of the pending data write (step 1224).

For a SEND DATA command, the state machine 1186 is instructed to transmit the payload data associated with an L/A pair from the host memory 228 to the OFM 754 (step 1222). The state machine 1186 initiates the requisite handshaking with the DAM 730 to perform the read DMA request (step 1222).

A FETCH_ALS command instructs the OSM_DATA_HANDLER state machine 1186 to obtain from the host memory 228 the next four L/A pairs from the address pointed to by the gather list address (step 1226). The byte lane information is generated and used along with the appropriate signals to initiate the read DMA request from the DAM 730 (step 1226). The ODB control unit 1182 is instructed to store the L/A pair (step 1226).

Figure 45:
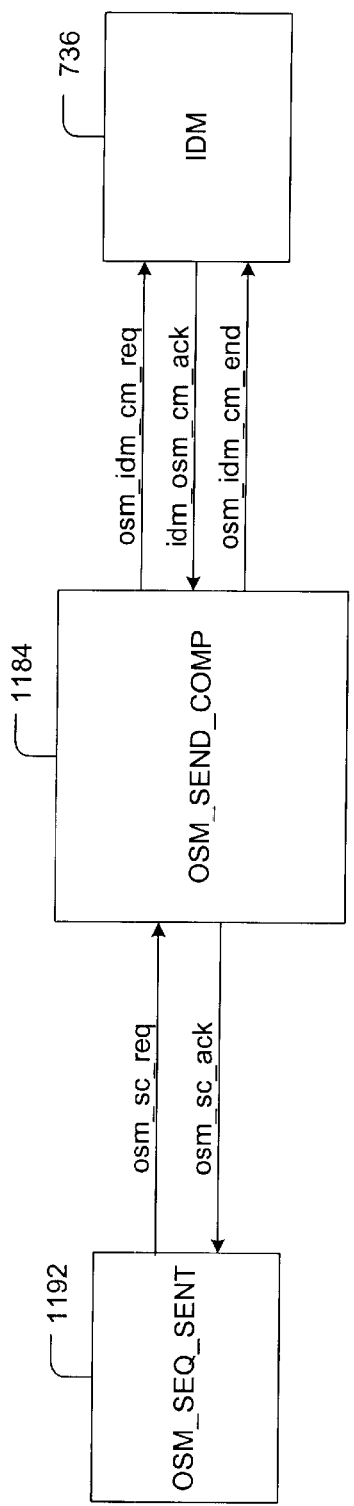
FIG. 45 is a block diagram depicting the OSM_SEND_COMP state machine shown in FIG. 38.
Figure 46:
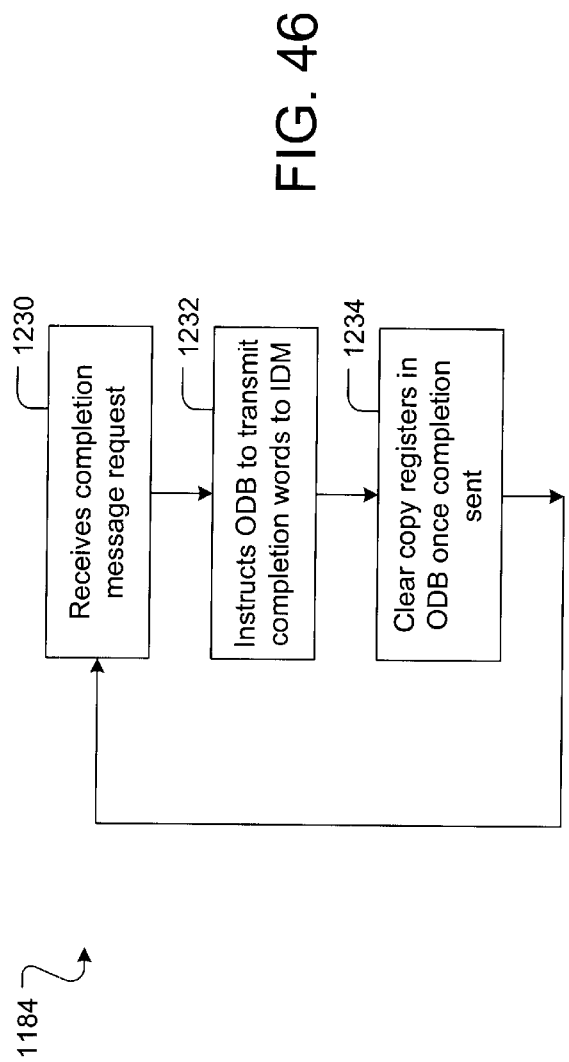
FIG. 46 is a flow chart illustrating the operation of the OSM_SEND COMP state machine shown in FIGS. 38 and 45.

The OSM_SEND_COMP state machine 1184 is used to formulate and transmit to the IDM 736 a completion message at the end of the sequence transmission. Referring to FIGS. 45–46, there is shown the OSM_SEND_COMP state machine 1184 coupled to the OSM_SEQ_SENT state machine 1192 and the IDM 736. The state machine 1184 receives a completion request, osm_sc_req, from the OSM_SEQ_SENT state machine 1192 which activates the state machine 1184 (step 1230). It formulates the completion message from the information stored in the copy registers 1202 and the completion message is then transmitted to the IDM 736 (step 1232). Once the completion message is transmitted (idm_osm_cm_lack asserted), the copy registers 1202 are cleared (step 1234).

The OSM_SEQ_SENT state machine 1192 manages the end of sequence transmission processing. This state machine 1192 monitors the DMA activity into the OFM 754 and informs the OSM_CTL state machine 1188 when certain data is read into and out of the OFM 754. In addition, this state machine 1192 determines when an update request is made and when a completion message is sent to the host system 222.

Figure 47:
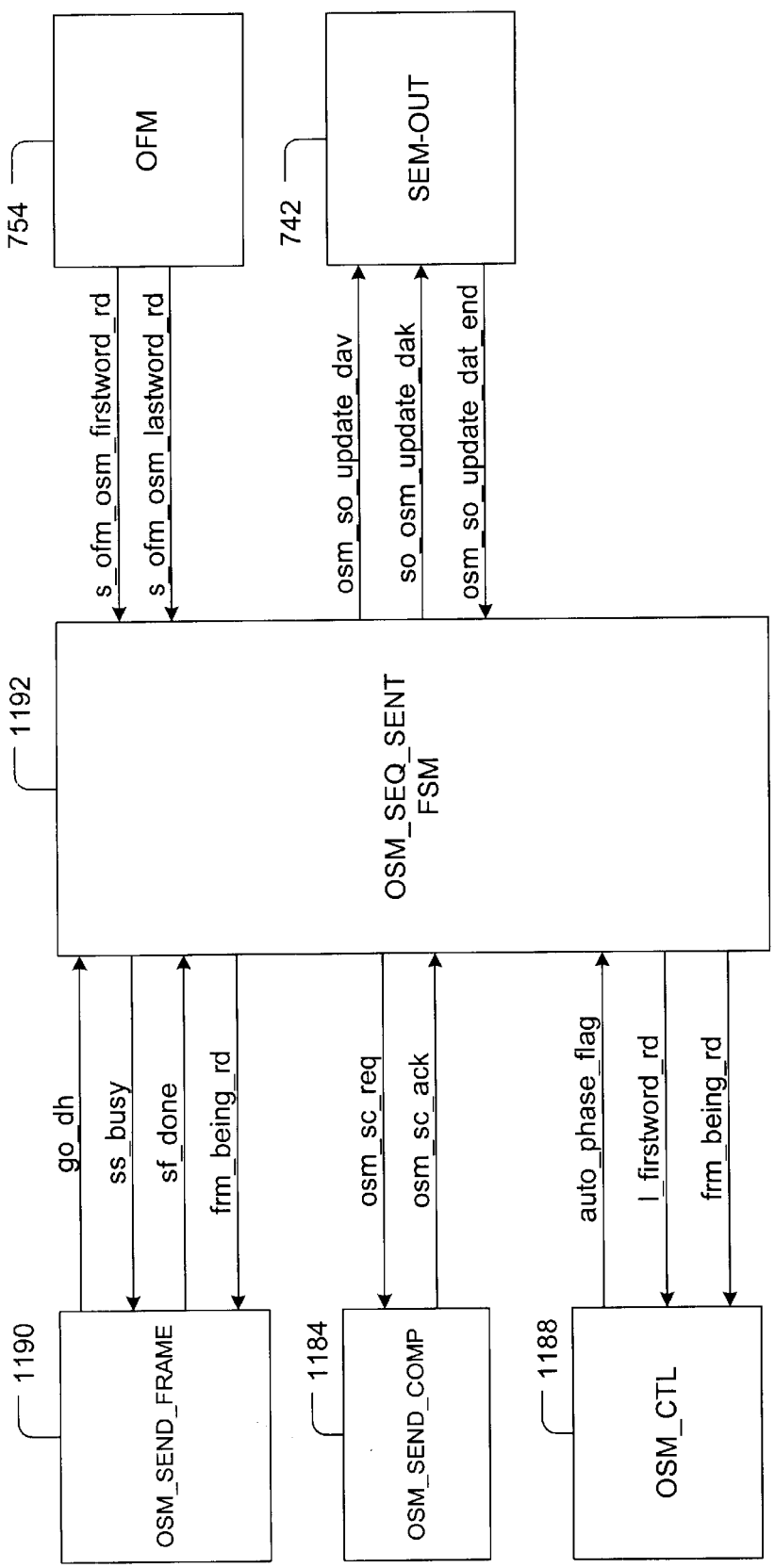
FIG. 47 is a block diagram depicting the OSM_SEQ_SENT state machine shown in FIG. 38.
Figure 48:
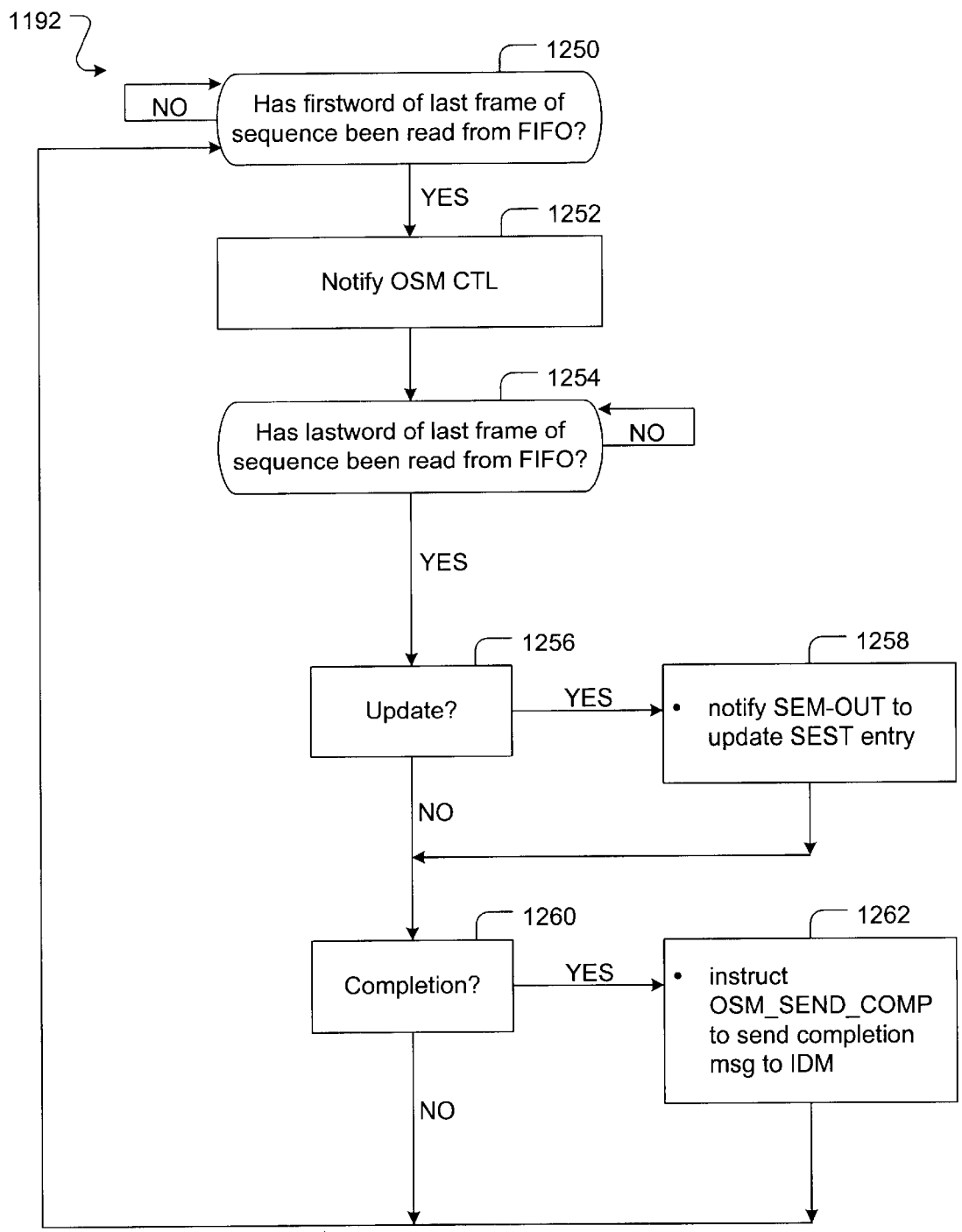
FIG. 48 is a flow chart illustrating the operation of the OSM_SEQ_SENT state machine shown in FIGS. 38 and 47.

Referring to FIGS. 47–48, the OFM 754 indicates to the state machine 1192 when the first word of a frame of a sequence is read from the OFM 754, s_ofm_osm_firstword_rd, and when the last word of a frame is read from the OFM 754, s_ofin_osm_lastword_rd. When the first word of the last frame of the current sequence is read from the OFM 754 (step 1250—YES), the OSM_CTL state machine 1188 is notified (l_firstword_rd asserted) (step 1252).

The OFM 754 also indicates to the state machine 1192 when the last word of a frame is read out of the OFM 754. When the last word of the last frame of a sequence is read from the OFM 754 (step 1254—YES), the OSM_CTL 1188 determines whether an update request (i.e., SUR) is to be sent to SEM-OUT 742 (step 1256). An update request is sent when the SEM-OUT unit 742 has set the SUR bit in the ODB. The SUR indicates the status of the sequence and the pointers into the gather list. The state machine 1192 sets the appropriate signals to instruct SEM-OUT 742 to update the associated SEST entry (step 1258). Next, the state machine 1192 determines whether a completion message is to be sent to the host system 222 (step 1260). A completion message is sent when the sequence terminated abnormally or when the host system 222 indicated in the SEST or IRB that it wanted such notification. In this case (step 1260—YES), the state machine 1192 instructs the OSM_SEND_COMP state machine 1184 to send the completion message to the IDM 736 (step 1262).

The design of the OSM 738 lends itself to internal concurrent activity. The architecture of the OSM 738 is such that the initial phases in processing a sequence described by an ODB are independent of the operations that occur in processing the end of the sequence. In particular, the OSM_CTL state machine 1188 can operate simultaneously with the operation of the OSM_SEQ_SENT state machine 1192. The OSM_SEQ_SENT state machine 1193 in turn utilizes the OSM_SEND_COMP state machine 1184. As the OSM_SEQ_SENT 1193 and OSM_SEND_COMP 1184 state machines are processing the update or completion message, the OSM_CTL state machine 1188 is able to concurrently retrieve the next ODB from SEM-OUT 742. These concurrent operations enable the OSM unit 738 to achieve a higher throughput in processing an outbound sequence.

The foregoing description described the operation and architecture of the OSM 738. Attention now focuses on the OFM 754.

Outbound Frame Buffer Unit

Referring back to FIG. 22, the outbound frame buffer unit 714 interfaces between the outbound sequence and exchange management unit 712 and the outbound frame engine 716 and is used to assemble and buffer the frames associated with an outbound sequence. In one embodiment, the outbound frame buffer unit 714 can be a FIFO mechanism that is accessed by both the OSM 738 and the outbound fibre engine 716 and such a mechanism is shown as the Outbound FIFO Manager (OFM) 754 in FIG. 23. The OSM 738 manages the assembly of the frame data into specified locations in the OFM 754 and the outbound fibre engine 716 retrieves these frames from the OFM 754.

Figure 49:
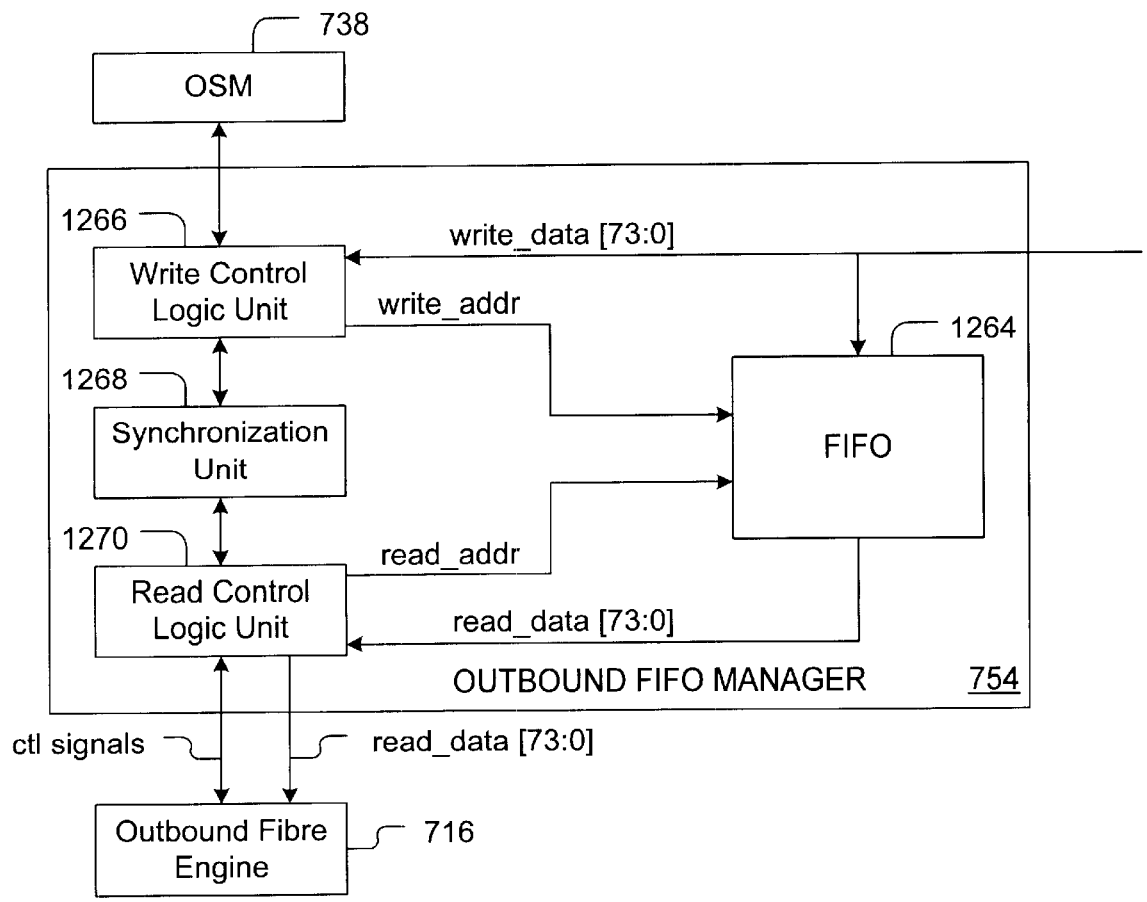
FIG. 49 is a block diagram depicting the outbound FIFO manager (OFM) shown in FIG. 3

FIG. 49 illustrates the OFM 754 in further detail. The OFM 754 can be viewed as having four main components: a FIFO 1264; a write control logic unit 1266; a synchronization unit 1268; and a read control logic unit 1270. In one embodiment of the invention, the FIFO 1264 can be a dual-ported synchronous random access memory (RAM) capable of storing 134 74-bit entries. The nature of a dual-ported memory device allows the OFM to write data to the FIFO 1264 simultaneously as the outbound fibre engine 716 reads data from the FIFO 1264. It should be noted that the present invention is not constrained to the use or size of a RAM and that other types of memory devices can be used.

The write control logic unit 1266 interfaces with the OSM 738 and enables write accesses to the FIFO 1264. The write data can be transmitted from the PCI bus or from the OSM 738. The write control logic unit 1266 includes the requisite handshaking circuitry that provides the interface to these two write data sources. The read control logic unit 1270 interfaces with the outbound fibre engine 716 and enables read accesses from the FIFO 1264. The synchronization unit 1268 is provided to cross clock domains within the OFM 754.

Figure 50:
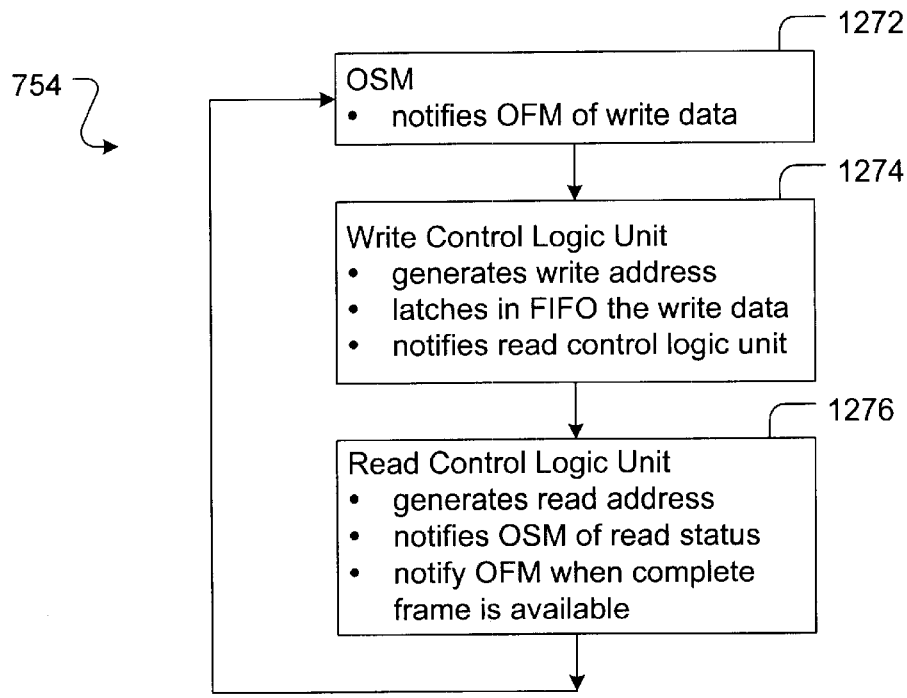
FIG. 50 is a flow chart illustrating the operation of the OFM shown in FIGS. 23 and 49.

FIG. 50 depicts some of the steps used in the operation of the OFM 754. The OSM 738 notifies the OFM 754 of a write request to store data in the FIFO 1264 (step 1272). The write control logic unit 1266 generates the appropriate write address, latches in the write data in the FIFO 1264, and notifies the read control logic unit 1270 (step 1274). The synchronization unit 1268 synchronizes the control signals transmitted between the write 1266 and read 1270 control logic units (step 1274). The read control logic unit 1270 generates the read address to the FIFO 1264 (step 1276). In addition, the read control logic unit 1270 notifies the OSM 738 when the first and last words of the frame have been read from the FIFO 1264 and notifies the FM unit 860 when a complete frame is available (step 1276).

Frame Manager (FM)

Figure 51:
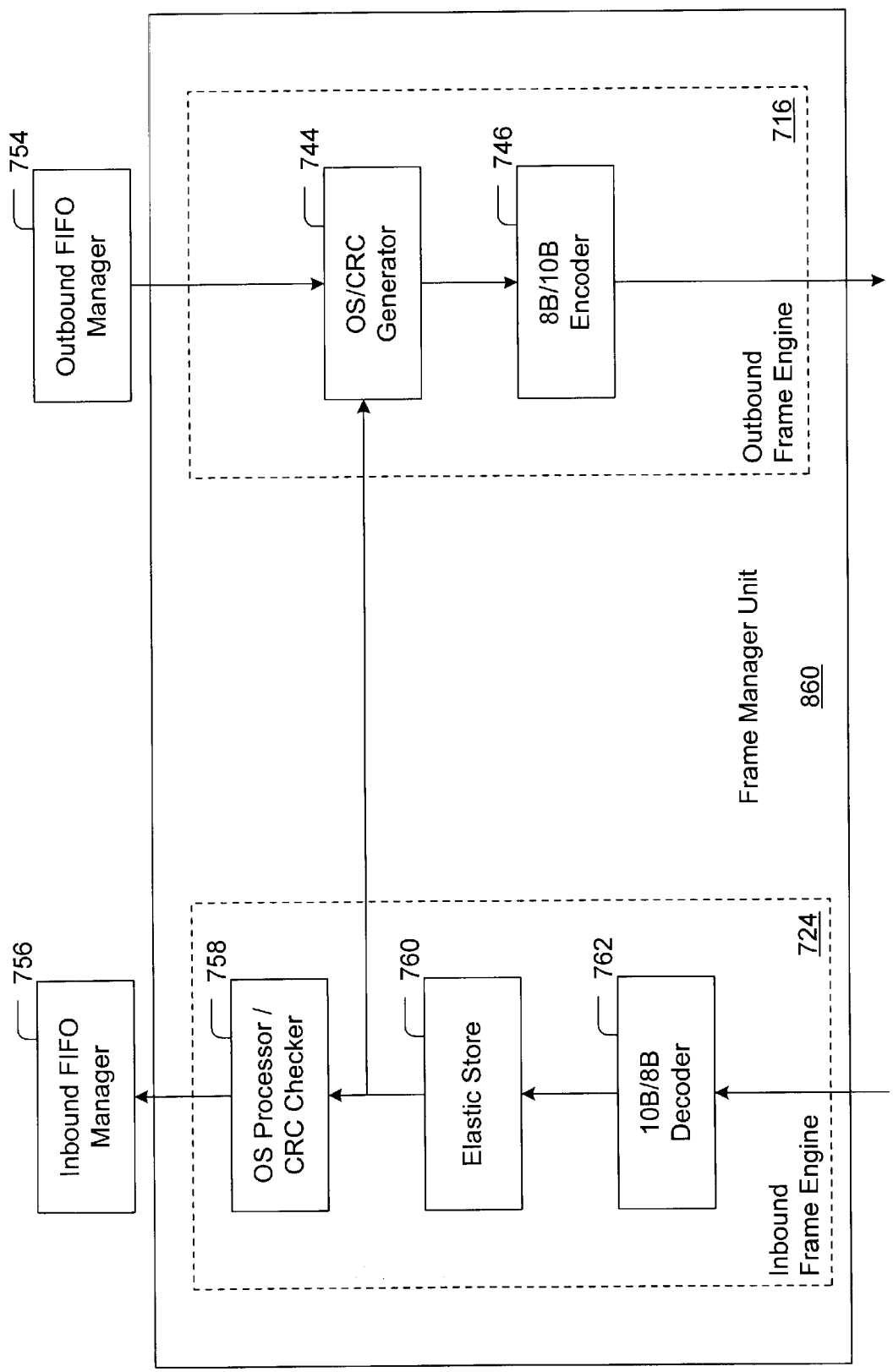
FIG. 51 is a block diagram illustrating the frame manager unit.

FIG. 51 illustrates the frame manager unit 860 which includes the inbound 724 and outbound 716 frame engines. The frame manager unit 860 performs the FC-1 functions for transmitting and receiving FC frames. The FC-1 level of the FC protocol defines the transmission protocol including the byte synchronization and encode/decode scheme. The FC-1 level employs the well-known 8B/10B code scheme. In addition, the frame manager unit 860 controls the FC protocols such as loop arbitration, and NL port-specific protocols such as link reset.

A more detailed description on the FC-1 functions, the FC-AL and FC-PH protocols can be found in the aforementioned incorporated references. A more detailed description of the 8B/10B coding scheme can be found in Widmer, et al., "A DC-Balanced Partitioned Block, 8B/10B Transmission Code," IBM Journal of Research and Development, vol. 27, no. 5, pgs. 440–451 (September, 1983), which is hereby incorporated by reference as background information.

The outbound frame engine 716 includes the OS/CRC generator unit 744 and the 8B/10B encoder 746. The OS/CRC generator unit 744 reads the outbound frames from the OFM 754, checks the parity on each byte, and appends a 32-bit CRC to each frame. The 8B/10B encoder breaks down the frames into 8-bit bytes which are encoded in accordance with the 8B/10B encoding scheme and transmitted out through the 10-bit FC interface port.

The inbound frame engine 724 includes a 10B/8B decoder, an elastic store 760, and an OS processor/CRC checker 758. The data received from the 10-bit FC interface port is decoded in accordance with the 10B/8B decoding scheme by the 10B/8B decoder 762 and sent to the elastic store 760. The elastic store 760 manages the clock skew between the clock domain in which the data is received and the clock domain in which the data is stored. The OS processor/CRC checker 758 detects incoming frame boundaries and verifies the CRC of the received frames as the frame is stored in the IFM 756.

Figure 52:
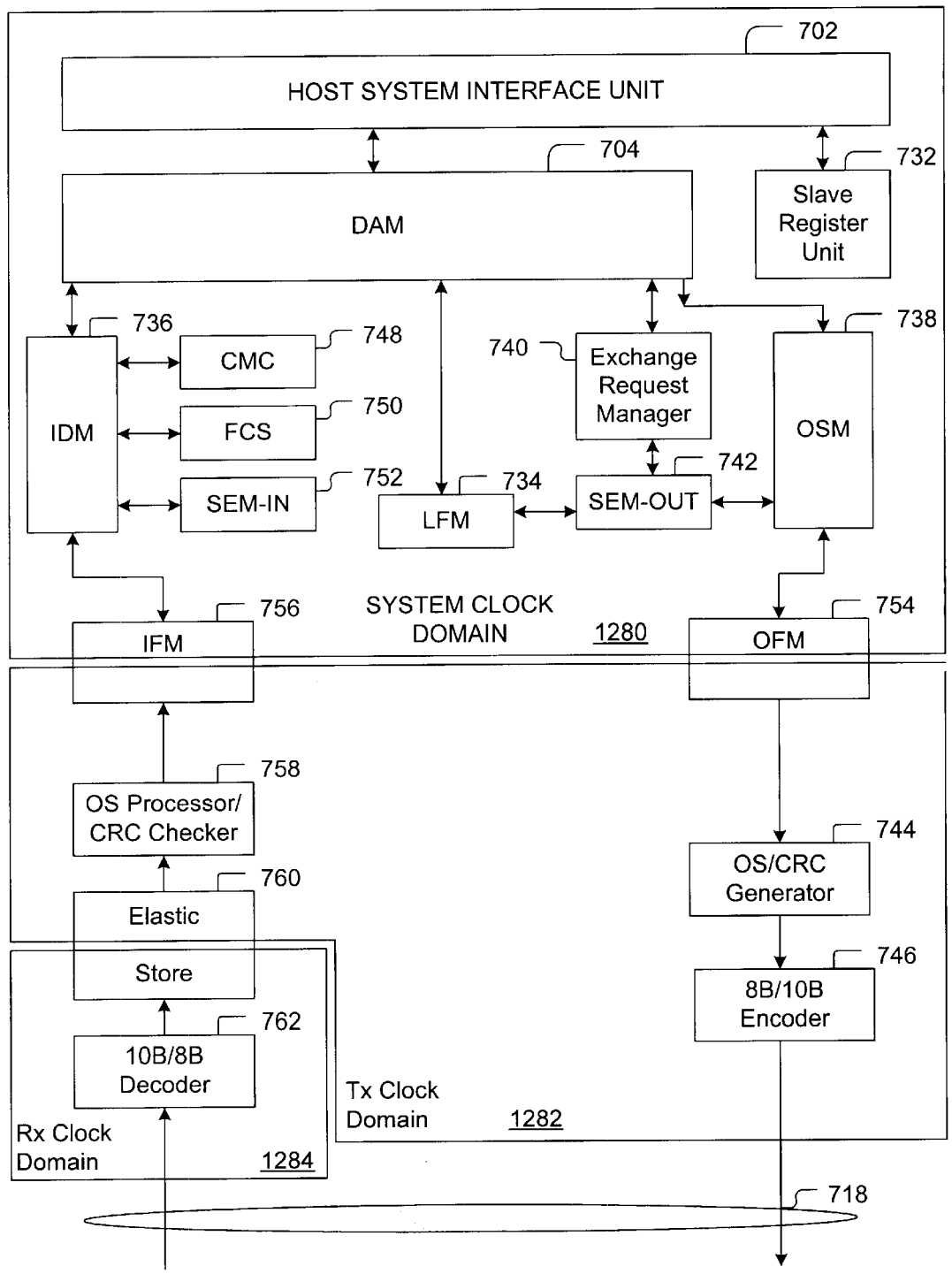
FIG. 52 depicts the three different clock domains used within the FC controller.

FIG. 52 illustrates the three different clock domains within the FC controller. There is a system clock domain, a transmit (Tx) clock domain, and a receive (Rx) clock domain. The system clock domain is a function of the PCI bus. The Tx and Rx clock domains each operate at half the frequency of the 10-bit FC interface (106.25 MHz), which is 53.125 MHz. In order to exchange data between the Rx and Tx clock domains, the elastic store manages the timing skew by providing a synchronous boundary between the Rx and Tx clock domains. The FC-AL reference cited above describes in further detail the manner for managing the timing skew between the Rx and Tx clock domains.

In addition, the IFM 756 and OFM 754 units each have a synchronization unit that ensures that the signals that cross between the system and Tx clock domains are sampled with the correct clock. The synchronization units in the IFM and OFM can utilize the control synchronizer described in pending US patent application entitled, "First-in-First-Out Synchronizer," Ser. No. 09/080035, assigned to the Hewlett-Packard Company and the data synchronizer described in U.S. Pat. No. 4,873,703, entitled "Synchronizing System" assigned to the Hewlett-Packard Company.

The foregoing description described the structure and operation of the frame manager unit and the various clock domains within the FC controller. Attention now turns to a description of the inbound.

Inbound Frame Buffer Unit

Referring back to FIG. 22, the inbound frame buffer unit 722 interfaces between the inbound sequence and exchange management unit 720 and the inbound frame engine 724 and is used to buffer the frames received from the FC. In one embodiment, the inbound frame buffer unit 722 can be a FIFO mechanism that is accessed by both the IDM 736 and the inbound fibre engine 724 and such a mechanism is shown as the Inbound FIFO Manager (IFM) 756 in FIG. 23. The OS Processor/CRC Checker 758 stores the received frame data into specified locations in the IFM 756 and the IDM 736 retrieves these frames from the IFM 756. Both of these units can access the IFM 756 concurrently.

Figure 53:
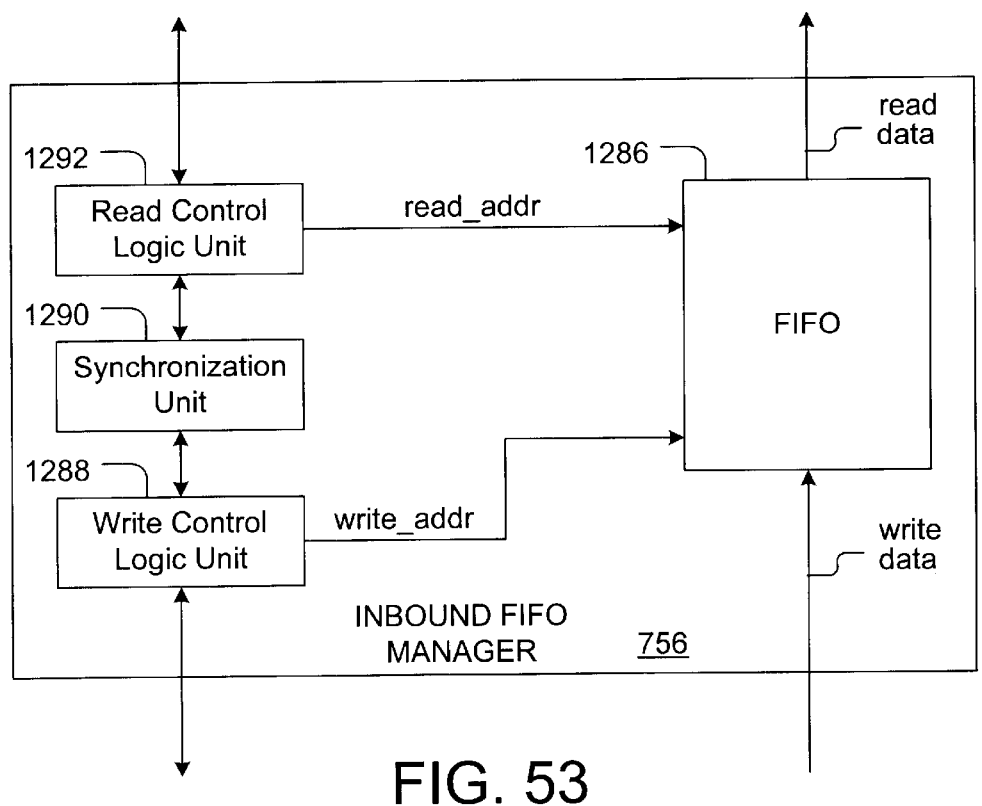
FIG. 53 is a block diagram illustrating the inbound FIFO manager (IFM) shown in FIG. 23.

FIG. 53 illustrates the IFM 754 in further detail. The IFM 754 can be viewed as having four main components: a FIFO 1286; a write control logic unit 1288; a synchronization unit 1290; and a read control logic unit 1292. In one embodiment of the invention, the FIFO 1286 can be a dual-ported synchronous random access memory (RAM) capable of storing 544 74-bit entries. It should be noted that the present invention is not constrained to the use or size of a RAM and that other types and sizes of memory devices can be used.

The write control logic unit 1288 interfaces with the OS processor/CRC checker 758 and enables write accesses to the FIFO 1286. The write control logic unit 1288 includes the requisite handshaking circuitry that provides the interface to these two write data sources. The read control logic unit 1292 interfaces with the IDM and enables read accesses from the FIFO 1286. The synchronization unit 1290 is provided to cross clock domains within the IFM 756.

Figure 54:
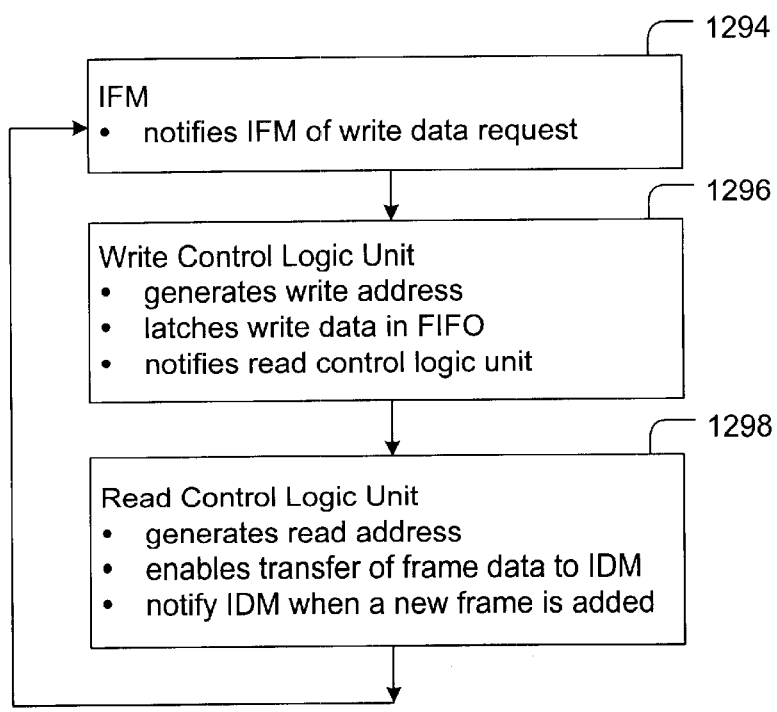
FIG. 54 is a flow chart illustrating the operation of the IFM shown in FIGS. 23 and 53.

FIG. 54 depicts some of the steps used in the operation of the IFM 756. The OS processor/CRC checker 758 notifies the IFM 756 of a write request to store data in the FIFO 1286 (step 1294). The write control logic unit 1288 generates the appropriate write address, latches in the write data in the FIFO 1286, and notifies the read control logic unit 1292 (step 1296). The synchronization unit 1290 synchronizes the control signals transmitted between the write 1288 and read 1292 control logic units (step 1298). The read control logic unit 1292 generates the read address to the FIFO 1264 and enables the transfer of the frame data to the IDM 736 (step 1298). In addition, the unit 1292 notifies the IDM 736 when a new frame is placed in the FIFO (step 1298).

The foregoing description describes the structure and operation of the inbound frame buffer unit 722. Attention now turns to the inbound sequence and exchange management unit 720.

Inbound Sequence and Exchange Management Unit

Referring back to FIG. 23, there is shown an inbound sequence and exchange management unit 720 that manages the inbound phases of a SCSI exchange. This unit 720 includes an inbound data manager (IDM) 736, a completion message channel (CMC) 748, a fibre channel services unit 750, and a SCSI exchange manager inbound unit (SEM-IN) 752. Each of these units will be discussed in further detail below.

Inbound Data Manager (IDM)

The IDM 736 coordinates the processing of an inbound frame received from the FC 718. The IDM 736 retrieves the inbound frame from the IFM 756 and routes the payload to its proper destination in the host memory 228. In addition, the IDM 736 processes the completion messages generated from the OSM 738 and SEM-IN 752, and routes them into the intended location in the IMQ in host memory 228.

The IDM 736 retrieves the inbound frame and sends the frame header to both SEM-IN 752 and FCS 750. The FCS 750 handles unknown, unassisted, or bad frames and stores them in the SFQ. An unknown frame is one that is not associated with class 2 or 3 service (as defined in the FC_PH standard cited above), an unassisted frame is one that is not associated with a known I/O request, and a bad frame is one that is deemed erroneous. The SEM-IN unit 752 handles the known and assisted frames. Either the SEM-IN 752 or FCS 750 units can claim ownership of the frame and indicates to the IDM unit 736 where to store the payload and/or frame header in host memory 228.

In addition, the IDM 736 is the centralized location that services requests for completion messages. The IDM 736 receives requests from SEM-IN 752 and OSM 738, and processes these requests by transmitting the completion messages to their proper destination in the IMQ in host memory 228.

Figure 55:
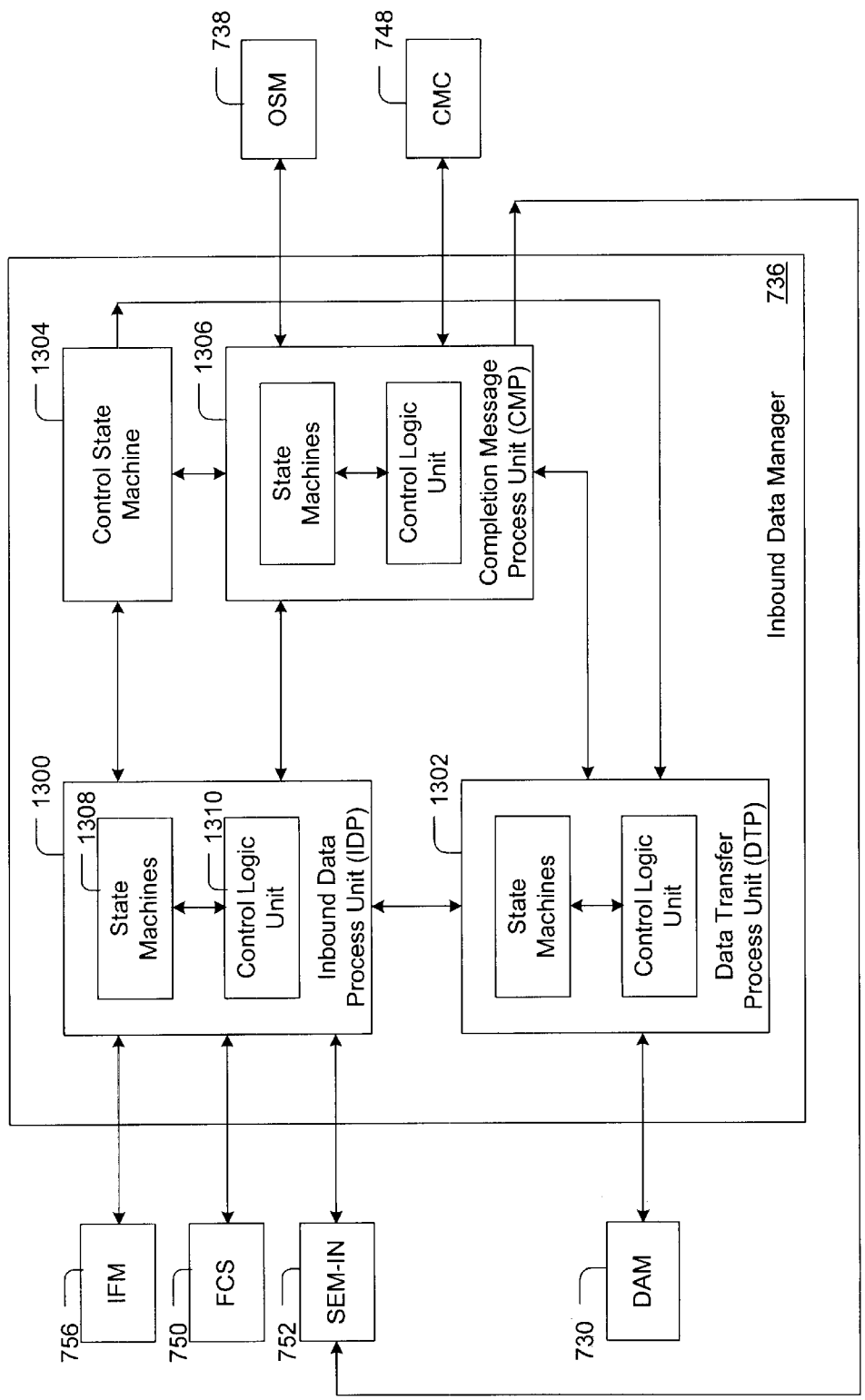
FIG. 55 is a block diagram illustrating the inbound data manager (IDM) as shown in FIG. 23.

FIG. 55 illustrates the IDM 736 is more detail. There is shown an inbound data process (IDP) unit 1300, a data transfer process (DTP) unit 1302, a control state machine 1304, and a completion message process (CMP) unit 1306. The IDP 1300 retrieves a frame from the IFM 756 and coordinates with the FCS 750 and SEM-IN 752 units as to where to store the frame in host memory 228. The CMP unit 1306 processes the completion messages which can be requested from SEM-IN 752, CMC 748, and OSM 738. The DTP unit 1302 interfaces with the DAM 730 to process the DMA write requests to host memory 228 and the control state machine 1304 coordinates when the IDP 1300 and CMP 1306 get access to the DTP 1302.

Figure 56A:
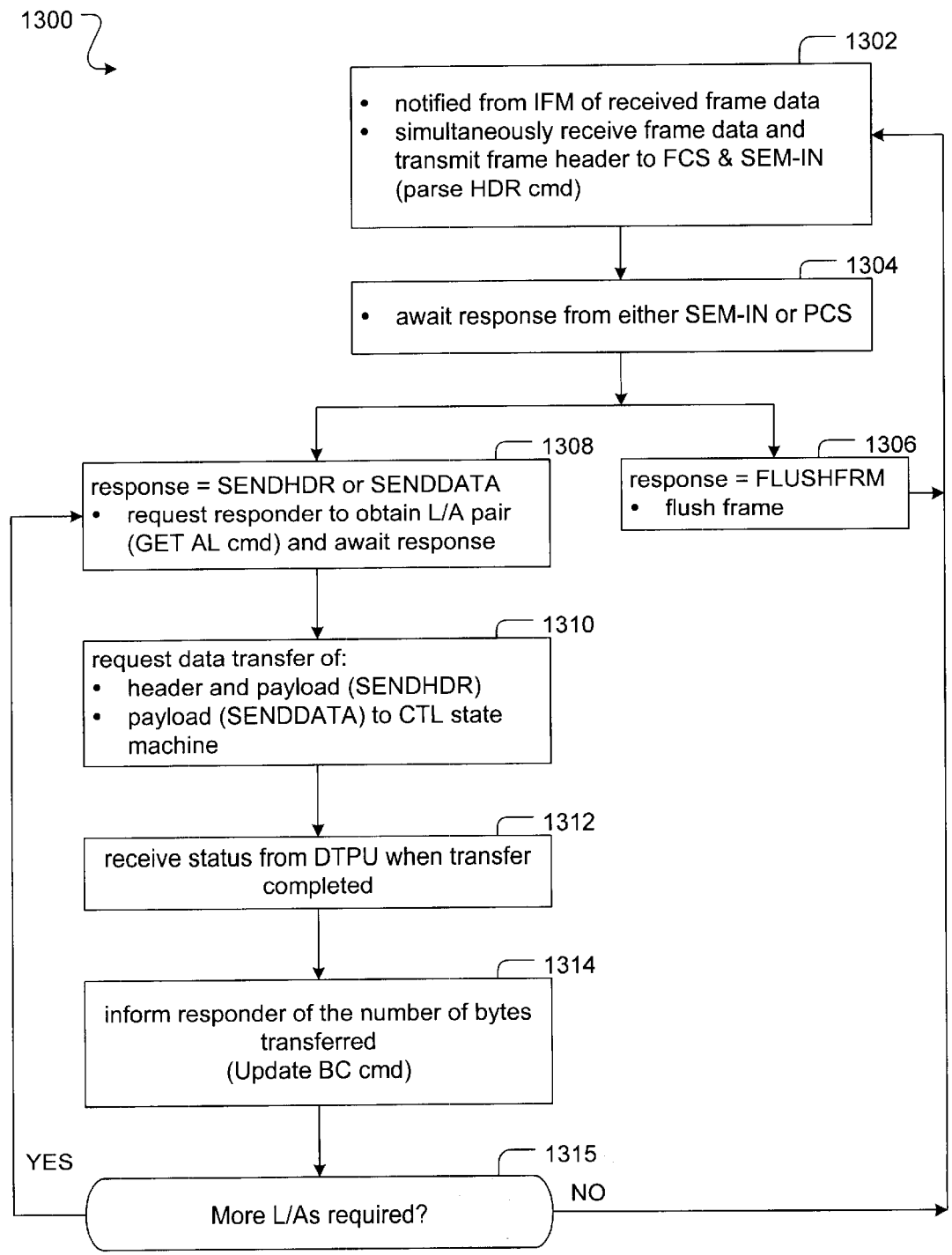
FIGS. 56A–56B are flow charts illustrating the operation of the IDM shown in FIGS. 23 and 55.

FIG. 56A illustrates the operation of the IDP 1300. The IDP 1300 can include several state machines 1308 and a control logic unit 1310 including buffer space for the inbound sequence. The IDP 1300 receives notification from the IFM 756 of a received frame (step 1302). When buffer space is available, the IDP 1300 reads in the frame and simultaneously transmits the frame header to both the SEM-IN 752 and FCS 750 units (step 1302). Either one of the FCS 750 or SEM-IN 752 units will claim ownership of the sequence and the IDP 1300 awaits for the response (step 1304). If the response is to flush the frame (FLUSHFRM), the IDP 1300 flushes the frame from IFM (step 1306). This response occurs in the case of a sequence that does not require a DMA to the host system 222. The SEM-IN 752 and FCS 750 units can also respond with a SENDHDR or SENDDATA command (step 1308). In both of these cases, one of these units has claimed ownership of the frame. The SENDHDR command indicates that the IDM 736 should send both the header and payload to the host memory whereas the SENDDATA command indicates that the IDM 736 is to send only the payload data. In response to these commands, the IDM 736 initiates a GETAL command to the responder which requests the L/A pair containing the host memory location to store the data (step 1308). The responder provides the L/A pair and the IDP 1300 initiates the data transfer by signaling the control state machine 1304 (step 1310). The control state machine 1304 manages the DMA requests to the DTP 1302 from the IDP 1300 and the CMP 1306. The DTP 1302 then performs the requested DMA write request to host memory 228 and notifies the IDP 1300 when the transfer is completed (step 1312). At such time, the IDP 1300 informs the responder with the number of bytes that have been transmitted through an UPDATE BC command (step 1314). The process described in steps 1308 through 1314 is repeated for each additional L/A pair (step 1315—YES).

Figure 56B:
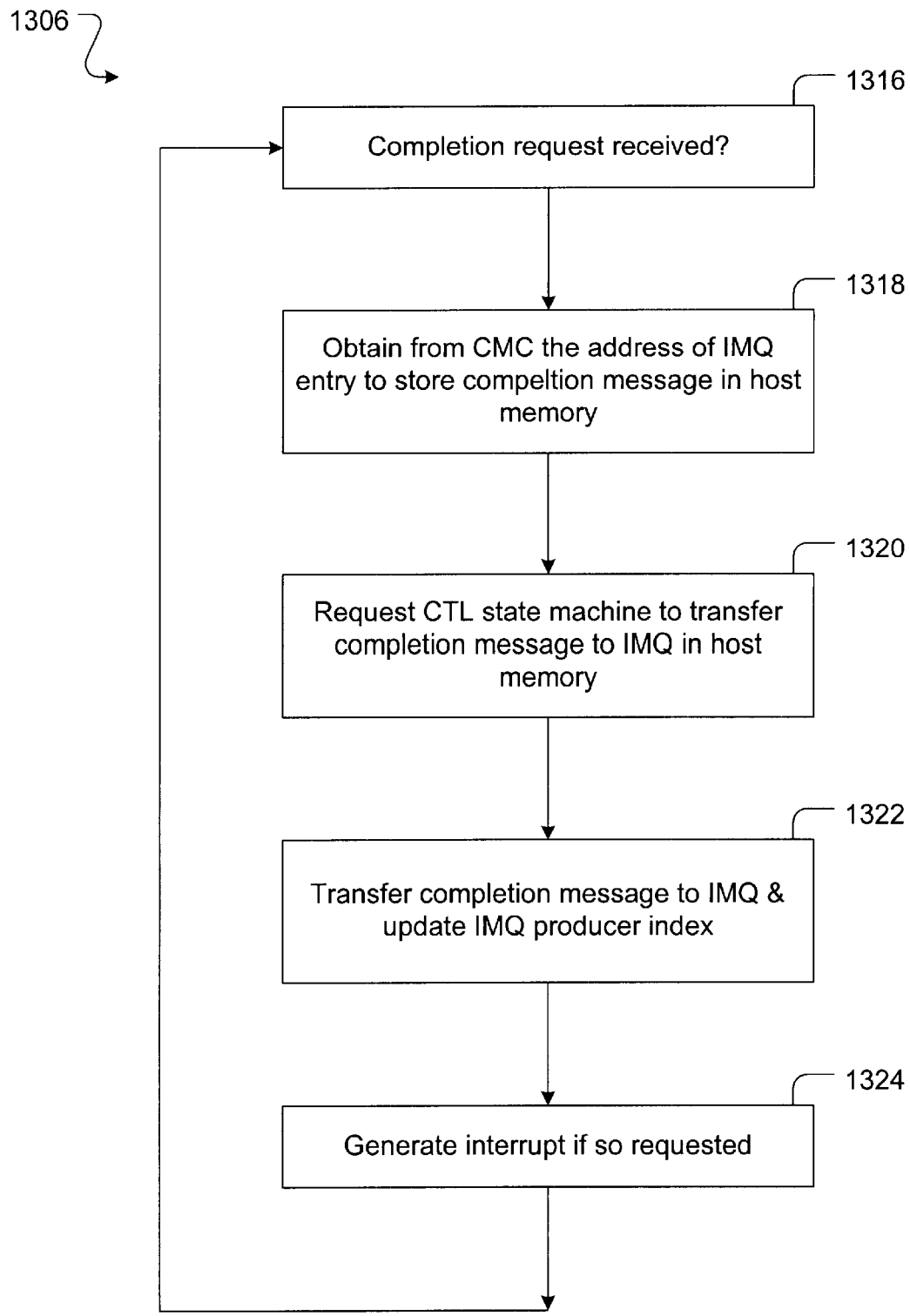

FIG. 56B illustrates the operation of the CMP unit 1306. The CMP unit 1306 receives requests to transmit completion messages into the IMQ in host memory 228 from SEM-IN 752, FCS 750, and OSM 738 units (step 1316). The CMP unit 1306 processes completion requests from the OSM unit 738 first, then SEM-IN 752, and lastly FCS 750 (step 1316).

In response to such a request, the CMP unit 1306 requests from the CMC 748 the address of an available entry in the IMQ (step 1318). Next, the CMP unit 1306 initiates the data transfer of the completion message and the updated IMQ producer index through the control state machine and the DTP 1302 (steps 1320–1322). Lastly, the CMP unit 1306 generates an interrupt to the requestor if so desired (step 1324).

The control state machine 1304 coordinates the usage of the DTP1302 between the CMP 1306 and IDP 1300 units. The DTP unit 1302 provides the requisite handshaking with the DAM 730 to enable a DMA write request as was described about with respect to FIG. 24.

The IDM unit 736 is structured such that some operations can be performed concurrently. For example, the IDM unit 736 can retrieve frames from the IFM concurrently as the frame header is transmitted to the SEM-IN unit 752. In addition, the IDM unit can process the completion messages simultaneously as the unit performs other tasks. In this manner, the IDM can process more inbound sequences thereby enabling the FC controller to achieve a higher data throughput.

The foregoing description described the structure and operation of the IDM 736. Attention now turns to the SEM-IN unit 752.

SCSI Exchange Management Inbound (SEM-IN)

The SEM-IN unit 752 manages the inbound sequences. The unit 752 parses the inbound frames received by the IDM 736 and instructs the IDM 736 with the requisite processing instructions. The unit 752 obtains the associated SEST entry that includes information needed by the IDM 736 to continue processing. Specifically, the SEST entry contains the L/A pair that indicates where the inbound data is to be stored as well as other information. Sequence tracking is updated through the SEST entry and the unit 752 generates completion messages for end-of-sequence frames.

Figure 57:
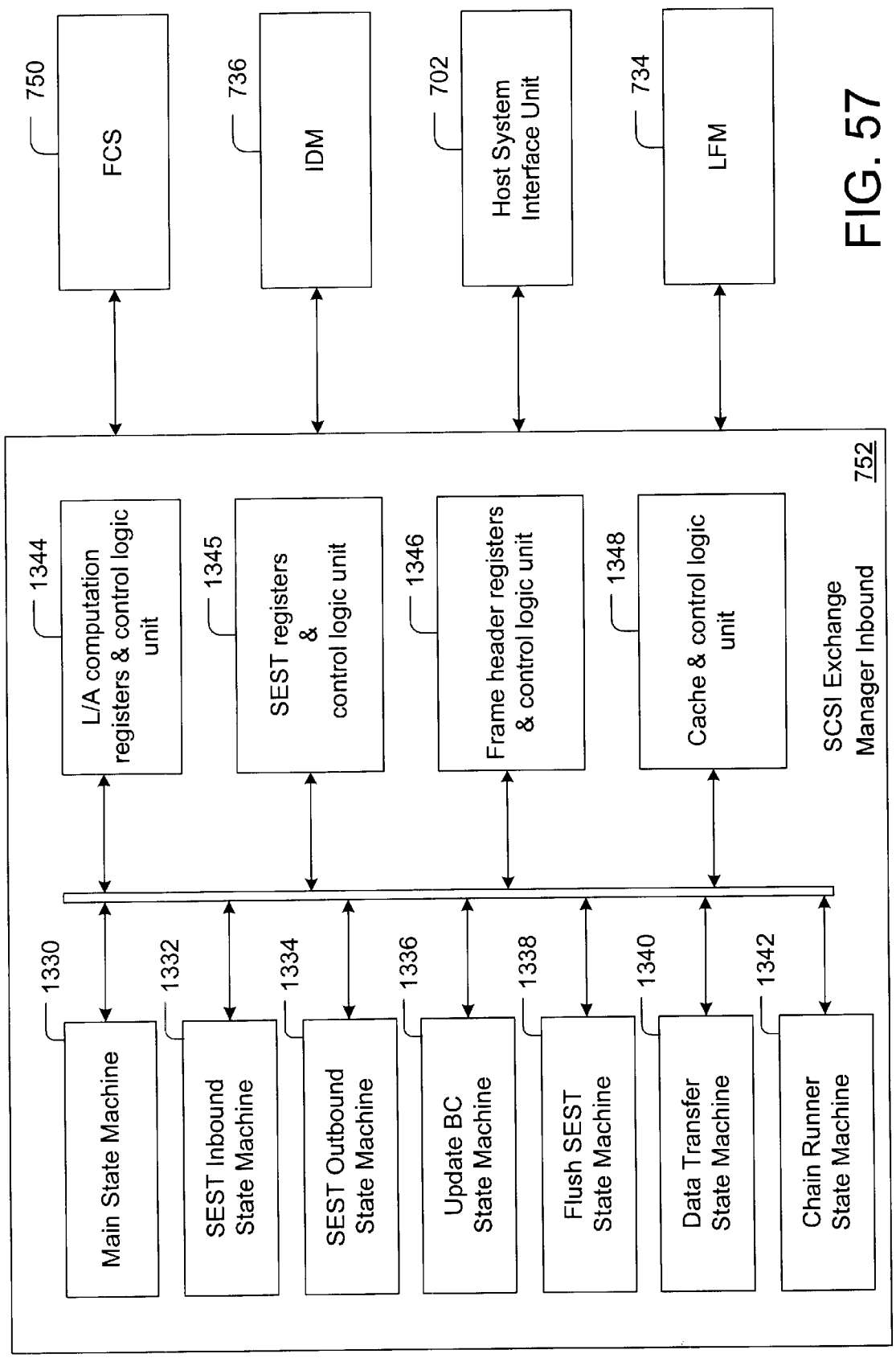
FIG. 57 is a block diagram illustrating the SCSI exchange manager inbound (SEM-IN)unit shown in FIGS. 23.

FIG. 57 illustrates the SEM-IN unit 752. The SEM-IN unit 752 interfaces with the FCS 750, the IDM 736, the host system interface unit 702, and the LFM 734. The unit 752 notifies the FCS 750 when there is an unassisted, bad, or unknown frame. The IDM 736 uses the SEM-IN unit 752 to perform certain tasks as will be explained below. The host system interface unit 702 provides read data from the host memory and the LFM 734 is used by the SEM-IN unit 752 to obtain and update SEST entries.

The SEM-IN unit 752 can include a main state machine 1330, a SEST inbound state machine 1332, a SEST outbound state machine 1334, an update byte count (BC) state machine 1336, a flush SEST state machine 1338, a data transfer state machine 1340, and a chain runner state machine 1342.

The main state machine 1330 is activated by the IDM 736 when it instructs the SEM-IN unit 752 to parse the frame header. The main state machine 1330 then initiates the activities of the other state machines in order to process the received frame header. The SEST inbound state machine 1332 is activated by the main state machine 1330 when the SEST entry for the received frame is needed and the frame pertains to an inbound sequence. The SEST outbound state machine 1334 is activated by the main state machine 1330 when the SEST entry for the received frame is needed and the frame pertains to an outbound sequence. The update BC state machine 1336 is used to update the byte count of the data transmitted to the host memory 228 and is activated by the main state machine 1330. The flush SEST state machine 1338 controls the flushing of SEST entries. The data transfer state machine 1340 manages the transfer of data between the SEM-IN unit 752 and the LFM 734 and the chain runner state machine 1342 manages the operation of retrieving multiple L/A pairs that span several extended scatter lists.

In addition to these state machines, the SEM-IN unit 752 also includes several registers and control logic units. There is shown L/A computation registers and the associated control logic unit 1344, SEST registers and the associated control logic unit 1345, registers to store frame headers and the associated control logic unit, and a cache memory and its associated control logic unit 1348. The L/A computation registers and control logic unit 1344 includes registers and control logic components that provide the IDM 736 with data for use in finding the correct L/A pairs and buffer information needed when such information in the SEST entry is incorrect. The SEST register and control logic unit 1345 stores SEST data that is captured on the fly as it is read in from the LFM 734 or which is read from the cache 1348. The frame header registers and control logic unit 1346 includes the registers used in parsing a frame header and for storing information that is needed for validating an SEST entry. The cache 1348 is used to store the SEST entries of the frames the SEM-IN unit 752 is processing and the cache control logic unit 1348 provides the requisite functionality for maintaining the cache 1348. The cache 1348 can store 16 SEST entries that represent IRE or TWE entries. The cache 1348 is used to facilitate fast context switches between sequences and exchanges when connected to a FC environment that interleaves frames from multiple sources.

Figure 58:
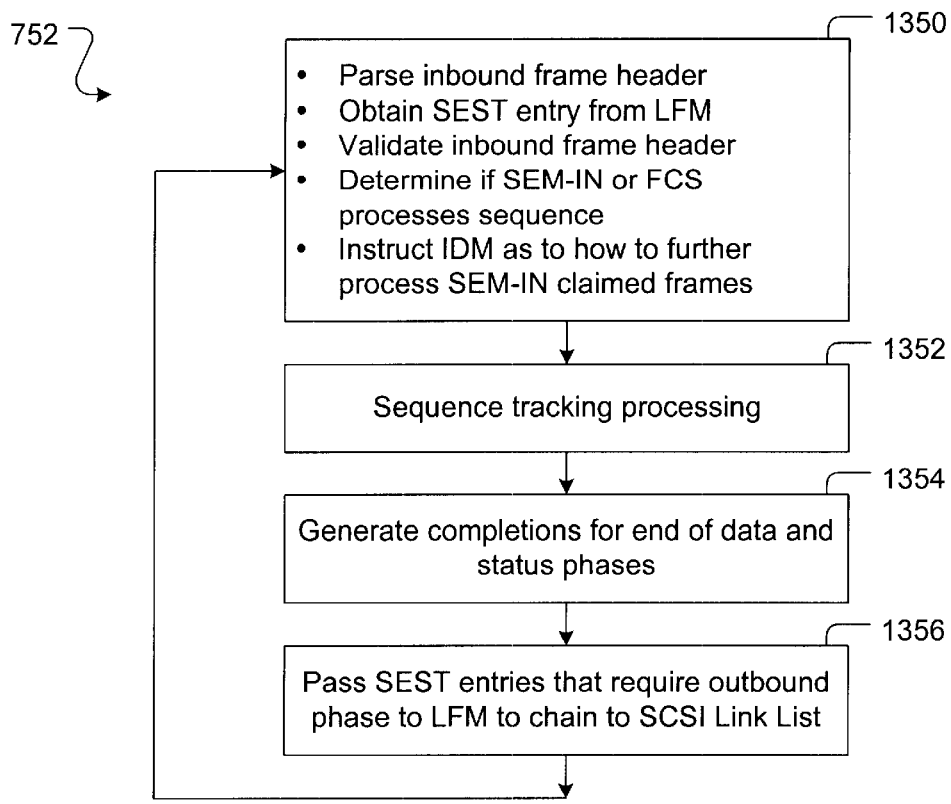
FIG. 58 is a flow chart illustrating the operation of the SEM-IN unit shown in FIGS. 23 and 57.

FIG. 58 illustrates the operation of the SEM-IN unit 752. The unit 752 is activated by the IDM 736 when it transmits a frame header (step 1350). The main state machine 1330 and the frame header registers and control logic unit 1346 parses the frame header to determine whether it is an unassisted, bad, or unknown frame. A FCP unassisted frame is one that is not part of an active I/O request such as a FCP_frame, a bad frame is one that is deemed erroneous (e.g., the frame's corresponding SEST entry does not match the information in the frame header), and an unknown frame is one that the SEM-IN unit does not recognize (e.g., frame not being of class 2 or 3 service or not being a FCP_CMD, FCP_, FCP_RSP, or FCP_XFER_RDY type of frame). In such cases, the main state machine instructs the FSC unit to process the frame. Otherwise, the SEM-IN unit 752 continues processing the frame header.

Next, the main state machine unit 1330 initiates either the SEST inbound 1332 or SEST outbound 1334 state machines to request from the LFM 734 the associated SEST entry (step 1350). The SEM-IN unit 752 can issue either the FETCH_SEST or FETCH_SEST2 commands to the LFM 734 to obtain the desired SEST information. The SEST entry is read into the SEST registers 1345 directly from the PCI bus through the host system interface unit 702 and then stored in the cache 1348. Additional validation is performed by checking that the information in the frame header and in the associated SEST entry are consistent. In some cases where this information is inconsistent, the frame header is considered bad and the main state machine requests the FCS 750 to continue processing.

Once the SEM-IN unit 752 decides to process the frame header, it notifies the IDM 736 by transmitting either a SEND DATA or SEND HDR command (step 1350). The SEND DATA command indicates to the IDM 736 that the payload should be sent to the host system 222 and this usually occurs in the case of a FCP_sequence. The SEND HDR command instructs the IDM 736 that the header and payload should be transmitted to the host system 222 and this occurs usually in the case of a FCP_RSP sequence.

In response to either of these commands, the IDM 736 issues a GET AL command to the SEM-IN unit 752 for it to obtain the L/A pairs, buffer index, and buffer offset needed to store the frame header and/or payload into the host memory 228 (step 1350). In some cases, this information is stored in the SEST entry and in other cases it requires additional processing when an extended scatter list is used. The L/A computation registers and control logic unit 1344 is used to assist in this task and the chain runner state machine 1342 is used to obtain the extended scatter list information, if needed. The SEM-IN unit 752 can issue either the FETCH_ALq, or FETCH_SEST_ALO command to the LFM 734 in order to obtain the requisite information. Once the L/A pair and buffer information is determined, it is transmitted back to the IDM 736 (step 1350).

In addition, the SEM-IN unit 752 updates the SEST entry with status information that tracks the processing of the sequence (step 1352).

Next, completion messages are generated for certain types of frames. In particular, when the frame represents the end of the last sequence in an exchange and when a FCP_RSP frame is received for an inbound exchange (step 1354). In addition, the SEM-IN unit 752 receives from the IDM 736 the number of bytes transmitted to the host memory 228 for a data sequence (i.e., Update BC command). This information is stored in the internal SEST registers 1345 and used to keep track of the amount of data received in order to determine when the data transfer is complete (step 1354). In certain cases, portions of the SEST entry are updated and written back to the SEST in the host memory 228 through the LFM 734 in order to update the host system 222 on the processing of the sequence (i.e., FLUSH_SEST, FLUSH_SEST1 commands) (step 1354).

Additionally, the SEM-IN unit 752 initiates outbound sequences which are required as a result of receiving certain frame headers (step 1356). For example, if a received frame header indicated a FCP_XFER_RDY sequence, the outbound FCP_sequences needs to be initiated. In these situations, the SEM-IN unit 752 instructs the LFM unit 734 to chain the corresponding SEST entry to the SCSI Linked List 250 so that the OSM 738 can initiate these outbound sequences (step 1356).

The SEM-IN unit 752 is structured to facilitate concurrent activities. The various state machines are able to interface with a particular external unit independent of the other state machines. In this manner, the unit 752 can process a variety of tasks concurrently. For example, the main state machine 1330 can process a frame header while the Flush SEST state machine instructs the LFM to update a SEST entry.

The foregoing description has described the architecture and operation of the SEM-IN unit 752. Attention now focuses on the CMC unit 748.

Completion Message Channel (CMC)

The CMC 748 manages the IMQ 232 that resides in the host memory 228 and which is used to store completion messages to the host system 222. The CMC 748 provides the IDM 736 with the address of the next available IMQ entry in order for the IDM 736 to write a completion message into the IMQ 232 in host memory 228. In addition, the CMC 748 controls the interrupts generated by the IDM 736 to the host system 222. The IDM 736 typically generates an interrupt to the host system 222 when a completion message is placed in the IMQ 232. The CMC 748 limits the number and frequency of such interrupts.

Figure 59:
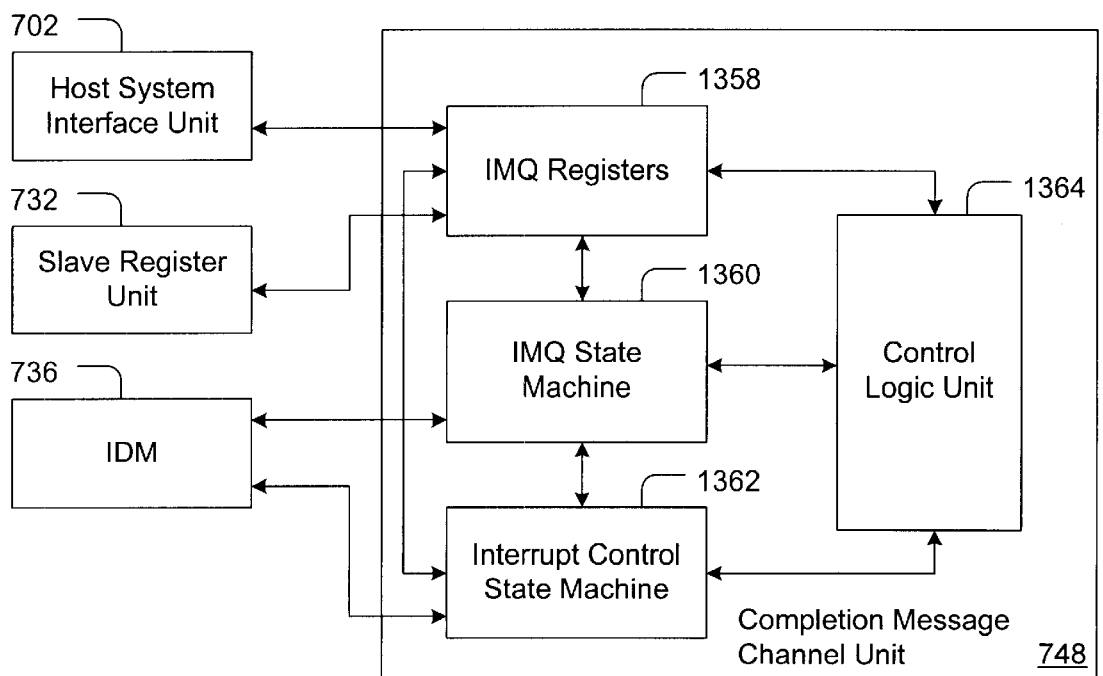
FIG. 59 is a block diagram illustrating the completion message channel (CMC) unit shown in FIG. 23.

FIG. 59 illustrates the CMC 748. The CMC 748 interfaces with the PCI bus through the host system interface unit 702 to receive data, with the slave register unit 732 to initialize the IMQ registers 1358, and with the IDM 736 to return the address of the next available entry in the IMQ 232. The CMC 748 can include a set of IMQ registers 1358, a state machine 1360, an interrupt control state machine 1362, and a control logic unit. The IMQ registers 1358 can include the following registers which store a copy of the equivalent value stored in the host memory 228: IMQ base register—indicates the base memory location in host memory of the IMQ; IMQ length register—indicates the number of entries in the IMQ; IMQ producer index address register—indicates the address of the IMQ producer index; IMQ initial message address register—indicates the starting address of the first entry in the IMQ 232; and the IMQ initial message value register—indicates the initial value of the first entry in the IMQ 232. In addition, the CMC 748 maintains the IMQ consumer index which can be read by the host system 222 and updated by the CMC 748. Initially, the host system 222 initializes the values of each of these registers through the slave register unit 732 as was described above.

The IMQ state machine 1360 controls the operation of the IMQ 232 and the interrupt control state machine 1362 controls the operation of the interrupt processing. The control logic unit 1364 provides the requisite registers and electronic circuitry to enable these tasks.

Figure 60A:
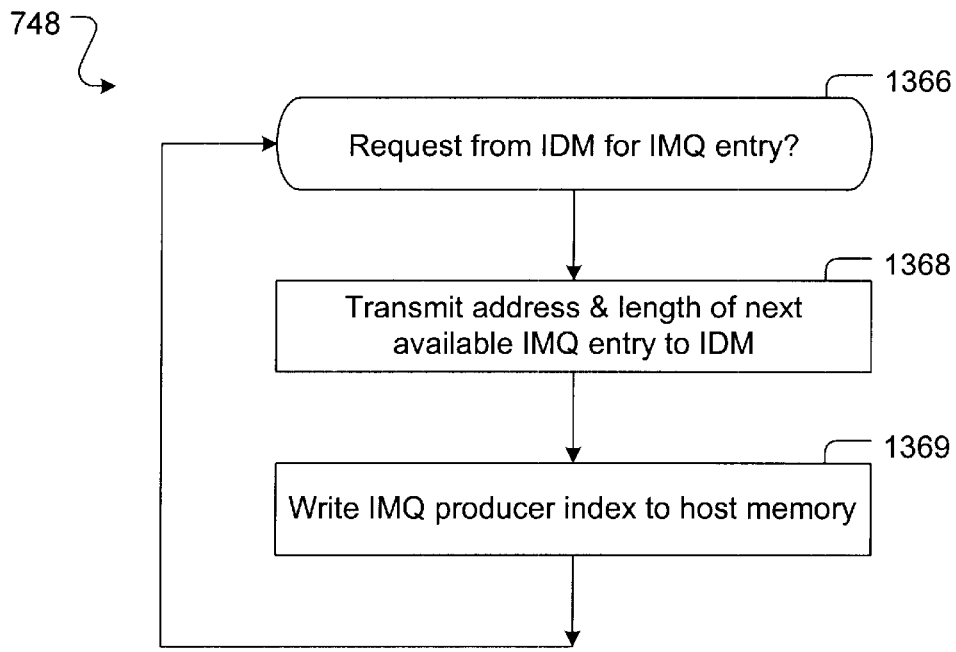
FIGS. 60A–60B are flow charts illustrating the operation of the CMC unit shown in FIGS. 23 and 59.
Figure 60B:
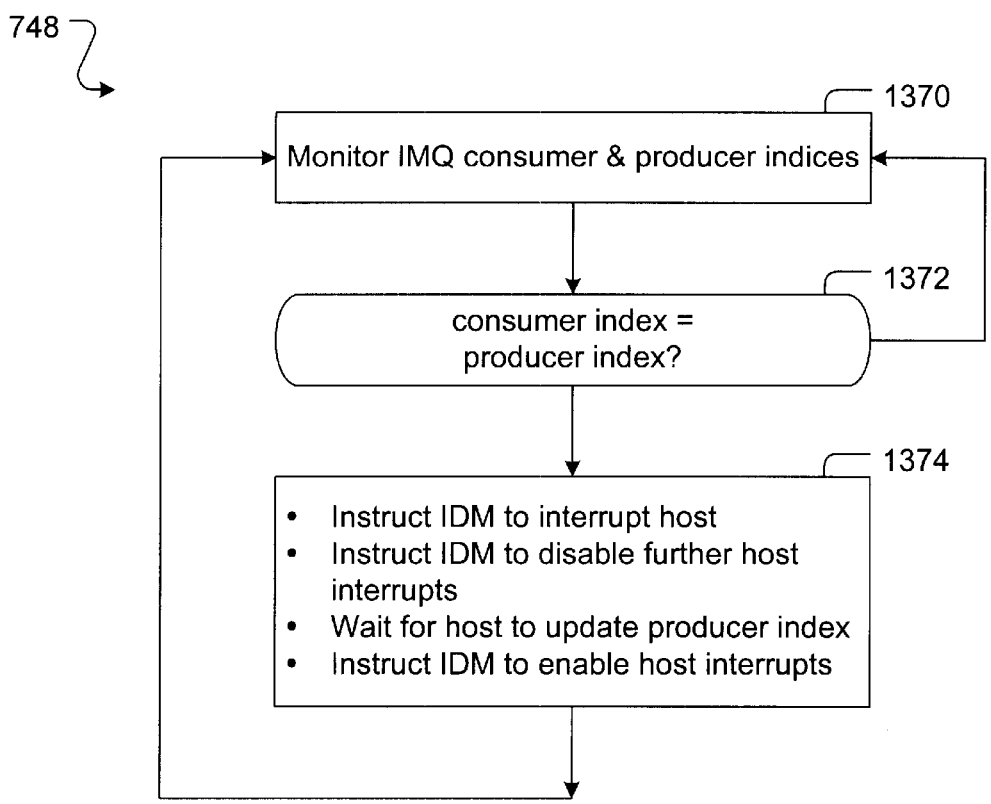

FIGS. 60A–60B illustrates the operation of the CMC 748. Referring to FIG. 60A, when the IMQ state machine 1360 receives a request from the IDM 736 for an IMQ address (step 1366), the next available address and its length is determined and transmitted back to the IDM 736 (step 1368), and the IMQ consumer index is updated accordingly in host memory 228 (step 1369).

Referring to FIG. 60B, the interrupt control state machine 1362 monitors the IMQ consumer and producer indices in order to regulate the frequency of interrupts that the IDM 736 generates to the host system 222 (step 1370). When the consumer index does not equal the producer index (step 1372—YES), then there are messages in the IMQ 232 that the host system 222 has not processed thereby necessitating an interrupt from the IDM 736 to the host system 222. The CMC 748 instructs the IDM 736 to generate an interrupt to the host system 222 and to refrain from generating any additional interrupts until such time as when the host system 222 updates the producer index. At such time, the CMC 748 instructs the IDM 736 to enable such interrupts (step 1374).

The foregoing description detailed the structure and operation of the CMC 748. Attention now turns to the FCS 750.

Fibre Channel Services (FCS)

Figure 61:
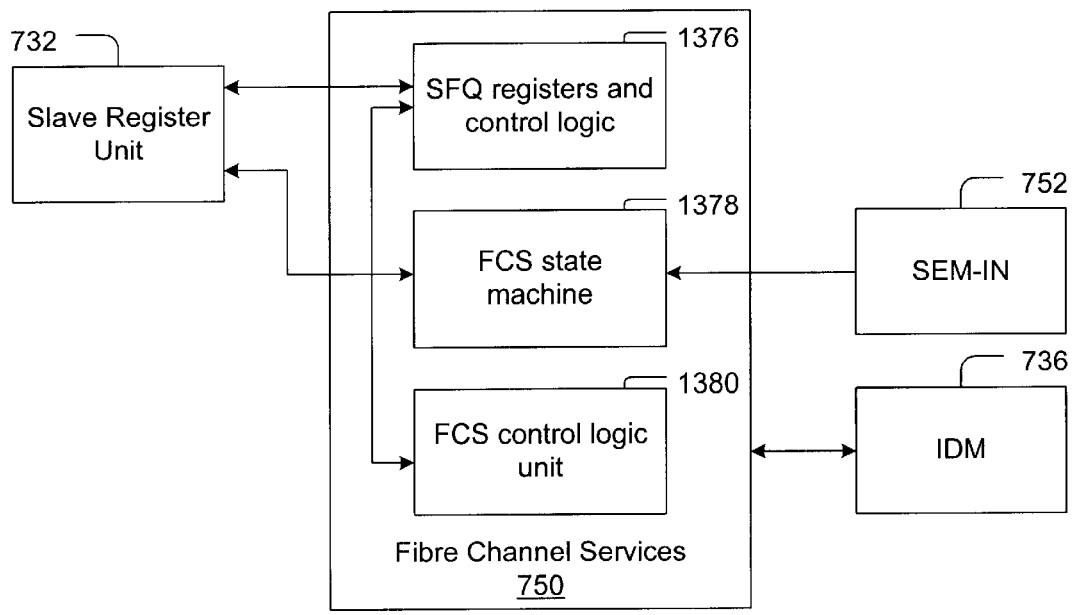
FIG. 61 is a block diagram illustrating the fibre channel services (FCS) unit shown in FIG. 2.

FIG. 61 depicts the FCS unit 750 which manages the SFQ which stores the FCP unassisted, bad, or unknown frames. The FCS 750 includes a set of SFQ registers 1376 which enable the FCS 750 to manage the SFQ. These registers are initialized by the host system 222 through the slave register unit 732 which was described in more detail above. The SEM-IN unit 752 initiates the FCS unit 750 by notifying it of erroneous or unknown frames. The IDM 736 interfaces with the FCS 750 in order to instruct the IDM 736 where to place the frame in the SFQ in host memory 228.

Referring to FIG. 61, there is shown the SFQ registers and associated control logic 1376, a state machine 1378, and a control logic unit 1380. The SFQ registers can include the SFQ base, queue length, producer, and consumer index registers. The FCS 750 maintains the producer index and the host system 222 maintains the consumer index register. The state machine 1378 manages the operation of the CMC 748 and directs the circuitry provided in the control logic unit 1380 to perform the requisite tasks.

Figure 62:
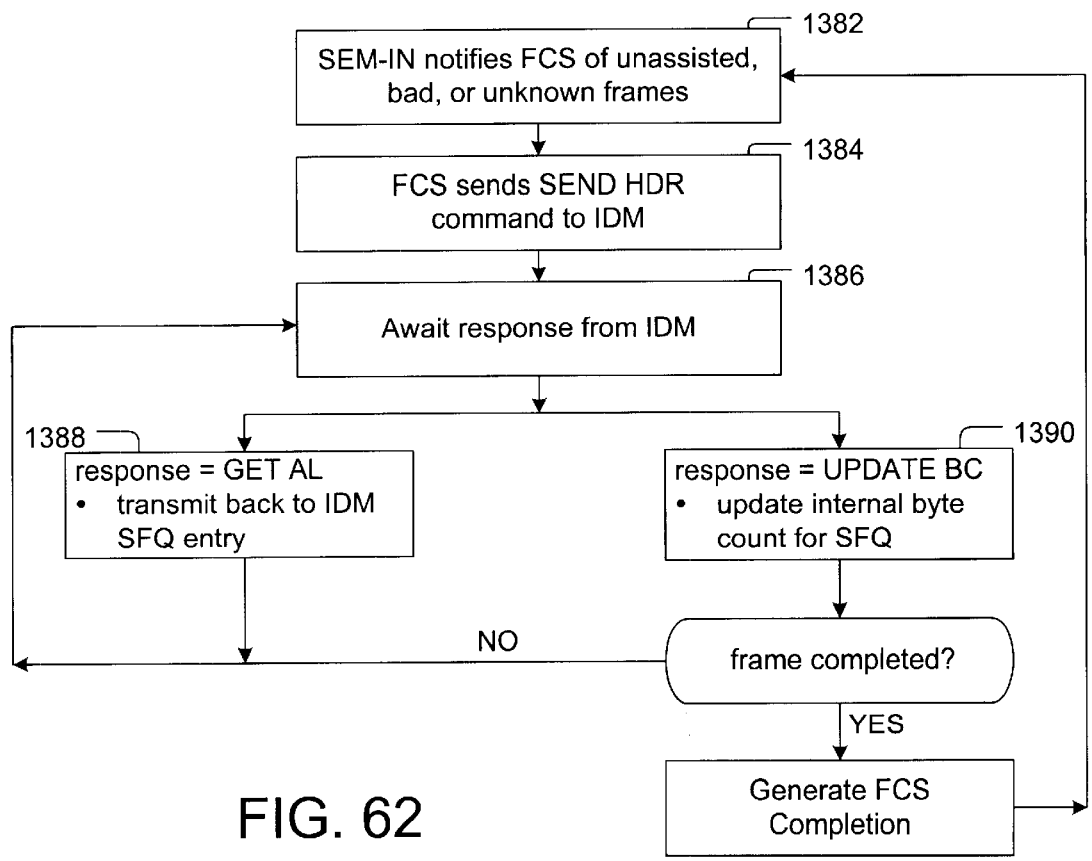
FIG. 62 is a flow chart illustrating the operation of the FCS unit shown in FIGS. 23 and 61.

FIG. 62 illustrates the operation of the FCS 750. The FCS 750 is activated upon notification from the SEM-IN unit 752 of an unassisted, bad, or unknown frame (step 1382). In response to this command, the FCS 750 transmits the SEND HDR command to the IDM 736 (step 1384) and awaits a response from the IDM 736 (step 1386). When the response is a GET AL command, the FCS 750 obtains the address of the next available entry in the SFQ and transmits it back to the IDM 736 (step 1388). When the IDM 736 has completed transmission of the frame to the SFQ, it issues a UPDATE BC command to the FCS 750 indicating the number of bytes transmitted (step 1390). In response to this command, the FCS 750 updates its internal byte count and instructs the IDM 736 to generate a completion message (step 1390).

Conclusion

The foregoing description has described a FC controller that interfaces between a host system and a 10-bit FC interface. The FC controller acts as both a FCP initiator and FCP target device and has the capability to receive and process SCSI I/O requests from a number of devices associated with a FC and from a host system. The FC controller can process both an inbound and outbound sequence simultaneously since it does not employ a processor-based architecture. Rather, the FC controller relies on specialized circuitry that can operate in a relatively independent manner so that multiple tasks are performed simultaneously thereby achieving a faster throughput and data transfer rate.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known data structures, circuitry, and procedures are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The FC controller interfaces between a FC link and any other type of communication link. The description herein described the FC controller as an interface between a PCI bus and a 10-bit FC link. However, the FC controller is not constrained to interface with a PCI bus and can interface with any other type of communication link.

Figure 63:
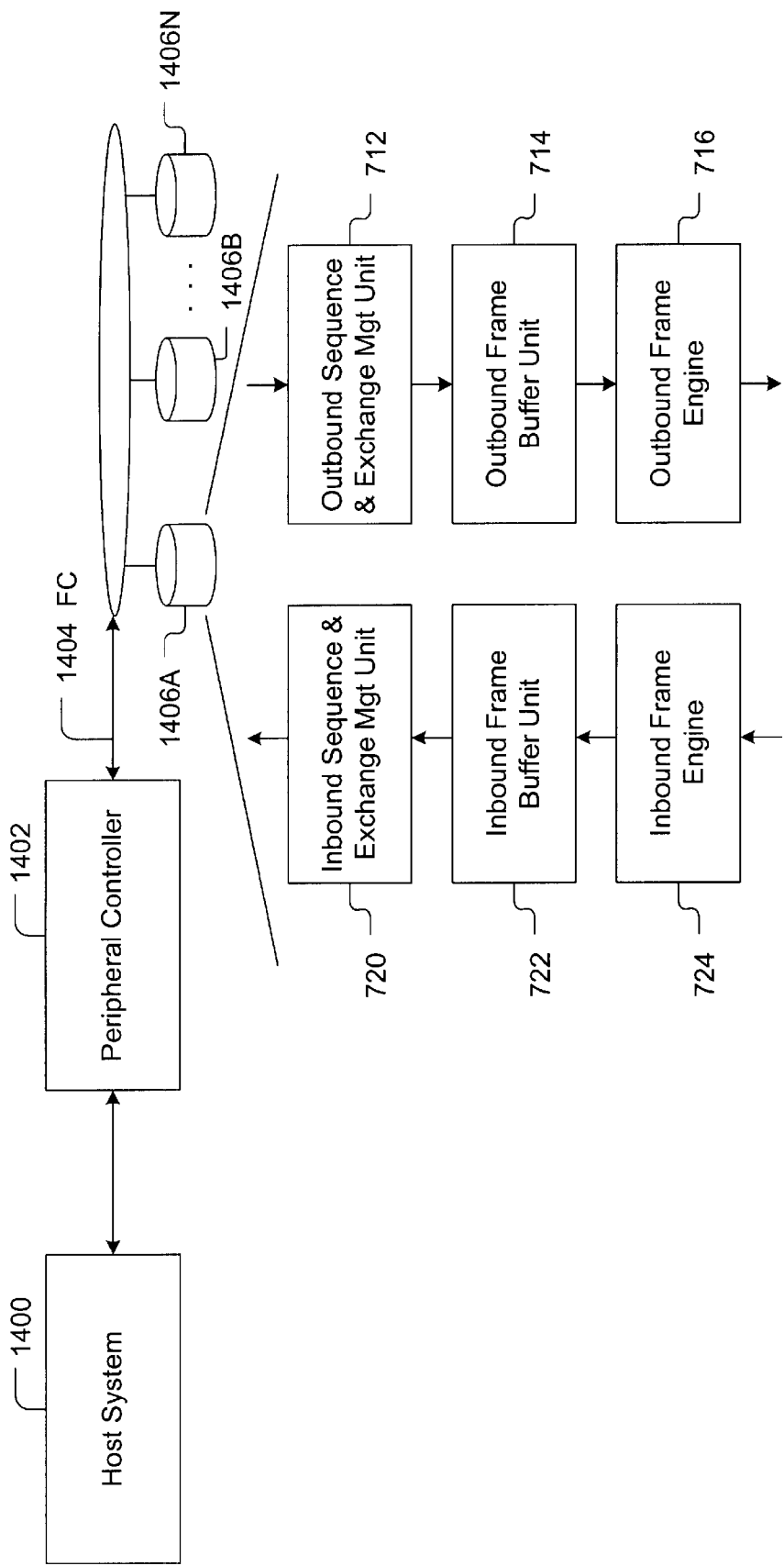
FIG. 63 illustrates an alternate embodiment of the FC controller.

One such example is shown in FIG. 63 where a portion of the FC controller is embedded in a peripheral device that is coupled to a FC link. As such, the FC controller can interface between a FC link and an internal bus within the peripheral device. As shown in FIG. 63, the exemplary system can include a host system 1400 coupled to a peripheral controller 1402 which in turn in connected to a number of peripheral devices 1406A–1406N through the peripheral controller 1404. The peripheral controller 1404 can be an Intelligent I/O (I20) controller, a disk array controller, or the like. A peripheral device 1406 can include a FC control mechanism that includes the inbound and outbound sequence and exchange management units 712, 720, the inbound and outbound frame buffer units 706, 708, and the frame manager unit 860 embedded within the device 1406.

In yet another alternate embodiment, the external memory interface can be used to store the host/controller interface 226, that being the external data structures used to facilitate the communication between the host system and the FC controller. In this fashion, read and write accesses to these data structures by the FC controller will be improved since the external memory interface is on the same board as the FC controller and does not involve the use of the PCI bus, which can be shared by other peripheral devices. In addition, the interface between the FC controller and the external memory interface can include a RAMBUS™ type interface.

The present invention is not constrained to the use of state machines to perform the functions of the described units. In an alternate embodiment, the functions performed by the state machines can be replaced or supplemented by one or more processors where each processor can control one or more of the functions performed by the FC controller. For example, one processor could handle the interface between the host system and the FC controller. In addition, another processor could assist in the management of the completion messages and interface with the OSM and IDM to generate the messages and transmit them to either the host memory or the external memory interface if the external memory interface is used to store the host/controller interface.

In another embodiment, there can be two mechanisms that interface with the host system. For instance, the first mechanism can interface to the PCI bus and the second mechanism can be a secondary port interface (SPI). The PCI bus interface can be used to utilize the PCI bus to transmit the data payload between the host memory and the FC controller. The SPI can be used to transmit control data, such as the host/controller interface data structures, between the host memory and the FC controller.

In yet another alternate embodiment, the FC controller can be modified to transmit more than one outbound sequence at a time. In this embodiment, the OSM can be modified to initiate the processing of another outbound sequence when the previous outbound sequence is still outstanding.

Figure 64:
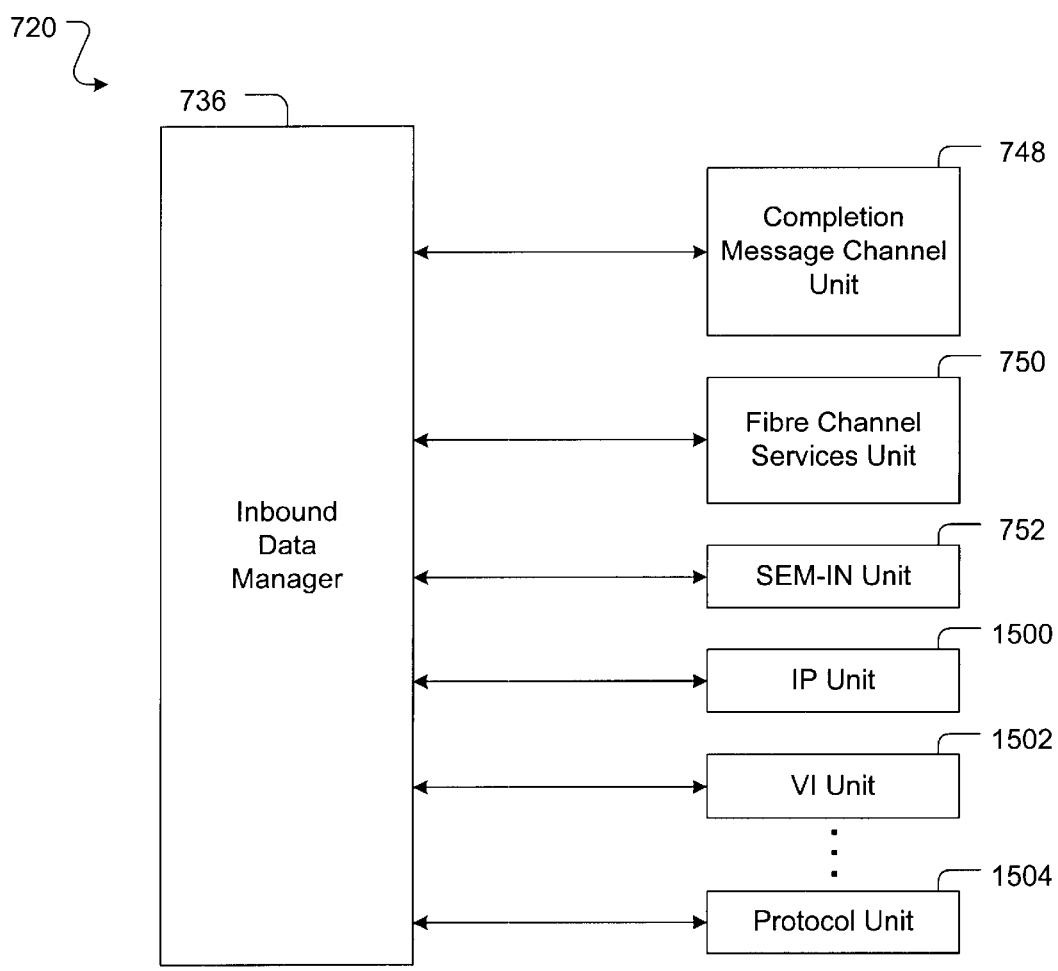
FIG. 64 illustrates another alternate embodiment of the FC controller.

In another embodiment, the inbound sequence and exchange management unit can include additional units to process other types of I/O requests in addition to SCSI I/O requests. For example, as shown in FIG. 64, there can be an internet protocol (IP) unit 1500, a virtual interface (VI) unit 1502, as well as other such units 1504, that process other types of I/O requests. The IP unit 1500 would process the IP I/O requests and the VI unit 1502 would process VI I/O requests.

What is claimed is:

1. A fibre channel controller that simultaneously processes, in parallel multiple fibre channel frames between a host device and a fibre channel transceiver coupled to a fibre channel communication medium, the fibre channel controller comprising:

PCI bus interface that interfaces the fibre channel controller with the PCI bus of the host device;

an outbound control unit that receives data for a fibre channel frame from the host device via the PCI bus, transforms the received data into an output fibre channel frame, and passes the outbound fibre channel frame to the fibre channel via the fibre channel transceiver; and an inbound control unit that, independent from, and in parallel with, the outbound control unit, receives a fibre channel frame from the fibre channel via the fibre channel transceiver and passes data from the received fibre channel frame to the host device via the PCi bus.

2. The fibre channel controller of claim 1 wherein, for receiving fibre channel frames from the fibre channel transceiver, the outbound control unit includes an outbound frame engine comprising:

a 10-bit to 8-bit decoder;

an elastic store; and an ordered set/cyclic redundancy check checker.

3. The fibre channel controller of claim 2 wherein, for internally buffering a first outgoing fibre channel frame for transmission by the outbound frame engine to the fibre channel transceiver while simultaneously buffering a second fibre channel frame being assembled by the outbound control unit, the outbound control unit includes an outbound first-in-first-out manager.

4. The fibre channel controller of claim 1 wherein, for transmitting fibre channel frames to the fibre channel transceiver, the inbound control unit includes an inbound fibre engine comprising:

an ordered set/cyclic redundancy check generator; and an 8-bit to 10-bit encoder.

5. The fibre channel controller of claim 4 wherein, for internally buffering fibre channel frames received from the fibre channel transceiver during cyclic redundancy checking by the cyclic redundancy checker, the inbound control unit includes an inbound first-in-first-out manager.

6. The fibre channel controller of claim 5 wherein the outbound control unit includes an outbound sequence and exchange management unit that comprises:

an exchange request manager that fetches an I/O request from the host device via the PCI bus;

an outbound SCSI exchange manager that receives an I/O request from the exchange request manager, processes the received I/O request by retrieving data from the host device via the PCI bus, and assembles a fibre channel sequence, and an outbound sequence manager that receives a fibre channel sequence from the outbound SCSI exchange manager and processes the received fibre channel sequence by creating fibre channel frames buffered by the outbound first-in-first-out manager.

7. The fibre channel controller of claim 6 wherein the inbound control unit includes an inbound sequence and exchange management unit that comprises:

a completion message manager that managers a memory queue in host device memory for storage of completion messages;

an inbound SCSI exchange manager that processes an inbound fibre channel frame, directing frames requiring host processing to the host device, and directing frames that immediately result in an outbound fibre channel frame to the outbound SCSI exchange manager;

a fibre channel services component that handles inbound fibre channel frames that cannot be directed by the inbound SCSI exchange manager, placing the frames in host device memory; and an inbound data manager that directs frames that can be processed by the inbound SCSI exchange manager from the inbound first-in-first-out manager to the inbound SCSI exchange manager and directs other frames from the inbound first-in-first-out manager to the fibre channel services component.

8. The fibre channel controller of claim 1 wherein the host device includes host memory accessible by the fibre channel controller via the PCI bus, the host memory including:

an inbound message queue;

a single frame queue;

a SCSI exchange table; and an exchange request queue.

9. The fibre channel controller of claim 8 wherein the inbound message queue contains completion messages that notify the host device of inbound and outbound transaction information and status information.

10. The fibre channel controller of claim 8 wherein the single frame queue contains fibre channel frames that cannot be processed by the fibre channel controller via hardware logic.

11. The fibre channel controller of claim 8 wherein the SCSI exchange table contains initiator read, initiator write, target read, and target write entries that include data that describe a SCSI exchange I/O operation, including host device memory resources for the I/O operation and fibre channel address information.

12. The fibre channel controller of claim 8, wherein the exchange request queue includes I/O request block entries describing host-device-initiated I/O operations, an entry in the exchange request initiating transmission of an outbound sequence by the fibre channel controller.

13. The fibre channel controller of claim 8 wherein the inbound message queue, the single frame queue, and the exchange request queue are implemented as circular queues in host memory, with producer and consumer indexes, into which a producer inserts entries and from which a consumer retrieves entries.

14. The fibre channel controller of claim 13 wherein, for the exchange request queue, the producer index is a fibre channel controller register, the consumer index is a memory storage entity within host device memory, the fibre channel controller is the consumer and the host device is the producer.

15. The fibre channel controller of claim 13 wherein, for the inbound message queue and the single frame queue, the consumer index is a fibre channel controller register, the producer index is a memory storage entity within host device memory, the fibre channel controller is the producer and the host device is the consumer.

16. The fibre channel controller of claim 1 wherein the host device is a computer.

17. The fibre channel controller of claim 1 implemented as a single integrated circuit device.

18. A fibre channel/PCI adapter board incorporating the fibre channel controller of claim 1, the fibre channel/PCI adapter board further including:

a fibre channel transceiver; and a clock.

19. The fibre channel/PCI adapter board of claim 18 further including one of:

a boot flash read-only memory; and a local synchronous static random access memory.

* * * * *